US008401887B2

(12) United States Patent
Moukas et al.

(10) Patent No.: US 8,401,887 B2
(45) Date of Patent: Mar. 19, 2013

(54) MOBILE DEVICE MARKETING AND ADVERTISING PLATFORMS, METHODS, AND SYSTEMS

(75) Inventors: Alexandros Moukas, Athens (GR); Christos Kaskavelis, Athens (GR); Dimitrios Kontarinis, Athens (GR); Maria Nassiakou, Metamorphosis (GR); Konstantinos Tsakalos, Athens (GR); Konstantinos Giannakis, Athens (GR); Nikolaos Dendris, Athens (GR); Joseph Ieronymakis, Athens (GR); Ypatios Varelas, Athens (GR); Ioannis Tzikas, Athens (GR)

(73) Assignee: Velti PLC (GB)

( * ) Notice: Subject to any disclaimer, the term of this patent is extended or adjusted under 35 U.S.C. 154(b) by 0 days.

(21) Appl. No.: 12/771,911

(22) Filed: Apr. 30, 2010

(65) Prior Publication Data

US 2011/0029380 A1 Feb. 3, 2011

Related U.S. Application Data

(60) Division of application No. 12/363,523, filed on Jan. 30, 2009, now Pat. No. 8,099,317, which is a continuation of application No. 12/170,051, filed on Jul. 9, 2008, now Pat. No. 8,099,316.

(60) Provisional application No. 60/958,742, filed on Jul. 9, 2007.

(51) Int. Cl.
*G06Q 10/00* (2012.01)
(52) U.S. Cl. ..................................... 705/7.29
(58) Field of Classification Search .................. 705/7.29
See application file for complete search history.

(56) References Cited

U.S. PATENT DOCUMENTS

| | | | |
|---|---|---|---|
| 5,710,887 A | 1/1998 | Chelliah et al. | |
| 6,020,883 A * | 2/2000 | Herz et al. | 715/721 |
| 6,049,797 A * | 4/2000 | Guha et al. | 1/1 |
| 6,567,854 B1 | 5/2003 | Olshansky et al. | |
| 6,647,257 B2 * | 11/2003 | Owensby | 455/414.1 |
| 6,736,322 B2 | 5/2004 | Gobburu et al. | |
| 6,766,956 B1 | 7/2004 | Boylan, III et al. | |
| 7,044,362 B2 | 5/2006 | Yu | |
| 7,047,209 B2 * | 5/2006 | Filepp et al. | 705/14.73 |
| 7,058,594 B2 * | 6/2006 | Stewart | 705/14.53 |
| 7,062,469 B2 * | 6/2006 | Meyers et al. | 705/64 |
| 7,102,067 B2 * | 9/2006 | Gang et al. | 84/600 |
| 7,127,261 B2 * | 10/2006 | Van Erlach | 455/456.5 |
| 7,131,587 B2 | 11/2006 | He et al. | |
| 7,158,943 B2 * | 1/2007 | van der Riet | 705/14.41 |
| 7,203,684 B2 * | 4/2007 | Carobus et al. | 1/1 |
| 7,240,036 B1 | 7/2007 | Mamdani et al. | |
| 7,251,478 B2 * | 7/2007 | Cortegiano | 455/412.1 |
| 7,343,317 B2 * | 3/2008 | Jokinen et al. | 705/14.64 |
| 7,536,686 B2 | 5/2009 | Tan et al. | |
| 7,548,915 B2 * | 6/2009 | Ramer et al. | 705/14.54 |

(Continued)

OTHER PUBLICATIONS

Salesforce.com Delivers the AppExchange and Winter '06, Heralding the Arrival of the Business Web. PR Newswire Jan. 17, 2006 (dialog file 16: 12850761).*

(Continued)

*Primary Examiner* — Johnna Loftis
(74) *Attorney, Agent, or Firm* — K&L Gates LLP

(57) ABSTRACT

A mobile marketing campaign platform and method including: a planning module including: a definition module for setting budget and objectives; and a design module for designing the campaign utilizing a plurality of templates; an execution module including: design tools for designing an executable campaign from the campaign design made from the templates; and operating tools for causing the executable campaign to execute over multiple mobile services; and a reporting module including: tracking means for tracking at least one of a campaign activity, the campaign performance objectives; and the brand performance objectives.

10 Claims, 51 Drawing Sheets

U.S. PATENT DOCUMENTS

| | | | |
|---|---|---|---|
| 7,555,284 B2 | 6/2009 | Yan et al. | |
| 7,653,001 B2* | 1/2010 | Agrawal et al. | 370/252 |
| 7,668,832 B2* | 2/2010 | Yeh et al. | 707/770 |
| 7,680,796 B2* | 3/2010 | Yeh et al. | 707/724 |
| 7,739,594 B2* | 6/2010 | Vasilik | 715/277 |
| 7,769,764 B2* | 8/2010 | Ramer et al. | 707/751 |
| 2002/0128908 A1 | 9/2002 | Levin et al. | |
| 2003/0023489 A1 | 1/2003 | McGuire et al. | |
| 2003/0032409 A1 | 2/2003 | Hutcheson et al. | |
| 2003/0046201 A1 | 3/2003 | Cheyer | |
| 2003/0065558 A1* | 4/2003 | Shaw et al. | 705/14 |
| 2003/0208402 A1 | 11/2003 | Bibelnieks et al. | |
| 2004/0054589 A1 | 3/2004 | Nicholas et al. | |
| 2004/0122735 A1 | 6/2004 | Meshkin | |
| 2004/0122835 A1 | 6/2004 | McKibben et al. | |
| 2005/0246283 A1 | 11/2005 | Gwiazda et al. | |
| 2006/0059044 A1* | 3/2006 | Chan et al. | 705/14 |
| 2007/0061336 A1* | 3/2007 | Ramer et al. | 707/10 |
| 2007/0061363 A1* | 3/2007 | Ramer et al. | 707/104.1 |
| 2007/0088801 A1* | 4/2007 | Levkovitz et al. | 709/217 |
| 2007/0088851 A1* | 4/2007 | Levkovitz et al. | 709/246 |
| 2007/0088852 A1* | 4/2007 | Levkovitz | 709/246 |
| 2007/0143181 A1* | 6/2007 | Linkner et al. | 705/14 |
| 2007/0198443 A1 | 8/2007 | Chernev et al. | |
| 2007/0244929 A1 | 10/2007 | Huang et al. | |
| 2007/0256095 A1* | 11/2007 | Collins | 725/34 |
| 2007/0294096 A1* | 12/2007 | Randall et al. | 705/1 |
| 2008/0040215 A1 | 2/2008 | Huang et al. | |
| 2008/0147484 A1* | 6/2008 | Davis | 705/10 |
| 2011/0066488 A1 | 3/2011 | Ludewig et al. | |

OTHER PUBLICATIONS

Harland Works Direct Marketing Magic with Campaign Wizard; Online Development service Helps Financial Institutions Create Direct Marketing Campaigns. PR Newswire, Feb. 21, 2003 (dialog file 621: 04097144).*

Giving Brokers Marketing Assistance: Wholesalers are helping their mortgage broker clients gain customers of their own by providing them with on-line help to create marketing materials. Broker Magazine, v8 n3 p. 50. Apr. 2006 (dialog file 9: 03937363).*

Neff, Jack. Enterprise software targets and new frontier: Marketing. Food Processing, v62 n4 p. 66 Apr. 2001. (dialog file 16: 08623962).*

Flytxt Revolutionizes Mobile Direct Marketing. Business Wire Oct. 10, 2006 (3 pgs.).

* cited by examiner

510

| Budget setup | | | |
|---|---|---|---|
| Product Budget | | | |
| Please specify your local budget for the selected years in the fields below. You can make adjustments for each month by typing directly into the respective table cells. | | | |
| 2007 | Advertising | Marketing | Total |
| January | $ 250,000 | $ 250,000 | $ 500,000 |
| February | $ 400,000 | $ 400,000 | $ 800,000 |
| March | | | |
| April | | | |
| May | | | |
| June | | | |
| July | | | |
| August | | | |
| September | | | |
| October | | | |
| November | | | |
| December | | | |
| | $650,000 | $650,000 | $1,300,000 |

FIG. 5B

Campaign Planner

Open Application ▼

John Williams
Client ▼
The Coca Cola Company
Product ▼
Coca Cola Classic

[Refresh]

Objectives — 600

<2007>

| Name | Client | Product | KPI |
|---|---|---|---|
| Ford Explorer Build Awareness | Ford | Ford Explorer | 4.5 |
| Ford Explorer Build Awareness | Ford | Ford Explorer | 4 |
| Ford Explorer Build Awareness | Ford | Ford Explorer | 4 |
| Ford Explorer Build Awareness | Ford | Ford Explorer | 4 |

Showing 1-10 of N objectives      Page 1 of 20  ☐☐☐☐☐☐☐ ⇕

Objectives

Properties   Analytics — 602

Ford Explorer Build Awareness | Used in 1 campaign        [Edit] [Delete]

| Metric | 1st Quarter | 2nd Quarter | 3rd Quarter | 4th Quarter | Total |
|---|---|---|---|---|---|
| Test Drive requests | 101/500 | 101/500 | 101/500 | 101/500 | 101/500 |

— 604

Dashboard
Campaigns
Objectives
Budget

New Campaign

General Information

Targeting

Budget

Step 1 of 3: General Information

Campaign

Specify a name that best describes the purpose of your campaign. You may optionally provide a description or instructions or notes of interest.

Name
Ford Explorer Adventure Campaign — 702

Description
Launch Ford Explorer amongst Ford Explorer's key target audience of 18-25 years old with a disposable income. To reinforce brand awareness and create interaction opportunities. To generate sales through encouraging test drives and to create a database of potential customers — 704

Schedule
Specify the start and end dates of the campaign in the fields below.

Starts                Ends — 706

Figure 7C:
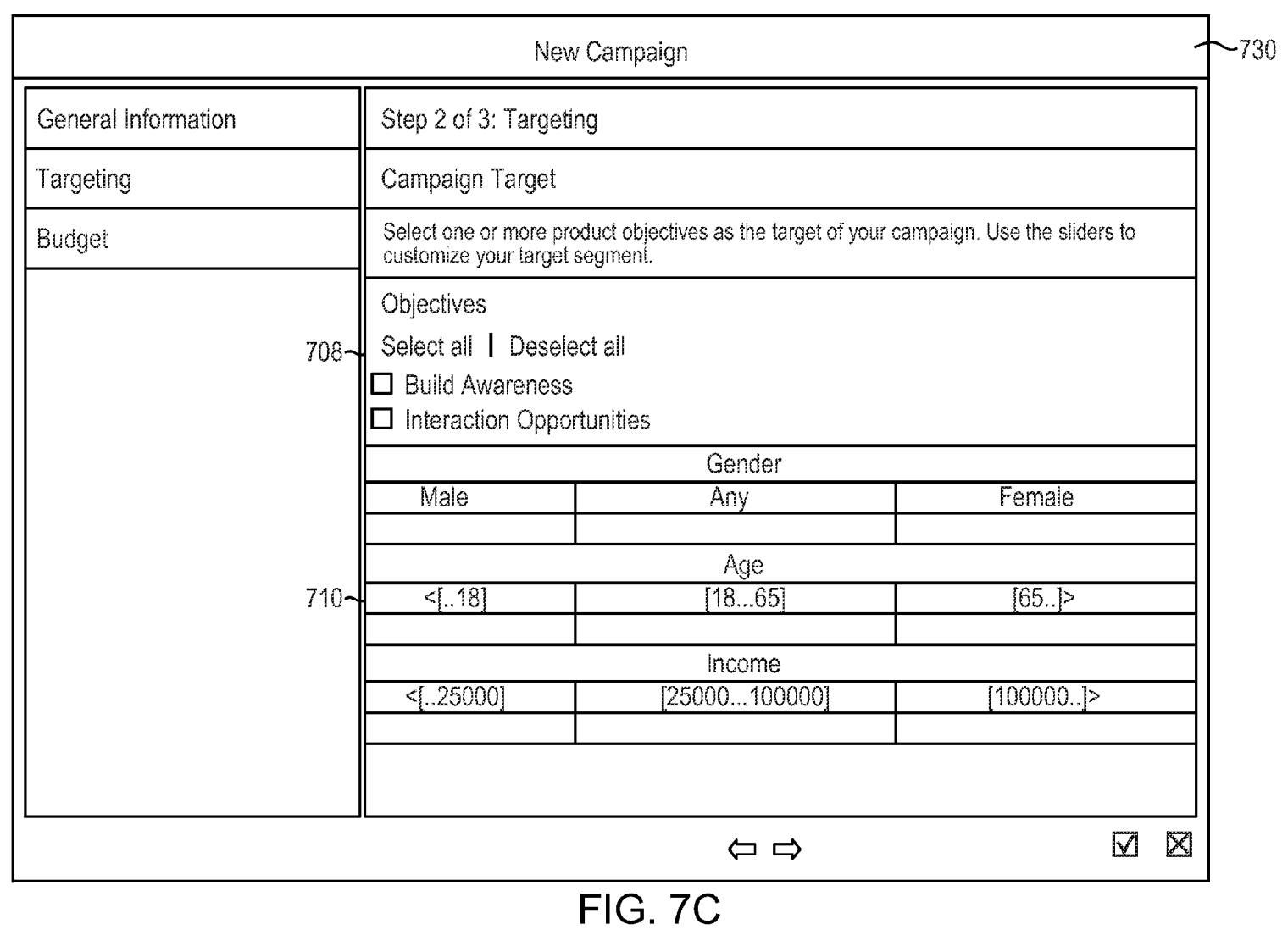

| New Campaign | |
|---|---|
| General Information | Step 2 of 3: Targeting |
| Targeting | Campaign Target |
| Budget | Select one or more product objectives as the target of your campaign. Use the sliders to customize your target segment. |
| | Objectives |
| | Select all \| Deselect all |
| | ☐ Build Awareness |
| | ☐ Interaction Opportunities |

| | Gender | |
|---|---|---|
| Male | Any | Female |
| | Age | |
| <[..18] | [18..65] | [65..]> |
| | Income | |
| <[..25000] | [25000...100000] | [100000..]> |

New Campaign — 840

Step 4 of 4: Process Campaign Activities

Profile | Metrics

Activity Metrics
Specify target values for each activity metric

General Information
Select Activities
Process Activities
- Shakira Special Buy 1 Get 1 Promo Activity Type
- Shakira Sponsored Content Activity Type

| Metric | Target |
|---|---|
| Metric Title | 500,000 |

Campaign Planner

☐ Open Application ▼

John Williams
Client ▼
The Coca Cola Company
Product ▼
Coca Cola Classic

[Refresh]

Campaigns
List of Activities
Running         1
Scheduled       1
Concluding      0
Pending         1

☐ Dashboard
☐ Campaigns
☐ Objectives
☐ Budget

Campaigns                                          <2007>

| Jan | Feb | Mar | Apr | May | Jun | Jul | Aug | Sep | Oct | Nov | Dec |
|---|---|---|---|---|---|---|---|---|---|---|---|
| | | Ford Explorer Adventure Campaign | | | | | | | | | |

[Status] Analytics Log

Coca Cola Summer Campaign
Proposal received on 15 February 2007 at 16:00 pm, pending for approval Schedule
Feb 15 2007 - Aug 5 2007
Products
Coca Cola classic, Coca Cola zero
Objectives
Brand awareness. Increase sales
Targeting
Males and females in the hard-to-reach age group of 16-24 years old
Budget Plan | [Design] | Execution This campaign is currently at the design level, you can perform the following actions    [New]

View campaign proposal
Edit campaign details
Cancel this campaign

900 ── (top left)
902 ── (right side)

FIG. 9

Campaign Proposal

Some Title

Lorem ipsum dolor sit amet, consectetuer adipiscing elit. Phasellus at tellus. Maecenas id massa. Sed velit eros, sodaes sed, lacinia vitae, aliquam consectetuer, diam. Aenean vulputate dolor a nulla.

| Activity | Budget | Starts | Ends | Status |
|---|---|---|---|---|
| Coca Cola Summer Campaign | $3,000,000 | --/--/---- | --/--/---- | |
| The On Pack promotion | $3,000,000 | --/--/---- | --/--/---- | Pending |
| The On Pack promotion | $3,000,000 | --/--/---- | --/--/---- | Pending |
| The On Pack promotion | $3,000,000 | --/--/---- | --/--/---- | Pending |

Please review the information shown below and select an action

Schedule
Feb 15, 2007 - Aug 5, 2007
Products
Coca Cola classic, Coca Cola zero
Objectives
Brand awareness. Increase sales
Targeting
Males and females in the hard-to-reach age group of 16-24 years old
Budget

[Approve All]   [Reject All]   [Done]

| Name |
|---|
| |
| Age |
| ☐ <11   ☐ 12-18   ☐ 19-24   ☐ 25-34<br>☐ 35-44  ☐ 45-54  ☐ 55-64  ☐ 65+ |
| Gender |
| ☐ Male   ☐ Female |
| Income (in EUR) |
| ☐ <10,000         ☐ 10,001 - 20,000   ☐ 20,001 - 30,000<br>☐ 30,001 - 40,000  ☐ 40,001 - 50,000   ☐ 50,001 - 60,000<br>☐ 60,001 - 70,000  ☐ 70,001 - 80,000   ☐ 80,001 - 90,000<br>☐ 90,001 - 100,000 ☐ 100,000+ |
| Region |
| |
| Ethnicity |
| |
| Marital Status |
| ☐ Single   ☐ Married |
| Number of Children |
| ☐ None   ☐ 1   ☐ 2<br>☐ 3      ☐ 4   ☐ 4+ |
| Home Ownership |
| ☐ Yes   ☐ No |
| Car Ownership |
| ☐ Yes   ☐ No |
| Internet Usage |
| ☐ From home   ☐ From office |

New Campaign

Step 2 of 2: Main Setup

Instant Win Messages

Specify below one or more instant win competitions that participants who send a message to the specified shortcode will be eligible for.

Instant Wins | Non-Winners

| Name | When | Prize | Winners |
|---|---|---|---|
| Instant Win 1 | Every 10 minutes | T-shirt | 10 |

FIG. 16B

Activity Type

General Information

Main Setup

Step 2 of 2: Main Setup

Instant Win Messages

Specify below one or more instant win competitions that participants who send a message to the specified shortcode will be eligible for.

Instant Wins    Non-Winners —1624

| Name | When | Prize | Winners |
|---|---|---|---|
| Instant Win 1 | Every 5 minutes | Apple iPod 80GB | 10 |

Name —1602
[Instant Win 1]

Prize —1614
[Apple iPod 80GB]

Winning Message
[Insert smart field ▼]

Congratulations! You sent the $order message and won an iPod. Call 80180180180180180 for more details  —1620

Frequency —1616
Every [5] [minutes ▼]

Winners —1618
[10]

Close-to-Win Message
[Insert smart field ▼] —1622

You sent the $order message! You were very close to winning an iPod. Try again!

If received within [1] [minutes ▼]

[Apply] [Close]

Create New Site

Please specify information about this site in the form below.

What would you like to do?

☒ Create new site from scratch
☐ Copy one of your existing sites
☐ Clone a model site How would you like to name this site?

[                              ]

[Cancel]                                              [Back]  [Continue]

FIG. 28B

Create New Template

Please specify information in the form below.

What would you like to name this template?

Select a site for which you want to create a new template
Available sites

Please choose an action from the list of available options below
☒ Create new template from scratch
☐ Copy an existing template
☐ Clone a model template

[Cancel]     [Back] [Continue]

FIG. 28C

Create New Page

Please specify information in the form below.

What would you like to name this page?

Select a site for which you want to create a new page
Available sites

Please choose an action from the list of available options below
- ☒ Create new page from scratch
- ☐ Copy an existing page

[Cancel]   [Back] [Continue]

FIG. 28D

| Mobile Content Collection Setup |
|---|
| Mobile content collections offer an easy way to add mobile content on your site. A mobile content collection can contain one or more instances of a specific content type. |
| What type of mobile content would you like to setup? |
| ■ Ringtones |
| ☐ Wallpapers |
| ☐ Videos |
| ☐ Games |
| ☐ Other |
| How would you like to name this mobile content collection? |
| [                    ] |
| Cancel                                    Back    Continue |

MOBILE DEVICE MARKETING AND ADVERTISING PLATFORMS, METHODS, AND SYSTEMS

CROSS-REFERENCE TO RELATED APPLICATIONS

This application is a divisional application of U.S. patent application Ser. No. 12/363,523, filed Jan. 30, 2009, which is a continuation of U.S. patent application Ser. No. 12/170,051, filed Jul. 9, 2008, which claims priority to and the benefit of U.S. Provisional patent application No. 60/958,742, filed Jul. 9, 2007, the entire disclosures of each of which are incorporated herein by reference.

FIELD OF THE INVENTION

This invention relates to methods, a platform, apparatus, and systems for marketing and advertising to mobile devices.

BACKGROUND OF THE INVENTION

The role of advertising in the world of business has always been essential to the sale and development of products. As times have changed, so too has the business of advertising. Unfortunately, much of the business of advertising is not automated or tailored for use with modern modes of communication and content viewing.

Specifically, the process of developing an ad campaign focused on mobile devices is costly and often difficult to evaluate from a cost benefit analysis perspective. As a result, a need exists for novel approaches relating to mobile device marketing and advertising.

SUMMARY OF THE INVENTION

Embodiments of the present invention include a mobile marketing campaign platform comprising a planning module having a definition module for setting budget and objectives and a design module for designing the campaign utilizing a plurality of templates. The platform also includes an execution module comprising design tools for designing an executable campaign from the campaign design made from the templates and operating tools for causing the executable campaign to execute over a mobile service. A reporting module is also included having a tracking module for tracking at least one of a campaign activity, campaign performance objectives and brand performance objectives. The brand is a feature of the campaign. Further aspects of the embodiment include a state machine representation for the execution of the activities and a personalization engine configured to receive and filter profile information.

Another embodiment of the invention includes a mobile marketing campaign method comprising the steps of planning a campaign by defining a budget and objectives and designing the campaign utilizing a plurality of templates. The campaign is executed by designing an executable campaign from the campaign design made from the templates and causing the executable campaign to execute over a mobile service. The results of the campaign are reported by tracking at least one of a campaign activity, the campaign performance objectives and the brand performance objectives, wherein the brand is a feature of the campaign. An additional feature of the method includes collecting and filtering profile information and directing the executable campaign to an audience based upon the profile information.

Yet another embodiment of the invention includes a mobile device campaign based advertising system having a user interface that links to a planning module and an execution module. The planning module includes a definition module for setting budget and objectives and a design module for designing the campaign utilizing a plurality of templates. The execution module includes design tools for designing an executable campaign from the campaign design made from the templates and operating tools for causing the executable campaign to execute over a mobile service. The executable campaign comprises a plurality of activities, wherein execution of each activity is performed using a state machine representation.

Another embodiment includes a mobile marketing campaign platform comprising a planning module having a definition module for setting budget and objectives and a design module for designing the campaign utilizing a plurality of templates. The platform also includes an execution module comprising design tools for designing an executable campaign from the campaign design made from the templates and operating tools for causing the executable campaign to execute over a mobile service. Additional aspects of the embodiment include a community module associated with the executable campaign in which the community provides a forum to a user community for additional content related to the campaign. The community may include a segment of members targeted by the campaign. The platform may also include a broadcast module configured to transmit a data set to members of the user community.

Another embodiment of the invention includes a mobile marketing campaign method comprising the steps of planning a campaign by defining a budget and objectives and designing the campaign utilizing a plurality of templates. The campaign is executed by designing an executable campaign from the campaign design made from the templates and broadcasting elements of the executable campaign to a plurality of users forming a community.

One embodiment of the invention includes a method for reserving a transaction comprising the steps of offering a transaction over a mobile device communication link using a mobile marketing device platform, receiving a response to the offer of the transaction by way of the mobile communication device link, generating a scannable identifier as a confirmation of receiving the response to the offer, and wirelessly transmitting the scannable identifier over the mobile communication device link for processing by a decoding device as proof of confirmation. Additional aspects of the embodiment include the offered transaction being the sale of a product or a sale of tickets to an event. According to another feature, the response to the offered transaction is the purchase of a product or service, or the purchase of tickets to an event. The scannable identifier may include a 2-D barcode. Further, the method may include pre-registering for notice of the transaction.

An embodiment of the invention includes an apparatus for reserving a transaction over a mobile device link comprising a mobile marketing platform with a transmitter for offering a transaction over a communication link and a barcode generator for generating a barcode as a confirmation of receiving the response to the offer. The transmitter transmits the barcode using a wireless protocol and decoding of the barcode serves as proof of confirmation.

Another embodiment includes a method for targeting users with device specific content, the method comprising the steps of transmitting an advertising message with a link to a plurality of consumers, receiving consumer device information in response to each consumer accessing the link, generating content for display on a plurality of consumer devices using a common file format hierarchy, and rendering the content generated using the common file format for each consumer as a function of consumer device type. Features of the embodiment further include the content comprising advertising or a website and content generated using a mobile marketing platform.

Another embodiment includes an advertising system comprising a plurality of transmitters adapted for pushing content of interest to a mobile device within a predetermined transmission radius using a wireless protocol, and a visual display configured to provide information to a user of the mobile device, the information associated with the content of interest and associated with at least one alternative communication channel for obtaining supplemental information associated with the content of interest. Additional features may include the transmitter position information being used for contextual advertising messaging of the user of the mobile device, the wireless protocol being Bluetooth and the alternative communication channel being one of cellular, email, WiFi, 3G, WiMax or general packet radio service. Further, the visual display may include an interactive screen.

Another embodiment includes a targeted mobile marketing campaign platform comprising a planning module with a definition module for setting budget and objectives and a design module for designing the campaign utilizing a plurality of templates. An execution module includes design tools for designing an executable campaign from the campaign design made from the templates, operating tools for causing the executable campaign to execute over multiple mobile services, and a personalization engine configured to collect and filter profile information. The executable campaign targets an audience based upon the profile information. Features of the embodiment include the profile information having a demographic criterion selected from age, gender, ethnicity, nationality, income, profession, religion, geographic location, education, and home ownership.

Another embodiment includes a targeted mobile marketing campaign method comprising planning a campaign by defining a budget and objectives, collecting and filtering profile information, designing the campaign utilizing a plurality of templates and the profile information. The campaign is executed by designing an executable campaign from the campaign design made from the templates and causing the executable campaign to execute over at least one mobile service to an audience based upon the profile information.

Another embodiment includes a mobile marketing campaign platform comprising a broadcast module configured to transmit advertisements to a plurality of mobile device users, a database comprising mobile device profile data and a personalization engine, having a rules module defining a targeted audience based on the mobile device profile data of the database. The broadcast module broadcasts advertisements to the targeted audience. Features further include selecting the audience with a rules based engine using demographic criterion in the mobile device profile data in which the criterion is selected from age, gender, ethnicity, nationality, income, profession, religion, geographic location, education, and home ownership. Further the targeted audience may be selected by the rules engine based upon a behavioral pattern such as previous purchases, frequently visited sites, advertisement inquires and mobile device usage.

Other features, objects, and advantages of the present invention are apparent in the detailed description that follows. It should be understood, however, that the detailed description, while indicating embodiments of the present invention, is given by way of illustration only, not limitation. Various changes and modifications within the scope of the invention will become apparent to those skilled in the art from the detailed description.

Various aspects of the invention are described in further detail in the following subsections. The use of subsections is not meant to limit the invention. Each subsection may apply to any aspect of the invention. In this application, the use of "or" means "and/or" unless stated otherwise. As used in this disclosure, the term "comprise" and variations of the term, such as "comprising" and "comprises," are not intended to exclude other additives, components, integers or steps.

BRIEF DESCRIPTION OF THE DRAWINGS

These embodiments and other aspects of this invention will be readily apparent from the detailed description below and the appended drawings, which are meant to illustrate and not to limit the invention, and in which:

FIGS. 5A-C depict visual displays of a budget setup in accordance with an embodiment of the invention;

FIGS. 6A-B depict visual displays of an objectives setup in accordance with an embodiment of the invention;

FIGS. 7A-D depict a visual display of a campaign setup in accordance with an embodiment of the invention;

FIGS. 8A-D depict visual displays of a campaign designer in accordance with an embodiment of the invention;

FIG. 9 depicts visual display of a campaign designer in accordance with an embodiment of the invention;

FIG. 10 depicts a visual display of an account manager in accordance with an embodiment of the invention;

FIG. 13 is a visual display of a segment editor of the personalization engine in accordance with an embodiment of the present invention;

FIGS. 16A-C depict visual displays of an activity designer in accordance with an embodiment of the invention;

FIG. 17 depicts a visual display of a prize manager in accordance with an embodiment of the invention;

FIGS. 28A-G depict visual displays of a mobile site designer in accordance with an embodiment of the present invention;

FIG. 30 depicts a visual display of a mobile community wizard segment in accordance with an embodiment of the present invention;

DETAILED DESCRIPTION OF PREFERRED EMBODIMENT

Figure 1:
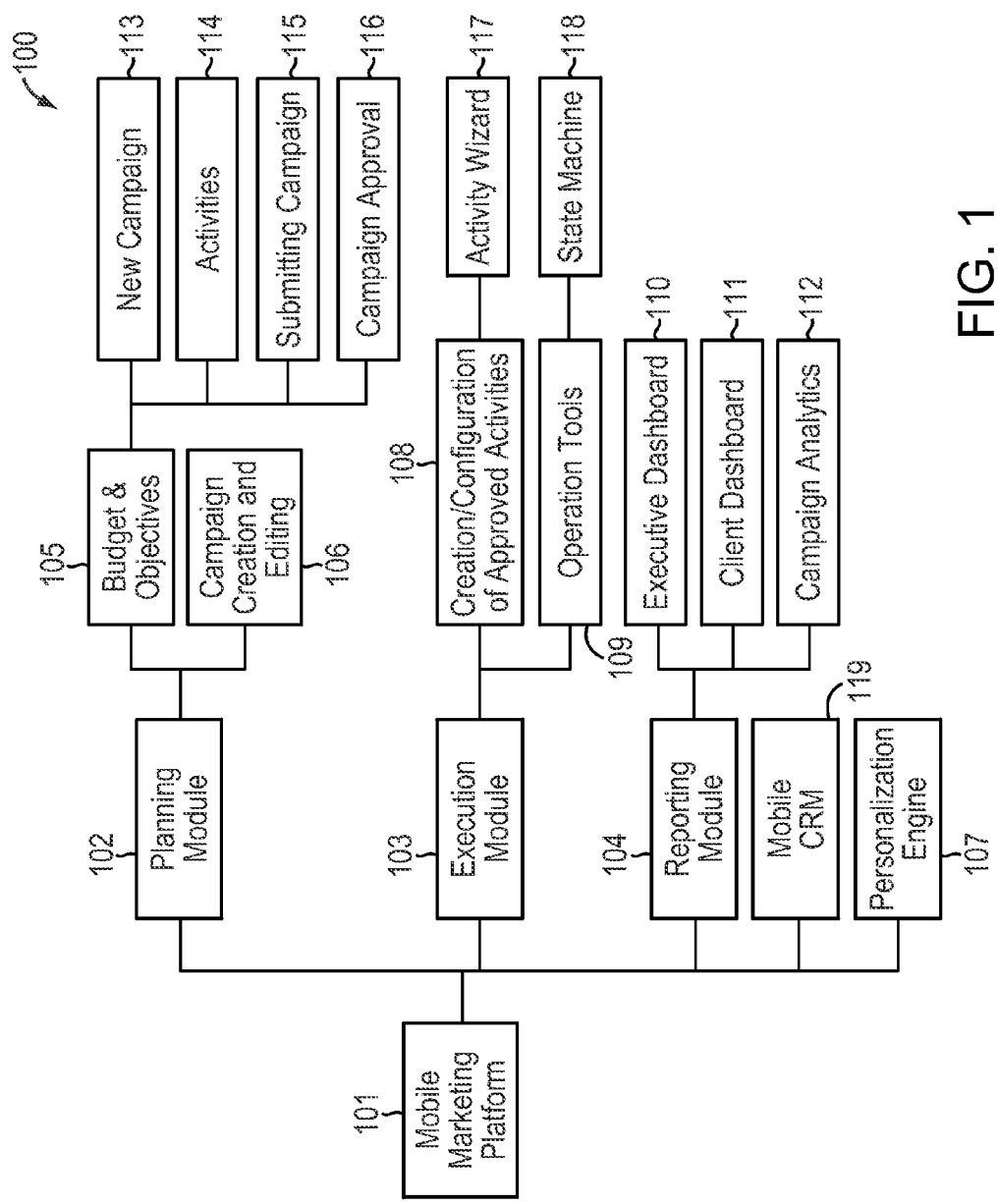
FIG. 1 is an organizational diagram of a mobile marketing platform in accordance with an embodiment of the invention.

The present invention relates generally to platforms and methods for marketing and advertising to mobile devices. These platforms can be implemented using combinations of software and hardware to solve many existing problems associated with using a mobile device as a mechanism for receiving advertising. In part, one feature of an embodiment of the invention is that the platforms have been designed for use by advertisers and marketing personnel as opposed to engineers and programmers. As a result, intuitive graphic user interfaces and pre-populated campaign modules and templates form the basis for some of the platform embodiments described herein. An exemplary collection of such templates is attached as Appendix A. The platforms provide tools for those in advertising and marketing to perform the tasks associated with their jobs in an easier, faster and more cost effective manner.

Embodiments of the invention include a Mobile Marketing Platform to respond to the increasing business need for mobile marketing and advertising. Operators, content providers, and advertising agencies may utilize the Mobile Marketing Platform to plan, create, manage and monitor marketing and advertising campaigns. An embodiment of the invention may also be utilized in mobile services personalization.

Consumer behavior is rapidly changing thanks to technological advances, such as state-of-art mobile phones and virtual worlds. Embodiments of the Mobile Marketing Platform provide a holistic approach to mobile marketing. The Mobile Marketing Platform, in one embodiment is modular and can administer a large number of activities, such as branded WAP sites, WAP banner ads, text-to-win promotions, mobile communities, proximity marketing activities, and virtual worlds. The platform provides the functionality required to create from scratch any activity, based on set budgets and objectives. It includes easy-to-use wizards for setting up an activity in a structured manner, and offers the possibility to combine and utilize one or more alternative communication channels such as, without limitation, SMS, WAP, web browser, cellular, email, WiFi, 3G, WiMax, and general packet radio service.

The Mobile Marketing Platform allows marketers to quickly execute and monitor many campaigns simultaneously. This results in increased potential revenues from shorter time to market and larger volumes of campaigns, while reducing operational costs. The platform also makes use of subscriber data through interfacing with a personalization engine to allow for a personalized experience, while providing real-time reporting and monitoring of campaign data.

According to one embodiment, customer data collection and analysis lead to personalized recommendations, increasing data average revenue per user from all value added services (VAS) and WAP portal services usage. Additionally, advanced customer profiling and segmentation techniques allow the creation and monetization of customer communities, leading to increased loyalty and reduced churn, and positively affecting voice and data revenues.

Further, the platforms described herein provide tools and techniques that facilitate both advertising and marketing activities. Advertising activities refer to traditional advertising approaches such as radio and television advertising, internet banner ads, etc. Similarly, marketing activities refer to marketing or less conventional advertising approaches. For example, marketing based approaches can include direct mail; spam; phone based messaging; viral marketing and public events. However, the usages of the terms advertising and marketing are not intended to be more limited than their general usage in the marketing and advertising industries.

The platforms disclosed herein consolidate and enable the planning and distribution of media advertising content buying across multiple mobile devices, providing a standardized way for advertising agencies to distribute their content across them. As mentioned above, the platforms are tailored for both advertising and marketing campaigns and combinations of both. The advertising Mobile Advertising activities covered in various embodiments include, but are not limited to, WAP Banner Ads (ad banner reservation of x000s targeted impressions on- and off-deck); Mobile Search Advertising (contextual/keyword search in operator engines, on- and off-portal); Mobile TV Ads/Sponsored Video (reservation of pre- and post-roll video ads on- and off-portal); and Branded WAP sites and Ad-funded content (sponsored sites and on- and off-portal content, e.g. music, games, news). Similarly, the marketing Mobile Marketing activities include, but are not limited to in various embodiments: Mobile Messaging (text-to-win, alerts, info, etc); On-pack promotions (contests, competitions, treasure hunts, sweepstakes, etc); Mobile Blogging/User Generated Content (video/photo blogs, chat & dating, etc); M-commerce (m-tickets, m-coupons, m-vouchers, tc); Loyalty clubs (info, gifts, discounts, coupons, etc); and Bluetooth/Proximity Marketing (location based promotions, alerts, info, etc).

In general, the different platforms and other aspects of the invention disclosed herein provide a user friendly graphic user interface based system that enables, in part, (1) the creating of advertising and marketing campaigns; (2) the running of such campaigns via an electronic interface; (3) the evaluation of campaigns via various performance metrics and (4) the reporting of any such qualitative and quantitative metrics in a variety of formats. The inclusion of pre-generated templates and a variety of tools and interfaces help facilitate these objectives.

As used herein, the term "platform user," unless otherwise specified may include mobile marketing platform users such as campaign designers, editors, managers (including account and campaign managers), operators or other users involved in the creation, editing, submission, approval, budgeting, execution, and reporting of the campaign.

Available templates for possible use with a given platform of the invention are proven, tested, easy to understand and successful. By changing the parameters, a platform user can generate thousands of potential campaigns. Templates help the non-expert user quickly design a specific campaign. For example, to set up a "Text to Win Treasure Hunt" a user need only set up the messages and the copy text that will result in a preconfigured approved campaign. Accordingly, the invention helps automate the mobile advertising business such that campaigns can be generated, budgeted, implemented, and analyzed using a few keystrokes and mouse clicks.

Alternatively to utilizing templates, the platform user has the ability to go beyond templates and create a custom campaign without the constraints of pre-generated activities, metrics, and reports. The new custom campaign will be supported by the planning and reporting functionality. As a result, the tools and platforms described herein add value to all forms of mobile advertising.

By incorporating a plurality of campaign templates that model marketing and advertising activities, the mobile marketing platform enables the design and launch of campaigns in hours rather than weeks, with significant cost savings. Each embodiment includes advanced proprietary technology, powerful reporting tools and performance indicators, for use by major mobile operators, advertising agencies, enterprises and brand owners. These embodiments and aspects of the invention enable the rapid and cost effective creation of permission-based ('opt in'), multi-level mobile marketing campaigns including full cycle campaign planning, execution and monitoring across mobile marketing, advertising and content delivery activities. Further examples of mobile marketing activities included in some embodiments include: location aware and proximity solutions, retail coupon based marketing, inventory and traffic alerts, user generated content applications and virtual world to mobile interactions.

The different platform, system, and method embodiments disclosed herein enable an advertising agency to easily manage and run multi-level mobile marketing campaigns. With a user-friendly interface, powerful software based tools, and a comprehensive menu of mobile marketing tools, every step in the process—planning, design and execution, as well as reporting is addressed.

The mobile marketing platform solution manages the full cycle of planning, executing and monitoring multiple activities across a campaign as well as multiple campaigns at the same time. These activities have been automated into more than sixty ready to consume template activities that model both advertising and marketing activities.

Advertising activities are enabled in a way that can address all the existing operator portal and third party mobile advertising marketplaces making them suitable for an advertising agency to drive volume easily and transparently. Below-the-line activities are even more important as they provide truly differentiating marketing capabilities to ad agencies that go beyond the usual commoditized, low margin, banner ad buying. In general, different platform embodiments can include three cooperating modules. Specifically, a given platform implementation in various embodiments includes a planning module, an execution module (for both mobile marketing and advertising activities), and a reporting module. In addition, different methods and platforms are implemented using a technical architecture that includes different components. These components include a core engine (back end), one or more mobile activities templates, and a user interface (front end).

Turning now to FIG. 1, some of the modules of a mobile marketing platform embodiment 100 are depicted. A main mobile marketing platform module 101 serves as the umbrella module to interface, oversee and direct the underlying modules within the system. A planning module 102 allows the platform user to perform a plurality of functions associated with the initial procedures of an advertising or marketing campaign. The planning module 102 includes functionalities for setting a budget and campaign objectives 105, creating and editing a campaign 106. Activities associated with creating and editing a campaign may include defining a new campaign 113, defining certain campaign activities 114, submitting the campaign to a manager 115, and giving and receiving approval 116 of the campaign as deigned.

An execution module 103 is responsible for the operation and execution of the details of the campaign. This module 103 works with an activities creation module 108 in one embodiment. Within the execution module 103, a platform user may create configure the activities approved in the planning stage as well as define new activities. According to one embodiment of the invention, an activities wizard 117 may be implemented to assist the platform user in a step-by-step process of creating and configuring activities. Additional details on activity creation and configuration are given below. In addition to the creation and configuration of activities, the execution module also contains operational tools 109 that carry out the details of the campaign. According to one embodiment described in detail below, a state machine 118 is implemented to execute the communication between the mobile marketing platform and the consumer, or consumer's mobile device.

A reporting module 104 provides the capability for a platform user to generate reports, statistics, metric analysis and other performance related activity associated with the campaign. Within the reporting module, the platform provides tools for advertising related positions as well as clients to monitor and track the progress of a campaign. An executive dashboard 110 may be used by account managers, campaign managers and other advertising professionals associated with the campaign to view reports at a brand level. A client dashboard 111 displays client-side information that allows a platform user to see and track campaigns on a client level. A campaign analytics tool 112 may be used to gather reported data from the campaign such as demographic profiles, task lists and other associated data.

A personalization module 107 is a services delivery framework for collecting, analyzing and organizing customer usage, demographic and behavioural data in order to dynamically assign customers into segments, which are consequently addressed by respective MMP activities. The personalization engine is integrated with marketing or advertising materials sent or displayed on a mobile device. The advertising content may be transmitted to a user via messaging services, such as SMS or MMS, or may be integrated mobile web pages viewed through a mobile device's browser (e.g., WAP sites, banners, etc). Further details of an embodiment of the personalization module are given below.

A Mobile CRM 119 module is included in one embodiment of the mobile marking platform. The Mobile CRM enables the formation of mobile communities, manages the interactivity with subscribers through broadcasts in order to enhance participation, and analyzes member behaviour accordingly. The Mobile Communities Manager provides the tools to analyze the community using different views, e.g. pie charts and graphs. The Mobile CRM, according to one embodiment, is an independent module that provides functionality across the mobile marketing platform. Further details of an embodiment of the Mobile CRM module are given below.

Figure 2:
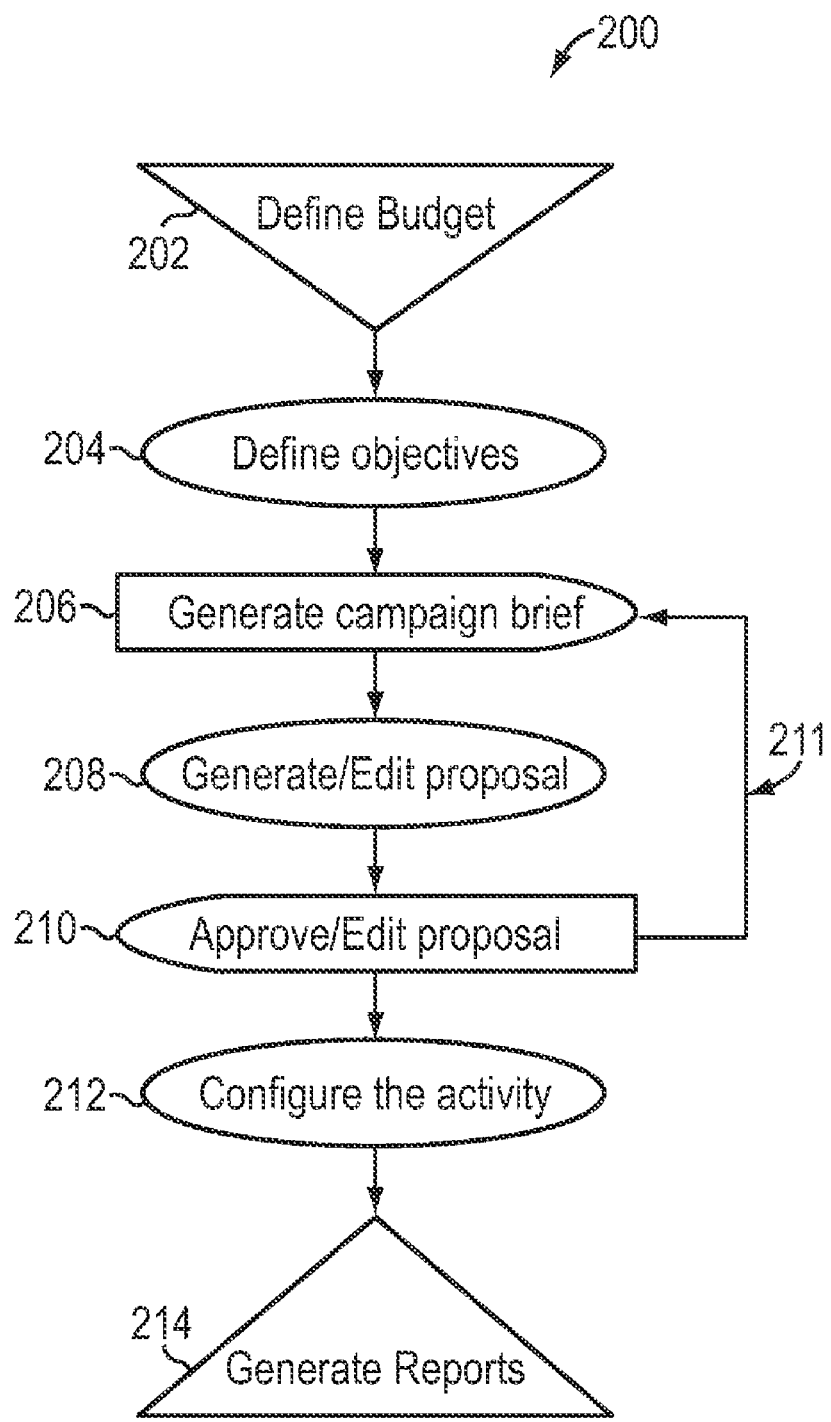
FIG. 2 is a flow chart depicting some of the steps associated with a mobile marketing campaign method in accordance with an embodiment of the invention.

FIG. 2 depicts a process flow 200 of the creation, execution and monitoring of a campaign in accordance with an embodiment of the invention. In general, in various embodiments the steps shown in FIG. 2 can be initiated or performed by any platform user. Initially, an account manager defines a budget 202. Next, the objectives that a particular brand wants to achieve via a mobile based advertising campaign are defined 204 by an account manager. A campaign brief that reflects the budget and the objectives as well as other desired features in the campaign is generated 206 by an account manager. In response to the brief, a campaign manager or campaign designer generates a proposal 208 for the campaign for review by the account manager. This proposal typically includes a plurality of activities that will be performed once the campaign is initiated. Once the account manager receives the proposal, he can approve it or edit it 210. This portion of the process flow can operate as a loop 211 such that edits to the proposal are returned to the campaign manager who then revise the proposal and resend the revised proposal back to the account manager for approval. The review and editing of a proposal 210 by an account manager can be performed at the campaign level and at the individual activities level that make up a given campaign. Once the campaign has been approved, the campaign designer configures the activities 212 and the campaign is executed. However, in some embodiments, some individual activities can be initiated while other activities are undergoing review and approval. Finally, once the campaign is running, the account manager can generate reports 214 to audit and otherwise evaluate the success of a given campaign or activity.

Figure 3:
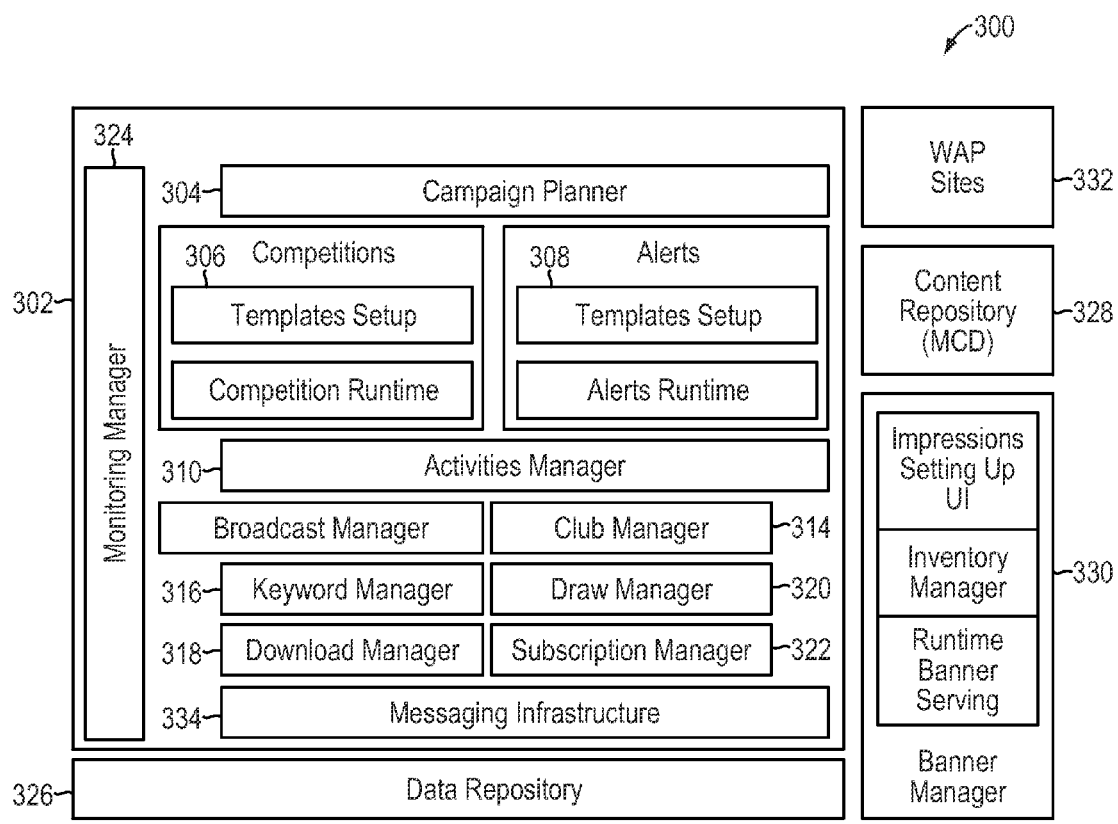
FIG. 3 is a diagram of the architecture of the mobile marketing platform in accordance with an embodiment of the invention.

Turning now to FIG. 3, a diagram 300 of the modular architecture of an embodiment of the mobile marketing platform is depicted. The mobile marketing platform is based on a plurality of infrastructure modules that include various algorithms, software, and data processing components. These modules provide a framework for the mobile marketing platform. The platform utilizes the Mobile Service Manager (MSM) 302. The MSM 302 is an application server for mobile applications that includes a set of subroutines that handle messages between the platform and the mobile devices. The MSM 302 includes the underlying I/O handlers, the database transaction manager abstraction layer, the XML web device independent user interface modules, and the state machine definition and execution runtime described below.

In addition, the MSM provides the infrastructure for the various components and modules to operate, including the campaign planner 304 which is responsible for planning mobile advertising and marketing activities, the promotions module 306 for setting up and executing SMS promotions, the Alerts module 308 which is responsible for setting up and executing SMS Alerts. An activities manager 310 contains and executes the defined activities of the campaign while a broadcast manager 312 is responsible for the broadcast of content that should be distributed to consumers of members of a targeted audience. A mobile club manager 314 module is responsible for the mobile community-based activities explained below. A keyword manager 316 does the handling of the keywords that mobile-users text to shortcodes as SMS messages. The download manager 318 is responsible for delivering the content to the mobile device. A draw manager 320 performs draws among participants in activities, and declares winners. A subscription manager 322 is responsible for managing the user profiles and subscriptions to various services. A monitoring manager 324 oversees, aggregates, and reports the data associated with the campaigns. A messaging infrastructure 334 is responsible for the SMS messaging capabilities of the MSM 302.

The MSM 302 interfaces with a data repository 326, such as a database, containing data associated with the campaign, such as advertising content files, consumer profile data, etc. A content repository 328 stores content used for the campaigns including images, sound, video, text, and binary files. It also provides a repository with mobile device capabilities such as rendering language, image size, supported file extensions that are used for the correct rendering of pages served to each specific mobile device. A banner manager 330 is responsible managing ad banners and their placement in external WAP sites, as well as serving the appropriate banner to WAP pages of such sites, when a request comes. The MSM 302 also interfaces with WAP sites 332 associated with or created by the campaigns, as described below.

Figure 4:
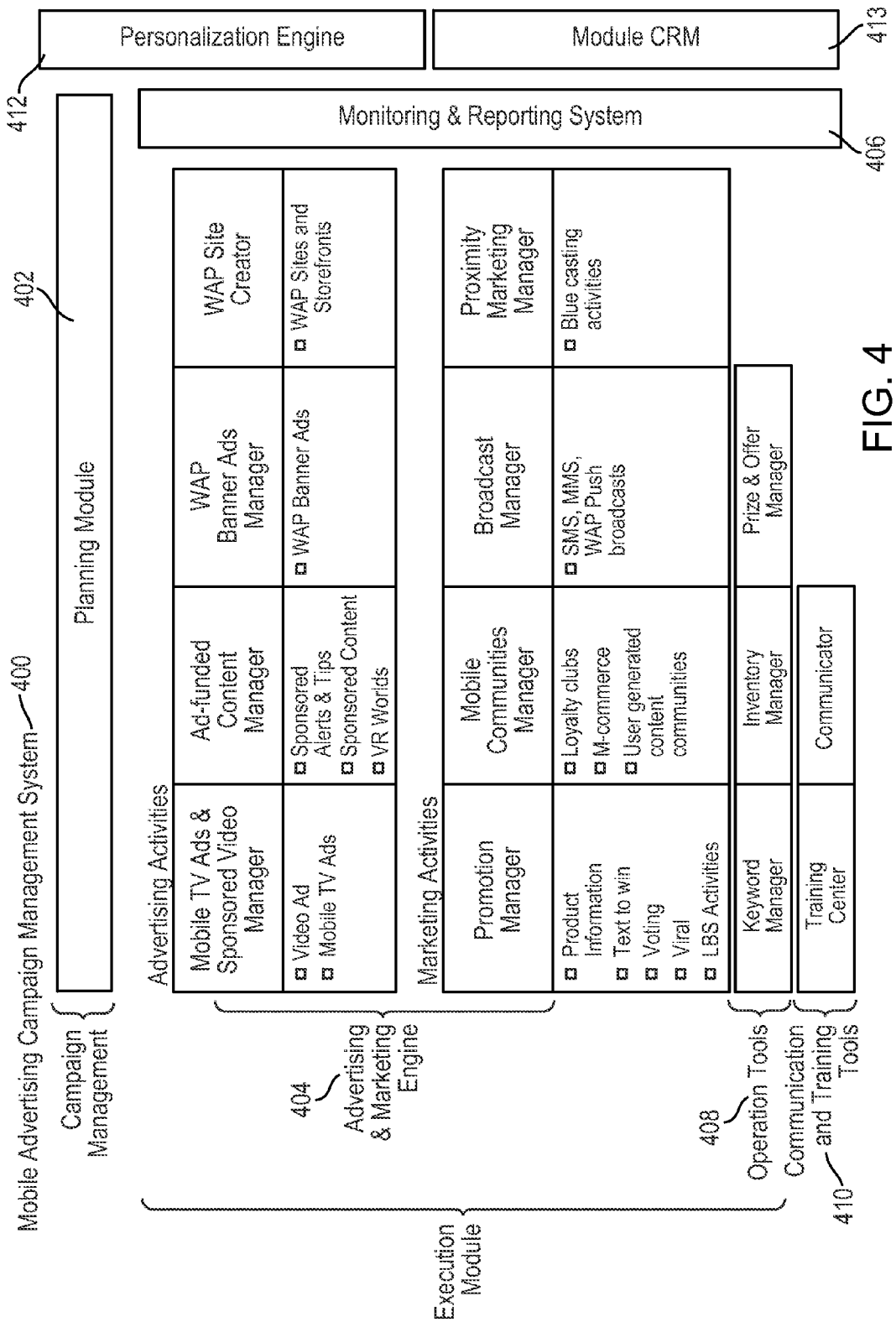
FIG. 4 is a diagram of the campaign management system in accordance with an embodiment of the present invention.

Turning now to FIG. 4, a mobile advertising campaign management system architecture 400 is shown. A campaign manager module 402 includes the functions and attributes, described above, required to manage the advertising campaign. Under the campaign manager are modules of the advertising and marketing engine 404. The modules associated with the advertising activities outlined above include, in one embodiment, mobile television ads and sponsored video manager, an advertising-funded content manager, a WAP banner and advertising manager, and Builder module. The management modules for the marketing activities include, in one embodiment, a promotion manager, a mobile communications manager, a broadcast manager, and a proximity marketing manager. A monitoring and reporting system 406 interfaces with all of the managers of the marketing and advertising manager in order to provide updates to the benchmarks, metrics and other data of interest to the campaign manager.

The management system further includes operations tools 408 to handle the operational tasks. Communication and training tools 410, including a training center and a communicator module are also part of the system. A personalization manager 412 spans the various layers of the management system to provide customized and targeted advertising to end-users. A Mobile CRM module 413 provides functionality for the creation of mobile communities, explained below.

The mobile marketing platform can engage customers with both advertising and marketing features by creating and running campaigns built by aggregating a plurality of activities. In general, campaigns can be built by using pre-generated templates or by creating unique custom activities. Different activities may be linked together to form a campaign, a marketing activity linked to an advertising activity for example. An exemplary process flow for the operation of a given platform embodiment is shown below.

While embodiments of the invention are described herein as part of a modular architecture, one skilled in the art should recognize that the structure of the functions, tools, and capabilities of the platform is merely exemplary and the functionality of the system may be combined or reconfigured into alternate architectures without deviating from the scope of the invention. The mobile marketing platform modules described above are explained below in greater detail.

The Planning Module

The planning module allows the advertiser to perform a variety of functions as part of an automated and graphic user interface platform. Specifically, one function associated with the planning module includes configuring a brand's advertising and marketing budget for mobile marketing activities. Further, the planning module facilitates associating high level objectives with the brand's mobile marketing strategy and ensuring that these are programmed within an allocated budget. In general, within the overall marketing and advertising platform, each objective is associated with a number of measurable metrics. Key performance indicators of the objectives are influenced by the performance of these metrics. In addition, the planning module helps design mobile marketing campaigns by defining the campaign schedule, the campaign advertising and marketing budget, the campaign objectives, the target group, and a selection of desired activities from the predefined templates. The amount allocated for the campaign budget is subtracted from the brand's overall budget, depending on the type of the campaigns' activities (advertising or marketing).

Budget and Objectives

An embodiment of the mobile marketing platform enables the advertiser to organize mobile marketing and advertising events (activities) as part of mobile marketing campaigns. Wizards allow the organization of campaigns by guiding the user to define the campaign schedule, the campaign advertising and marketing budget, the campaign objectives, the target group, and a selection of desired activities from predefined templates. The concept of a mobile marketing or advertising activity template is introduced: the users may use one or more templates as part of a campaign. Depending on the users skill set, the wizard allows for different levels of configuration detail. Configurable workflows allow for setting decision making gates at different campaign stages. Upon approval the execution of the campaign is automatic. The performance of the campaign is tracked at the campaign and the activity level and is measured using a metrics system. Metrics are directly associated with campaign objectives.

An embodiment of the mobile marketing platform enables the advertisers and marketers to manage a brand's budget available for mobile marketing activities via an easy to use interface. The budget is divided between advertising and marketing and is available to use for advertising and marketing activities, respectively. The advertisers can also associate measurable brand objectives they want to achieve by organizing mobile marketing campaigns using the allocated budget. The Account Manager has access to the budget view of the mobile marketing platform where he can set up the brand's budget for mobile marketing (marketing) and mobile advertising (advertising) via the platform.

The Account Manager allocates the available budget between advertising and marketing activities. The difference between the available and the allocated budget is that the available budget is the max budget that can be used for the campaign and the allocated is the proposed budget to be used for the campaign. The Account Manager is also offered the possibility to end and submit the brief after defining the general information, the objectives, the target group and the budget or to continue with the advertising and marketing planning (the planning of the campaign activities). Activities are the main elements of the campaign. The activities can be selected from a list of predetermined activity templates. Still, at this point they are optional and it is left to the discretion of the Account Manager to define them. All the other parameters, however, need to be defined in order to submit the brief in one embodiment. Thus, by using the described wizard, the Account Manager submits the campaign brief to the account manager for approval.

Figure 5A:
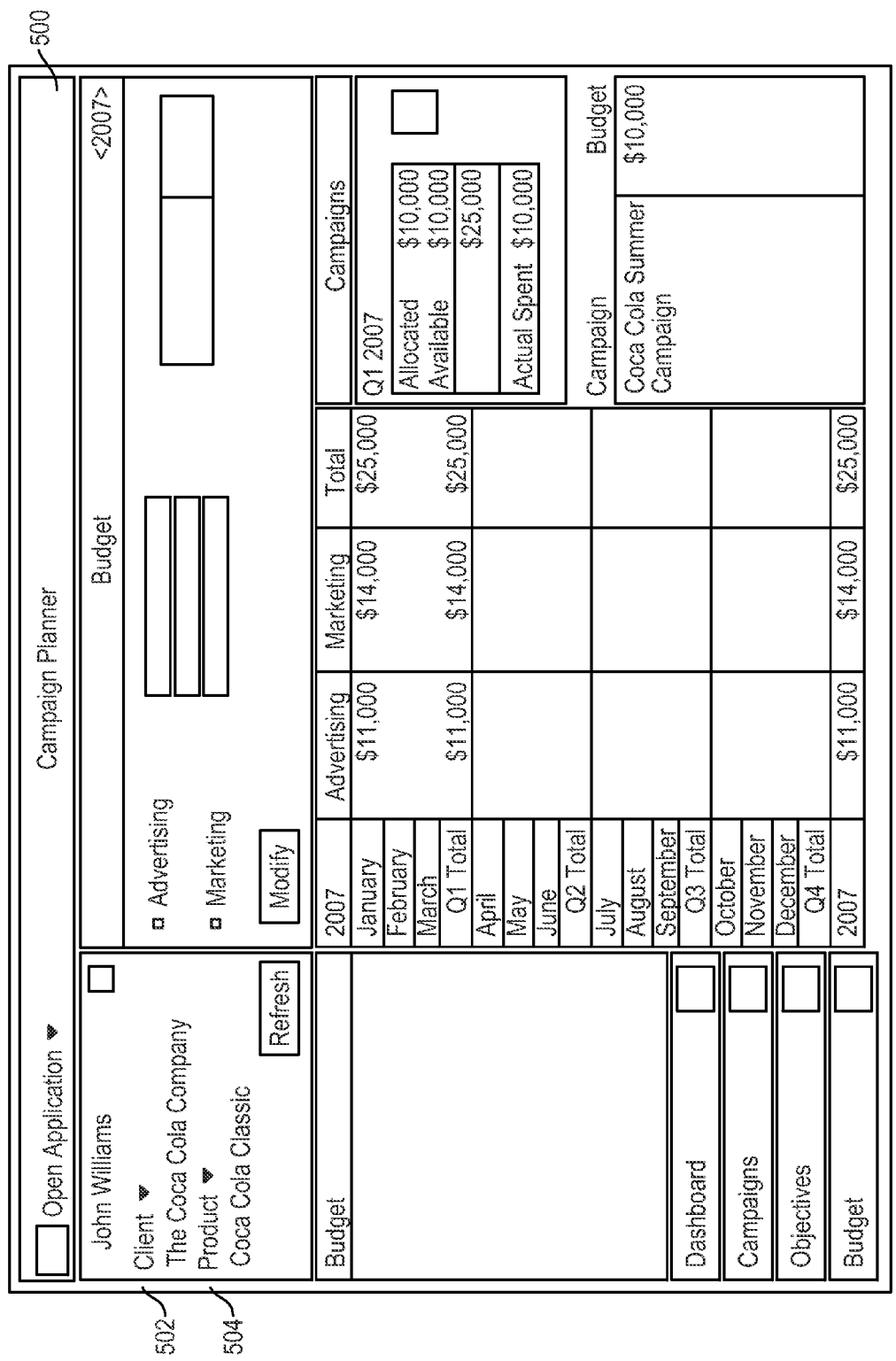

An embodiment of the user interface of the Budget View 500 shown in FIG. 5A permits the user, for example, the Account Manager, to define the client 502 and the product 504 and the advertising and marketing budget amounts on a monthly basis. The platform then calculates the total budget amounts, the amounts utilized and available and the distribution of amounts utilized over the various quarters.

Referring also to FIG. 5B, in one embodiment the quarterly totals are populated by entering data into a Budget Setup screen 510. Within this screen, the user can allocate money to various budget categories.

Figure 5C:

Referring to FIG. 5C, using the wizard, the account manager defines the budget information 530. The budget information 530 according to one embodiment may be allocated between the Advertising and Marketing categories.

The Account Manager then turns to the Objectives View screen 600 (FIG. 6A) to define the objectives 602 of the campaign. By defining the objectives 602, the system can measure how closely the campaign objectives are met. Thus, the mobile marketing platform allows the advertisers and marketers to track the performance of a mobile marketing campaign and activities using a metrics system. Measurable performance metrics are associated with activities. The system allows the real time tracking of these metrics and their combination to provide different types of reports both as activity metrics and campaign metrics. Metrics can be grouped and associated with high level brand objectives.

The Account Manager proceeds with setting up the brand's objectives using the Objectives View 600. The brand's objectives are measured through predefined metrics. A platform user can use predefined objectives or set up new ones. Typically setting up the budget and objectives are the techniques for capturing functional requirements of business systems the Account Manager executes when an account for a new brand is initiated through the platform. Thus, in the objectives screen the Account Manager lists the objectives (for example "build awareness") and for a specific objective being shown the results 604 of the metric associated with that objective (for example "test drive requests") over time.

Figure 6B:

Referring also to FIG. 6B, the Account Manager also associates predefined objectives and corresponding metrics with a brand. Thus, the Account Manager can associate or disassociate a predefined objective to the brand and assign relevant metrics. The wizard also allows the Account Manager to create custom objectives measured by a selection of metrics. The Account Manager can add, edit or remove a custom objective from the brand. Upon pressing the modify button 608 the Account Manager can modify the brand objectives. By pressing the "Select from predefined" radio button 612, the Account Manager associates predefined objectives with the brand. By Pressing "Create New" 614 the Account Manager creates a custom objective.

Planning a New Campaign

Figure 7A:
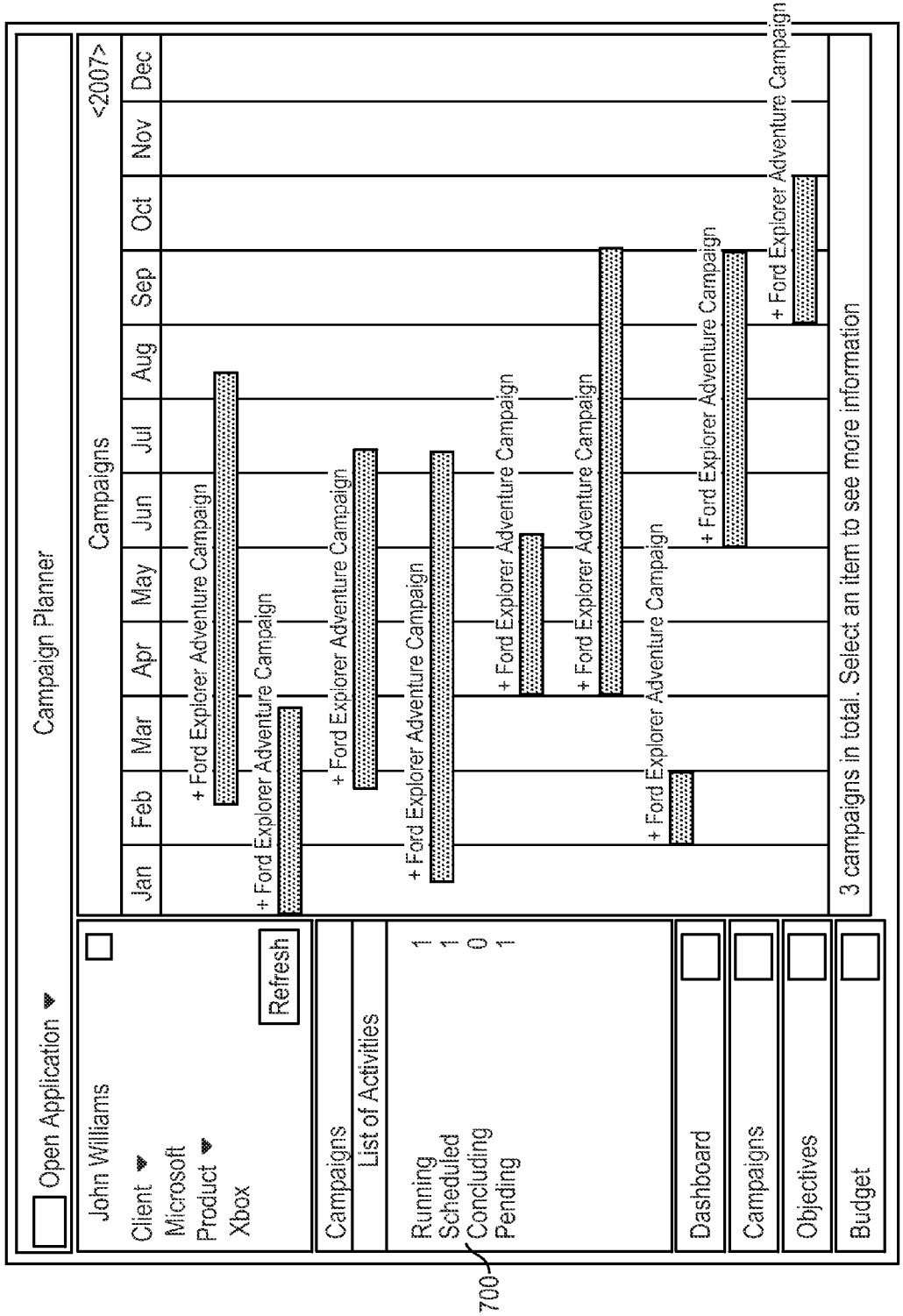

Once the objectives and the budget are defined, the Account Manager can send requests for proposals (Campaign Briefs) designated to the Campaign Designer. The campaigns are accessed via the "Campaigns" view 700, shown in FIG. 7A, and the Briefs are generated by running the Submit Campaign Brief function. In the Campaigns View screen 700, a Gant chart of active campaigns is displayed. The chart shows the start and end dates of the various campaigns for a given client.

Thus, for planning a new campaign the Account Manager submits a campaign brief, to the Campaign designer which he or she creates through the wizard. The Account Manager defines the general information about the campaign, including the budget and objectives, to form the campaign brief. The campaign brief includes a name specific to the campaign, a description that explains the features of the campaign and a schedule, with a valid start and end date. The Account Manager can also set up the objectives and the target group for the campaign. The objectives can be selected from a list of predefined objectives and at this point the Account Manager is not able to add other objectives except for the predefined objectives. The target group is defined from a predefined range for age, gender and income.

The brief attributes are populated through the use of a wizard. Using the wizard 720, (FIG. 7B), the account manager defines the campaign name 702, its description 704 and its start and end dates 706. The user next defines the objectives 708 of the campaign and the target audience via the Targeting View 730 (FIG. 7C). According to one embodiment, the target audience may be defined by a number of demographic attributes 710, such as gender, age and income. Other demographic attributes may used to define a target audience may include, without limitation, geographic location, ethnicity, nationality, education level, marital status, number of children, home ownership, car ownership, internet user from home, or internet user from office. The profile of user (with a unique identifier like a MSISDN), can be also updated with behavioral, purchasing and navigation attributes. Metrics for these categories include: Airtime per Request, Bytes per Request, Airtime per Session, Bytes per Session, Requests per Session, Session length, Sessions per month, Bytes per session, Average Click-Distance, Sequence (move through the portal), Accessed content categories per session, Number of requests per category, Location (Cell ID or longitude/latitude XY coordinates) when accessing certain portal sections, Number of downloads per category, Downloaded items, Number of streams per category, Streamed items, Search keywords. Some demographic attributes may be dynamically updated based on observed behavior and probabilistic modeling. For example, participation on a campaign titled "Beauty Tips" may result in probabilistic definition at certain values that the user is probably woman and in dynamically populating attribute segment fields such "Beauty Products Lovers". Similarly other demographic attributes may include, without limitation, "WAP user", "Java Gamer", "Mobile-TV fan.

Figure 7D:

Once the campaign setup is completed, the user can elect to send this brief as a request for proposal ("RFP") once the new campaign planning is complete. Once this has been decided, the Account Manager defines advertising and marketing activities from a set of templates 760 as shown in FIG. 7D. The creation of a new campaign is completed once the user has selected the campaign activities from the available templates.

Upon receipt of the campaign brief, the campaign designer generates a proposal to respond to the brief, by running the Submit Campaign Proposal. The cost and the details for each campaign activity are included in the proposal. The submission of the campaign proposal can be initiated even if there is no brief. In that case, the campaign designer initiates the campaign process.

Submitting The Campaign Proposal

The Campaign Designer views the Campaign Brief upon receipt from the Account Manager. The Campaign Designer can process the campaign parameters as set in the brief and respond with a campaign proposal for the Account Manager.

The Campaign Designer is able to review the general information of the campaign (name, description, and schedule). The Campaign Designer also selects activities to meet the objectives and budget set up by the Account Manager. Thus, using a similar wizard as the Account Manager, described above, the Campaign Designer views and updates the activities, if any, or defines new activities. Again, the activities can be selected from a list of predetermined activities common for all campaigns. The main difference though is that the Campaign Designer is allowed to process the activities and set up a name specific to each activity, a description that explains the features of the activity (such as those closest in time), a schedule with a valid start and end date and a cost, or a portion of the allocated budget. Furthermore, the Campaign Designer defines the metrics for measurement of the success of the activity and the targets for each metric.

Thus, by using the wizard, the campaign designer submits the campaign proposal and at this point the campaign enters the design stage and is pending upon approval by the Account Manager. The campaign proposal may include the activity list, the name of the activity, a description of the activity, the schedule for the activity, the cost of the activity, as well as any metrics and targets associated with the activity.

Figure 8A:
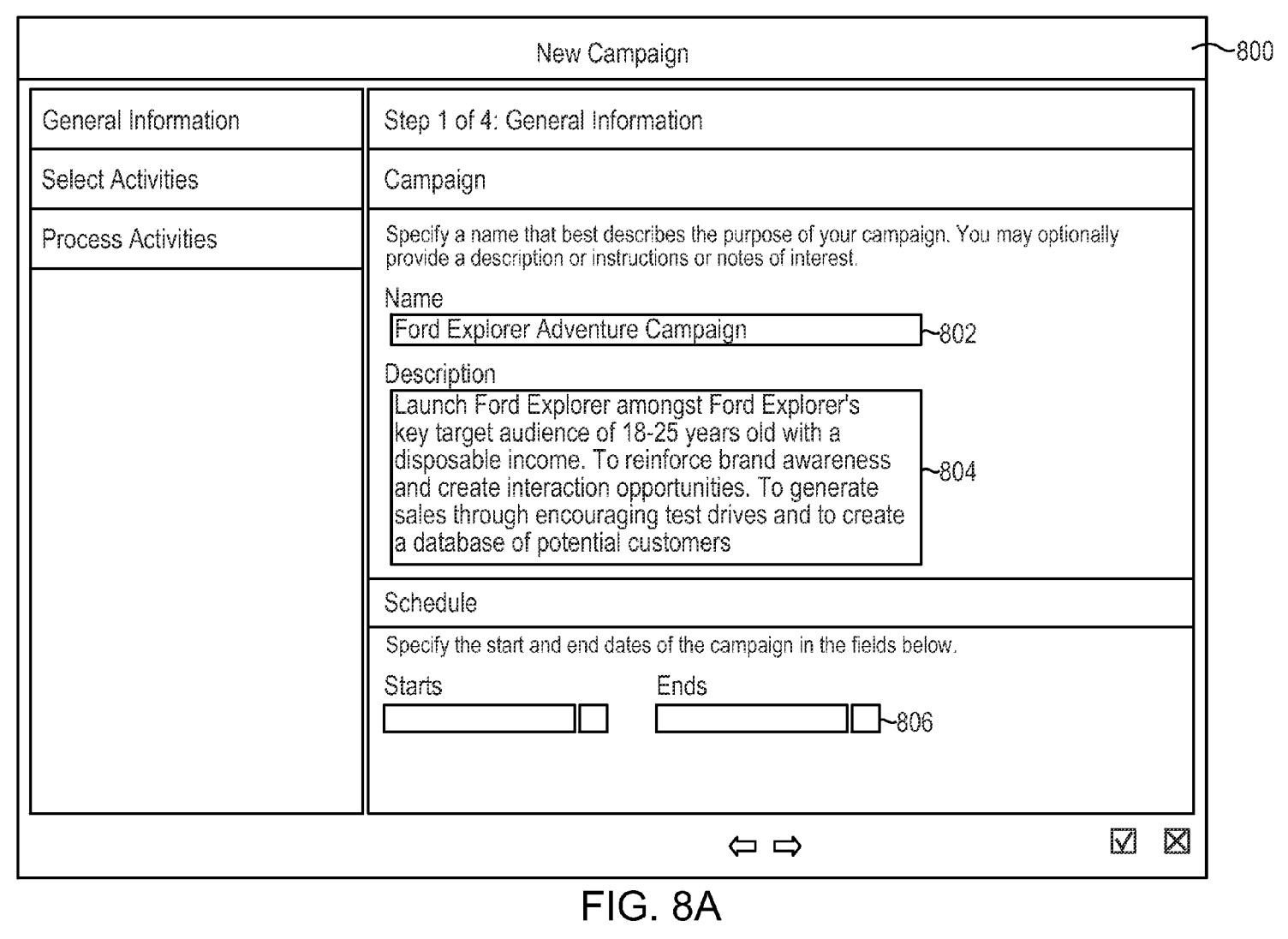
Figure 8B:
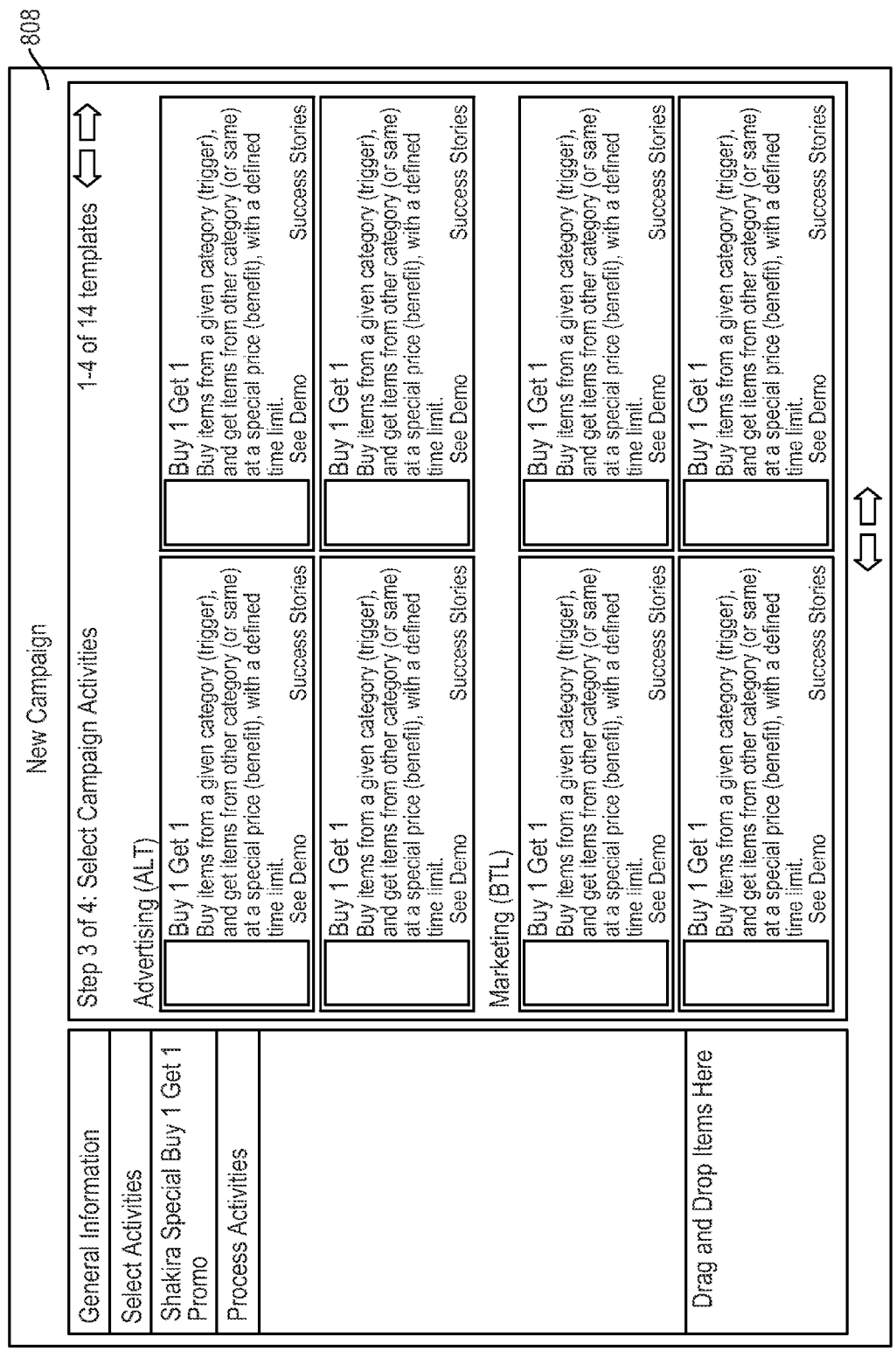
Figure 8C:
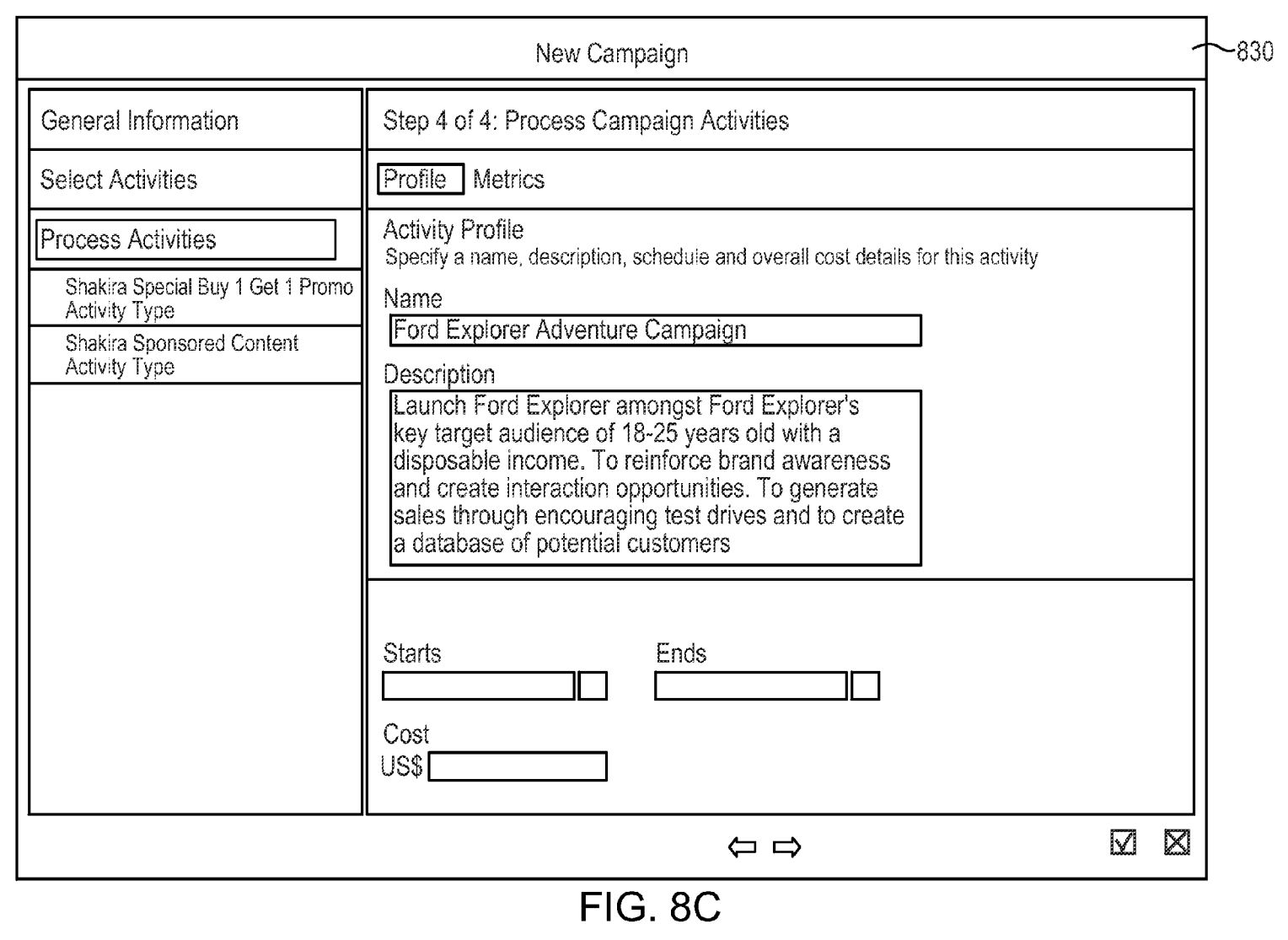

The campaign designer may generate a new campaign 800 (FIG. 8A) by defining the campaign name 802, campaign proposal description 804 and start and end dates 806. Then the user selects activities from a set of activity templates 808 (FIG. 8B); define activities (cost, description and metric targets) 830 (FIG. 8C) and metrics 840 (FIG. 8D). Once completed the entries may be edited or saved.

Approve Campaign Proposal

The Account Manager receives the campaign proposal as set up by the campaign designer. At this stage, the Account Manager can view or edit the campaign proposal. At this point the campaign is still in the Design stage.

Upon selection of the "View campaign proposal" button 902 in the Campaign Planner 900 (FIG. 9) the Account Manager views the list of campaign activities. At this point, the Account Manager has an overview of all parameters of the campaign and can choose to accept or reject all of the activities. The Account Manager reviews the Campaign Proposal submitted from the campaign designer and approves/rejects the different activities. If the Account Manager chooses to accept all of the activities, then the campaign is approved. On the other hand if all of the activities are rejected, then the whole campaign is canceled.

The Account Manager can also select a specific activity, preview the information related to the activity 1000 (FIG. 10) and can choose to confirm or cancel the activity. If he rejects an activity he may add a comment on his action. At this point in time, some of the activities are approved, and some are still pending approval. The Campaign designer then edits the proposal, taking into consideration the Account Managers comments (by executing the Edit Campaign Proposal) and the proposal is then returned to the Account Manager for approval.

The Account Manager can also choose at this point to cancel all activities and thus cancel the whole campaign.

Personalization Module

According to an embodiment of the invention a personalization engine (FIG. 1) is included as an additional feature of the mobile marketing platform. According to one embodiment the personalization engine is featured as a stand-alone module of the MMP, however alternative configurations may be implemented in which the personalization engine may be organized as part of the execution module or the planning module. The exemplary location of the personalization module, as shown in FIG. 1, within the architecture of the MMP should not be limited to the illustrative examples described herein.

The personalization engine is a services delivery framework for collecting, analyzing and organizing customer usage, demographic and behavioural data in order to dynamically assign customers into segments, which are consequently addressed by respective MMP activities. The personalization engine is integrated with marketing or advertising materials sent or displayed on a mobile device. The advertising content may be transmitted to a user via messaging services, such as SMS or MMS, or may be integrated mobile web pages viewed through a mobile device's browser (e.g., WAP sites, banners, etc).

Figure 11:
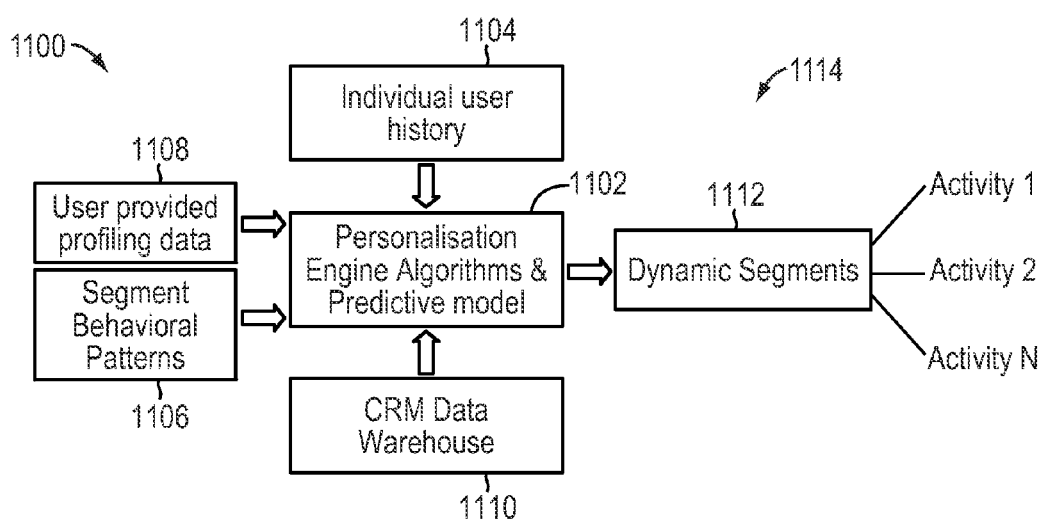
FIG. 11 is a flow diagram of a personalization engine according to an embodiment of the present invention.

Turning to FIG. 11, a high-level flow diagram 1100 of a personalization engine module is shown. According to one embodiment, the mobile marketing platform personalization module 1102 collects profiling data from user declared responses 1104, analyses individual user behavioural patterns from past activities 1106, compares with like-minded users preferences 1108, analyzes external data provided by customer data warehouse, CRM or Billing systems, weights contextual factors 1110 and organizes customers into dynamic segments 1112 that are addressed real time by campaign activities 1114.

The personalization module interacts across all marketing and advertising activities for both data gathering and addressing appropriate end-users for the campaign objectives. The personalization engine includes many attributes to enhance targeted delivery of advertising, including, but not limited to, sophisticated profiling and automatic segmentation of users, definition, immediate execution and management of targeted personalized offerings utilizing segmentation and profiling data, and automatic adaptation of the original navigation of a portal according to user behaviour.

The sophisticated profiling is achieved by analyzing collected data from multiple systems for each individual, segment, content, service or promotion level. Further, through the use of sophisticated rules and proprietary profiling algorithms, the engine compiles an accurate profile for each individual user.

Figure 12:
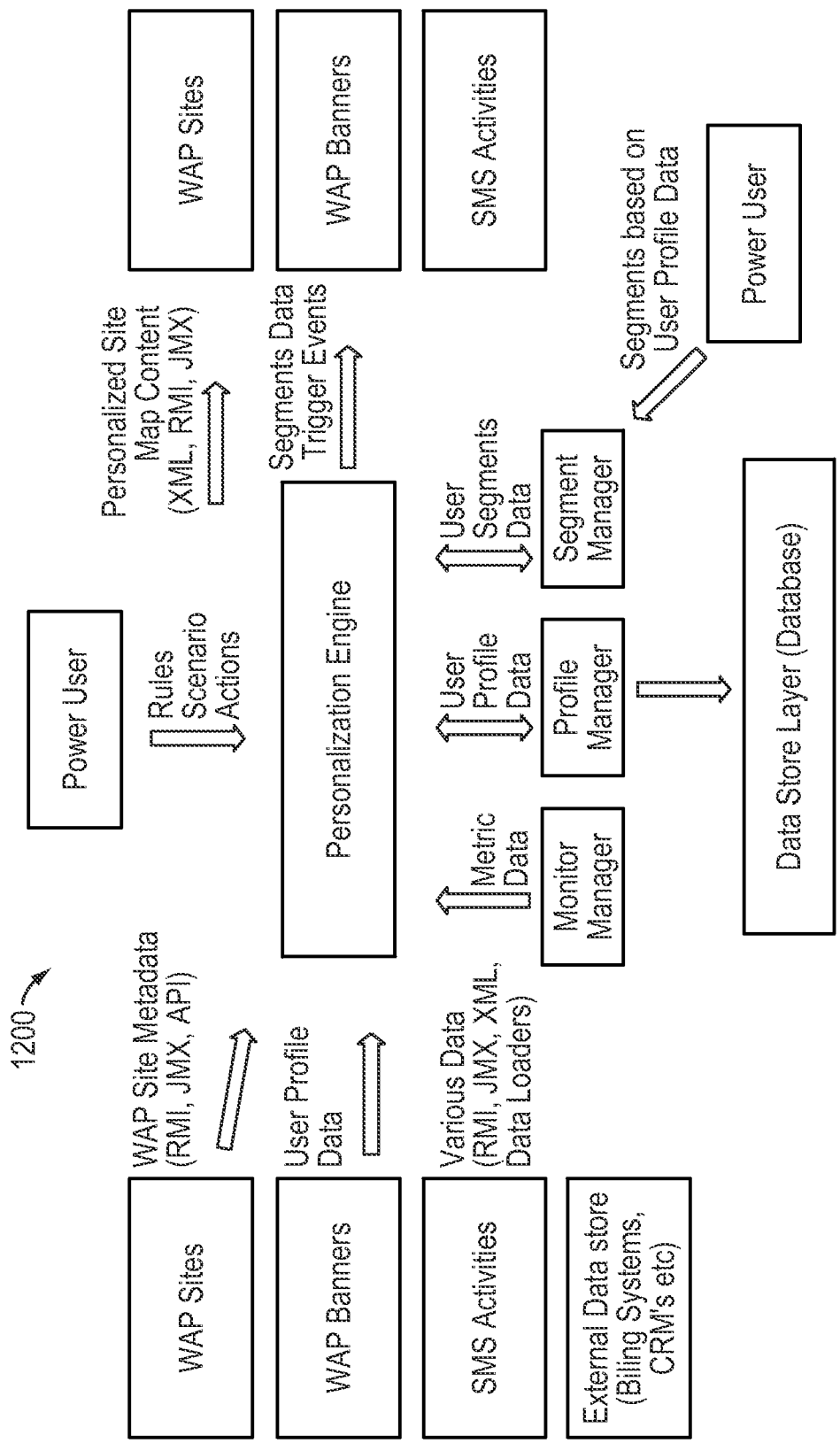
FIG. 12 is a block diagram depicting the components of a personalization engine in accordance with an embodiment of the invention.

A schematic 1200 of the personalization engine module is presented in FIG. 12. As depicted above, the personalization module, based on a set of pre-defined personalization algorithms, interacts with a set of auxiliary modules and creates adaptive user profiles and user segments and also triggers specific actions based on predefined scenarios. Components of one embodiment of the personalization engine module include a user interface that provides tools for adding attribute based rules and scenarios with actions, and a set of Java (RMI, JMS) and XML API's for receiving any kind of user related data. Data parsers can be implemented per case for transforming these data to the appropriate format. The personalization module also includes a set of Java (RMI, JMS) and XML API's for interacting with rendering engines and WAP sites whether local or remote. Through this API the engine retrieves WAP site metadata (site map, content info) and produces personalized content and layout. The API may be customized to cover special requirements concerning specific data and content format. The personalization engine module further includes a set of Java API's for interacting with Profile Manager, Segmentation Manager, Monitoring Manager and Activity Manager (described above). A core engine is also included that implements predefined personalisation algorithms and transforms plain user data to user profile and behavioural information. This information is forwarded to Profile Manager which is responsible for managing user profiles.

Once a customer has been profiled, a profiling manager automatically groups the customers, using automated clustering, into homogeneous groups for marketing analysis and targeted action. These "intelligent segments," driven by detailed customer-level data, are then used for campaign targeting. Automated clustering reveals meaningful groups of customers that the user might not have otherwise identified via manual segmentation.

According to one embodiment, there are several rules a personalization engine implements in order to achieve its goal of delivering relevant ads at a time when end users are most receptive and via the most advantageous communication interface (i.e., WAP, WEB, SMS, MMS, Bluetooth etc.). One example of such a rule states that when a user finds something interesting the viewing session or period of interaction lasts at least one more click. The more times the end user clicks, the longer the average session lasts.

The core of the mobile marketing platform personalization engine lies in the coding of the algorithms derived from statistical model(s). The implementation coexists in the production environment and is fast enough to return results within an acceptable time frame. When integrating personalization with a complete value-added service ("VAS") system, the mobile marketing platform personalization module uses data mining technology to sift through the data generated from customers' clicks, transactions, demographics, and ratings data gathered from other services. The engine obtains scores which can be executed in real-time or batch mode. The calculation of scores eliminates the need to keep a history for the users in the personalization engine that could make storage requirements grow exponentially. Each service (WAP site, SMS center, MMS center etc.) keeps the relevant data (database, log files, etc) in place where the historical data belongs and the personalization engine computes the information calculating the scores per service, content, etc. Recommendation engines serve the personalization's real-time recommendations to any service.

The personalization engine, according to one embodiment, fits into a network as it has an API that interfaces with standard technologies. Many external systems such as messaging systems fail to provide a native support capability for other systems integration. Apart from a scores retrieval API, there is a "collectors" API that is integrates external sources of any kind of feeds. Therefore, so-called "wrappers" are developed. These are the integration points with the operator's network. Normally the wrappers co-exist in a service oriented architecture ("SOA") environment. The wrappers translate the native format of the external system and provide an interface for other systems to interface with the messaging system. The wrappers can import the data in real time or in a batch job (weekly, daily, etc.) based on the business logic or the infrastructure setup of the system. Normally the external systems import the data to be processed on a second node of the personalisation engine module to avoid degradation of the response throughput of real time system.

FIG. 13 depicts a visual display 1300 presented to a campaign manager utilizing the mobile marketing platform including a personalization engine according to one embodiment. A segment editor allows the campaign designer to specify the target segment by selecting certain categories that can restrict the marketing campaign to a demographic. Age groups, gender, income levels, region, ethnicity marital status, number of children, home ownership, car ownership and interne usage are examples of certain criteria a campaign designer may use to define the targeted audience. The campaign designer can select one or more of the given criteria to create a targeted audience for the campaign.

In various embodiments, different methods and algorithms for calculating the distances of the targeted attributes set by the media buyers and operators, relative to the attributes in user profiles, can be used for defining targeted users. In one embodiment, methods based on the Weighted Normalised Euclidean distance are used. Distances can take values between zero and infinity. In one embodiment, the targeted set of attributes which exactly matches the respective attributes included in the relational profile database has distance 0.0, while the least similar variable has the largest distance up to infinity. In cases in which there are absolutely no matches with any one of the attribute columns, other features are calculated for presentation of relevant ads. For example, a generic banner, a house-banner or a banner in the same context with the page is presented.

In one embodiment, the user attribute matching procedure is as follows. For all existing attributes in the user profile a comparison with the targeted criteria is applied. The sum of the least distances is returned. Non-matching variables which have infinite ($+\infty$) distance are not calculated at all. If an exact match to all attributes is found (distance=0.0) then these are prioritized at the top of the list which define the dynamic segment. The rest of the matches are ranked based on the least distance. If for some reasons (e.g. limit the list of MSISDNs) the designer or the media buyer wishes to assign smaller importance in some variables, then a weight (which is less than one) is multiplied by the distance in that attribute. Therefore, when calculating the sum of distances, this lesser importance is reflected in the total by the weighing parameter reducing the significance of some variables of interest. If no weight is specified then the multiplier is assumed to be one and equal for all targeted attributes. Conversely, a weight greater than one can be used to emphasize certain variables of interest in one embodiment of the user matching procedure. The Euclidean distance between the targeted attributes and the profile is described by the following expression:

$$d(x, y) = \sqrt{\sum_{i=1}^{y} \left(\frac{x_i - y_i}{\sigma_i}\right)^2 w_i}$$

where $x=(x_1, \ldots, x_i)$ is the targeted attribute the relevant module uses to make a comparison, $y=(y_1, \ldots, y_i)$ is the attribute in users profile, $i=1 \ldots, n$ the number of attributes, and $w_i$ the weight for the i-th attribute. Therefore, $x_i$ is the value for targeted attribute i, $y_i$ is the profile value for attribute i, $\sigma_i$ and is the standard deviation of attribute i.

In turn, the expression for calculating standard deviation is $$\sigma = \sqrt{\frac{1}{N} \sum_{i=1}^{N} ((x_i - \bar{x}))^2}$$

With respect to the standard deviation, N is the number of possible values, $x_i$ corresponds to each discrete attribute value and $\bar{x}$ is the mean of attribute's values. The reason that standard deviation is used is because a common scale for all attributes values is required in order to make them comparable with each other. For example, attributes can have ranges in the order of multiple thousands (e.g. income) while other attributes have ranges in the order of 1 to 99 (e.g. age). Without normalizing those using standard deviation procedures, the values are not comparable. Finally, in one preferred embodiment, values are normalized to the range [0.0, 1.0] by dividing each Euclidean distance by the maximum of all the Euclidean distances.

According to an embodiment, an example of a personalisation algorithm is a half-life algorithm that calculates a score of a visit based on the time and date. In general, the half-life algorithm guarantees that the aging of a visit will take place in exactly the same way regardless of the time and date of the visit. It works based on the interval of the time from the last accessed time and the previous score.

$$\text{score} = \frac{pscore}{(now - laccessed)^2 / halflife} + inc \qquad \text{(Eq. 1)}$$

The equation (Eq. 1) states that the score equals the previous score (pscore) divided by the difference of the current time (now) and the last accessed time (laccessed) squared, divided by the half-life value (that can be configured based on item type) plus of the increment value (inc) (that can be configured based on item type).

Figure 14:
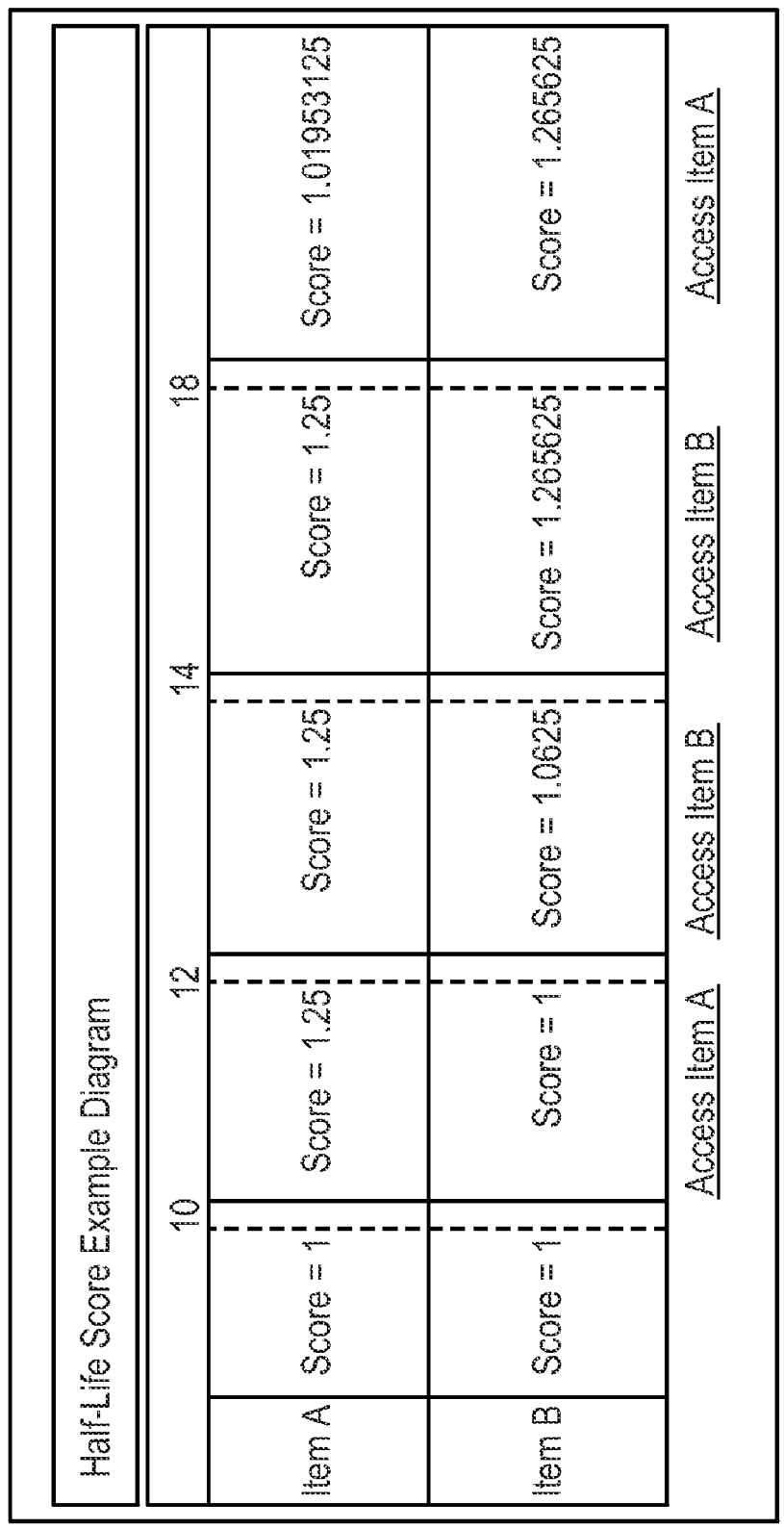
FIG. 14 is a diagram of a half-life score example in accordance with an embodiment of the present invention.

To further illustrate the formula as an example and illustrated in FIG. 14, assume two items A and B exist. Suppose that the items are links in a portal and the items need to be reordered based on usage in a page. This example assumes a simple time frame from 1 to 18. An entry time point of the two items must also be defined. Supposing item A has been accessed on time 10 and then on time 18 while item B has been accessed on time 12 and then on time 14. Based on the Eq. 1 the scores of the item will be:

Time 10→A has score of 1.25
Time 12→B has score of 1.0625
Time 14→B has score of 1.265625
Time 18→A has score of 1.01953125

Higher scores signify more usage. As seen in the example, the scores state that more frequent usage of an item gives higher scores. When the page rendered at time 19 the links will be arranged according to the scores. The fact that the half-life and the increment value can be based on the type of the items, signify that different scores exist based on the items and how they are rated.

One advantage of this type of algorithm is that the personalization engine maintains only records of the items that are accessed and does not keep the history of every item that could lead to the exponential growth of the storage database. Further, the calculation (and the data mining) takes place when registering the item itself in the background, and not on demand that would lead to delays in the response of the request.

The use of realms further expands the efficacy and usefulness of the personalization engine. As used herein, a realm is defined as an area/section in which a user's activity is monitored and evaluated by the personalization engine. A realm provides the ability to distinguish items based on types. For instance, an item that translates into downloadable item, such as WAP usage, etc. may be of interest. The data mining process identifies the item, based on rules attached to it, and feeds the personalisation engine with the data. As a further example, a "usage type" realm could be introduced in order to keep track the usage of a user. The items to be tracked could be "SMS," "voice," "WAP." Based on the scores of the items within the realm the system can find out the behaviour of the user in combination with the Profile Manager that will use the personalisation engine.

Another illustrative example case concerns a customer who's MSISDN is registered in the name of a female mother with 45 years old age. Nevertheless, the actual user of the phone is a young boy with age 18 years old. The actual user while browsing the operator's portal is never clicking on banners advertising products for that demographic (e.g., beauty tips, parenting, etc.). Instead, the user is clicking on banners typically associated with a younger male demographic (e.g., music, sports, etc.). The personalisation engine collecting data based on this activity may re-associate the MSISDN to segments of age-group of 18-24, music fans, and sport fans. In subsequent campaigns the banner ads that will be displayed to this user will concern music and sports (and NOT beauty), therefore the appeal of the ads, and ultimately the likelihood of a purchase is maximised, generating the maximum impact for both the media buyer and the end-user who is receiving ads relevant to his interests/needs. For a broadcasting SMS activity (i.e. sending advertisements via SMS to a mobile telephone), the user will be eligible to receive ads relevant to his previously tracked activity or to like-minded users.

Continuing the above scenario, suppose the same phone/MSISDN is now used by the mother to participate in an SMS Text-to-Win competition. She is presented with the option to respond with her profiling data and receive more points and free content. As soon as the end-user sends her profiling data, the MSISDN is dynamically re-associated to the appropriate market segment at once. In this case the user declared attributes have higher weight in the personalization module algorithms.

The Execution Module

The execution module allows the platform user to perform a variety of tasks. For example, representative tasks include, but are not limited to designing campaigns and operating campaigns. Specifically, the execution module of the platform facilitates the design of mobile marketing campaigns. This objective is achieved by using a series of execution tools that are tailored to meet the advertisers' requirements. Similarly, once designed, the execution module provides a set of operational tools that can be used to operate a mobile marketing campaign.

Configure Campaign Activity

For those activities that have been approved by the Account Manager, the campaign designer can proceed with the configuration of that activity, using the corresponding configuration tool. For most of the activities, the configuration tool is a wizard, as described above.

Figure 15:
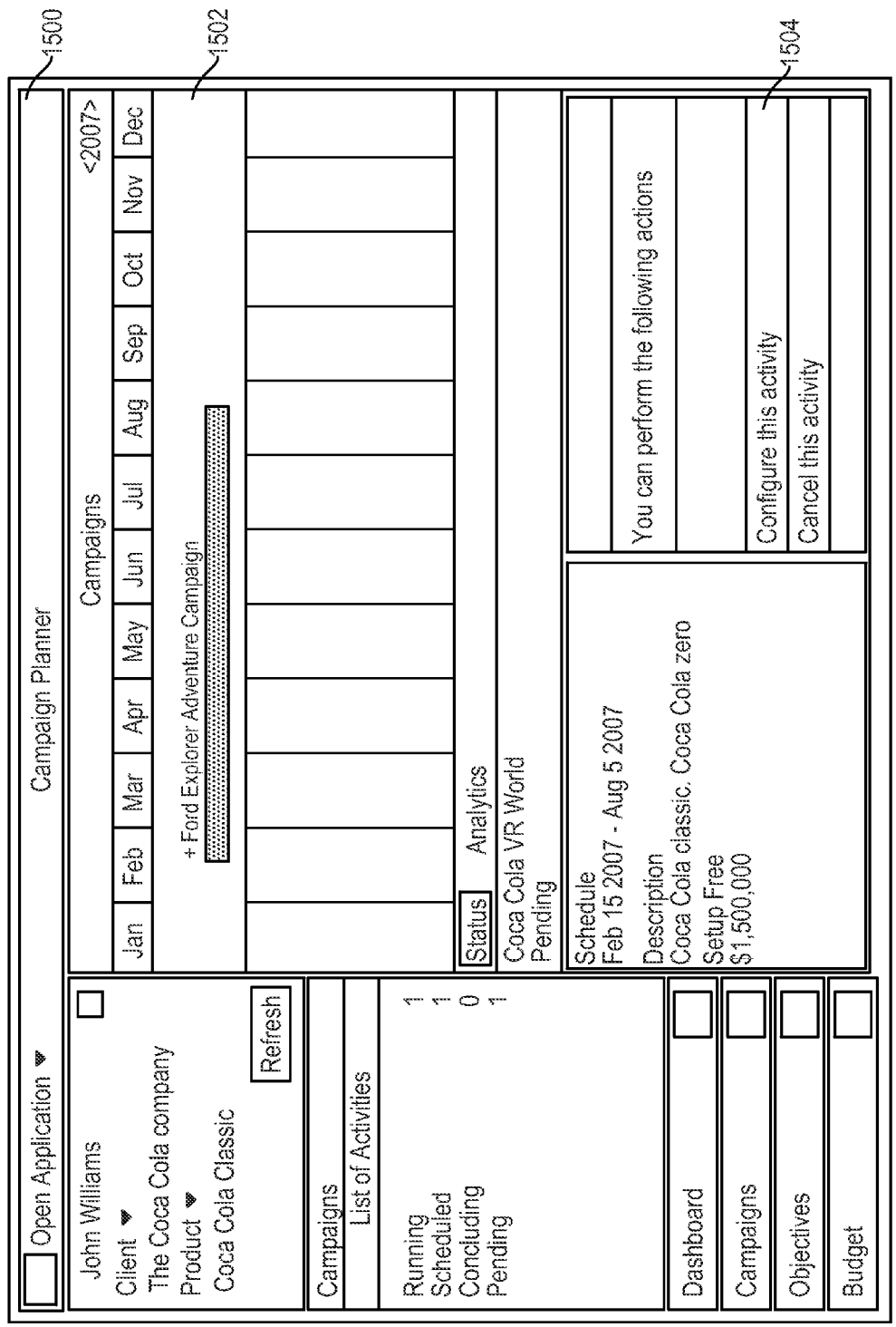
FIG. 15 depicts a visual display of a campaign designer in accordance with an embodiment of the invention.

When viewing the campaign planner 1500, as depicted in FIG. 15, the platform user can choose to configure specific activities that have been already approved by the Account Manager, as described above. By highlighting the activity 1502 and pressing the "Configure this activity" button 1504 (FIG. 15) the platform user enters the specific wizard for the activity. As detailed above, selection of activities and some configuration of activities may be completed by the campaign designer in the planning stages. The set-up and configuration process is similar for both regardless of the stage of the campaign.

Figure 16A:

FIGS. 16A-C depict various displays presented to the campaign designer as he steps through the wizard. The parameters and elements of the wizard are not general and are activity specific. For example, the wizard for a "Text to Win" activity, a contest in which a sweepstakes or other contest offer may be sent to a user via short messaging service ("SMS") asking the consumer to respond to the SMS to become eligible to win a prize, allows the campaign designer to define the General Information of the activity. For each campaign that includes this activity the campaign designer can define the number of attributes including: the name of the activity 1602, the start 1604 and end 1606 dates, a service name 1608, a short code address 1610, keywords 1612 and a STOP/HELP message 1614.

Furthermore, according to one embodiment, the campaign designer can define the functional characteristics (FIGS. 16B, 16C) of an "Instant Win" competition represented by the following attributes: name 1602, custom defined prize 1615, frequency 1616, and number of winners 1618, winning message 1620 and a "close-to-win" message 1622. These main elements of the activity define the flow and user interaction. Additionally, the wizard allows the input of a message for non-winners 1624.

Figure 17:
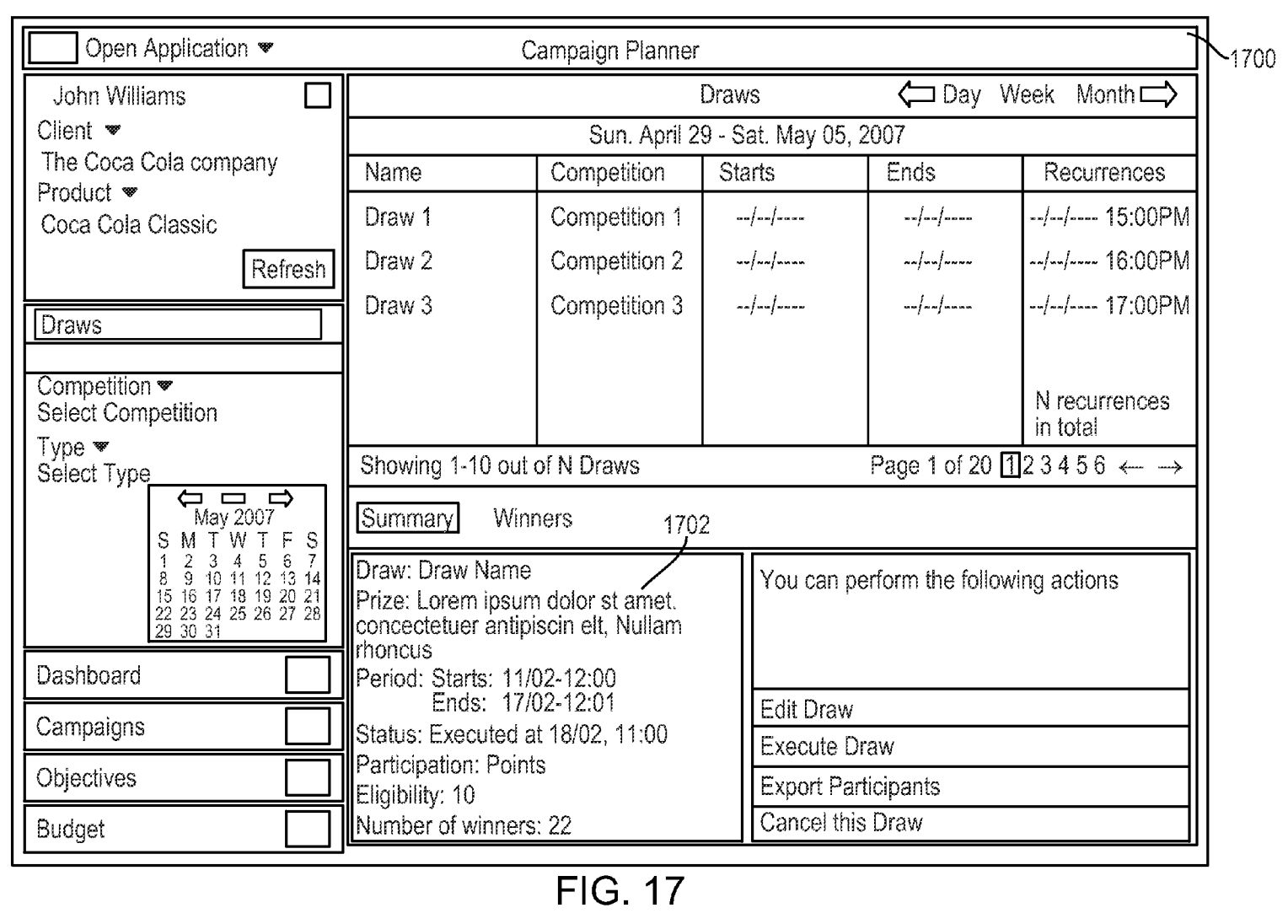

One example of a configured activity includes a Prize Manager Module (FIG. 17) that allows the campaign designer to award prizes by executing a series of draws. The campaign designer may define attributes 1702 including: the name of the drawing, the start and end dates, the prize, number of points need to participate and the total number of winners permitted.

While Instant Win and Prize Manager activities are described above, one skilled in the art should recognize that the specific activities depicted are merely examples and the scope of the invention should not be limited to these illustrative activities. Additional exemplary activities are listed in Appendix A below, however, other activities may be implemented without deviating from the scope of the invention.

Once the campaign designer has completed creating and configuring the activities designed for the campaign. The execution module relies on the operation tools included in the platform to activate the campaign and distribute the advertising and marketing content to the consumers.

Execution of Campaign Over Mobile Service

According to one embodiment, the mobile marketing platform executes the marketing campaign over a mobile service to consumers' mobile devices by communicating with the mobile device using SMS. SMS stands for Short Messaging System, and it is a text-only interaction which, unlike a rich user interface, is limited in user interaction capabilities because: 1) the amount of information presented to the user is limited (a typical SMS is around 160 chars); 2) the user is generally prompted with the available commands, which he/she cannot be expected to remember; and 3) the sporadic nature of the interaction makes holding long dialogs impractical. To overcome these problems, the mobile marketing platform, in one embodiment, utilizes a state machine as an operational tool to execute the campaign. The dialog between the user and the state machine essentially transitions each user of the mobile marketing platform between states of operation.

Certain applications of the mobile marketing platform, referred to herein as "TextApps" according to one embodiment, respond to text received from the user via SMS. As the text is received, a text matching algorithm is performed using one of three models: exact match; regular expression match; and approximate match.

Using either the exact match or the approximate match model allows for the possibility of matching a prefix of the input. In one embodiment, a prefix means a contiguous portion of the SMS text that starts from the first character of the text. For example, prefixes of the text "HELLO WORLD" can be "H", "HE", "HEL", "HELL", "HELLO", etc. In both an exact prefix match and a regular expression match, the match is ranked according to the percentage of the input it matched.

If both a regular expression match and an exact match occur in the same portion of the input, an exact match is always given priority.

Further, each TextApp in one embodiment is associated with a session timeout. After the timeout period expires, a user is moved to a global "start" state, regardless of the state in which he or she was in when the timeout occurred. A TextAppServer is configured with a base file system directory. Deploying a TextApp is as simple as creating a new directory in the TextAppServer containing a state machine description in the file 'statemachine.xml'. Undeploying a TextApp is accomplished by deleting the directory or renaming the 'statemachine.xml' file to something else. The state machine description is described in an XML document, which has to conform to a specific XML Schema Definition (XSD). As such, in one embodiment, state machines are files containing data in XML format that follow a specific syntax and structure. State machines can be created, for example, by using the StarUML™ open source program.

In one embodiment, each marketing campaign is provided as a series of states. Transitions between states occur when there is input from a user or because of an internal change to the system state (for example due to a timeout). Many campaigns have a set of similar states. For example, substantially all campaigns have a "Start" state and most require an "Enrollment" state. The platform transitions from a Start state to an Enrollment state when a mobile device user has indicated a desire to interact with the mobile marketing platform in some way (for example by accessing a URL). The Enrollment state requests enrollment information from the mobile device user and the user's response to the request becomes an event which causes a state transition (for example to a "Confirmation" state which confirms to the user that he or she in enrolled). The use of a state machine permits a runtime system to be built that is capable of functioning with an arbitrary number of users.

Figure 18:
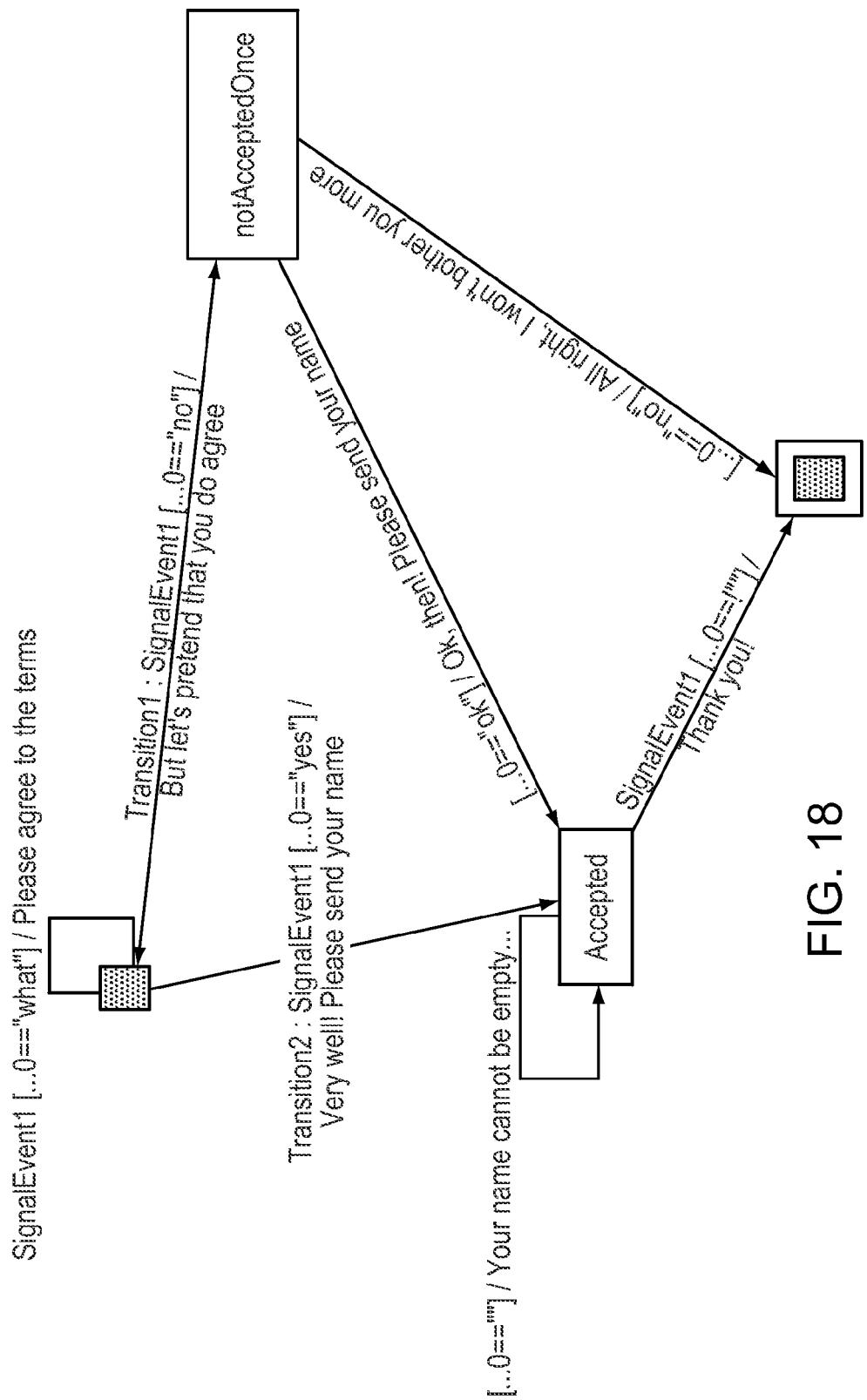
FIG. 18 is a diagram of a state machine in accordance with an embodiment of the present invention.

FIG. 18 shows an illustrative state machine in accordance with an embodiment of the invention in which the user input is solicited (0 signifies the user input). The state machine may include a set of actions (code) that may optionally be specified and executed by the platform when transiting states.

Scripted functionality is resolved according to a "resolver" component that may be handed over to the state machine for execution. This feature is used in the Mobile Service Manager ("MSM"), described above, to allow services to provide their different scripting functions to their text applications. BeanShell (BSH) scripts can also be listed inside a "script" element. These scripts define functions that can be used in Boolean guard and non-terminable action expressions. The following examples serve as an illustrative, informal example of what the format may resemble according to an embodiment of the invention. One example of global rules is as follows:

```
<at>
    <anystate/>
    <when>
        <input>CHAT</input>
        <guard>!isRegistered(msisdn)</guard>
        <transition>
            <state>acceptingTerms</state>
            <action>sms(msisdn, "Welcome to the chat service of
Vizzavi. To register, you must accept the terms and conditions
in www.vizzavi.gr. Please text ACCEPT to accept these")</action>
        </transition>
    </when>
```

```
    <when>
        <input>MATCH</input>
        <guard>isRegistered(msisdn)</guard>
        <action>sms(msisdn,"Your name is:"+name+" There are
"+mboxSz(msisdn)+" msgs in your maibox.\nCurrently there are
"+numberOfUsers( )+" users available for chatting!")</action>
    </when>
    ...
</at>
```

An example of local rules is as follows:

```
<at>
    <state>acceptingTerms</state>
    <when>
        <input>ACCEPT</input>
        <transition>
            <state>selectingName</state>
            <action>sms(msisdn, "Send the nickname you
want to use - it must not be longer than 8 characters and must not
contain spaces or special characters e.g. LUVRBOY1")</action>
        </transition>
    </when>
    <when>
        <prefix/>
        <action>sms(msisdn, "You must accept the terms and
conditions in www.vizzavi.gr. (text ACCEPT) for this service.
To unregister, do not send any more messages")</action>
    </when>
</at>
```

When a mobile device uses mobile browser applications (such as a WAP browser) to access WAP pages and content, the system is required to retrieve data (such as text, and information) and content (such as images) and present them to the device according to its capabilities. To communicate with a mobile device, the system separates data (what to show) and presentation (how to show it—the appearance of the content on the mobile display). In order to deliver content in this way, the first step is to separate content creation from content serving. In one embodiment, the content is expressed in XML, since XML is platform-independent and malleable. Serving the content is a matter of transforming the XML into the desired format of the mobile device. Extensible Stylesheet Language (XSL) is utilized in the transformation.

Figure 19:
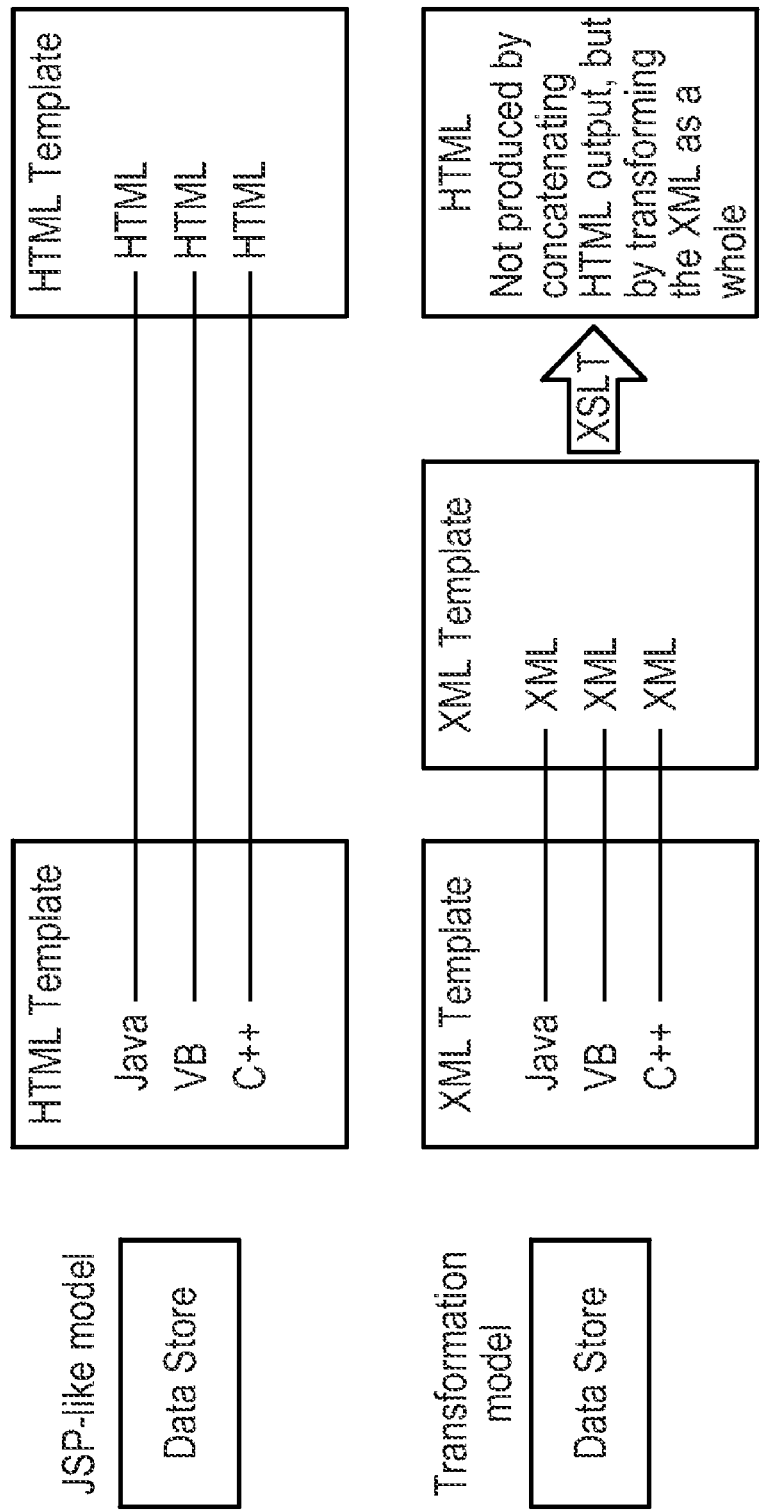
FIG. 19 is a diagram depicting a conversion model in accordance with an embodiment of the present invention.

A Java Server Page technology takes content and converts it through a template into HTML-based content for display on the mobile device as shown in the JSP-like model of FIG. 19. One embodiment of the invention, however, takes the template and converts the content to XML which, through an Extensible Stylesheet Language Transform (XSLT), converts the content to HTML.

Figure 20:
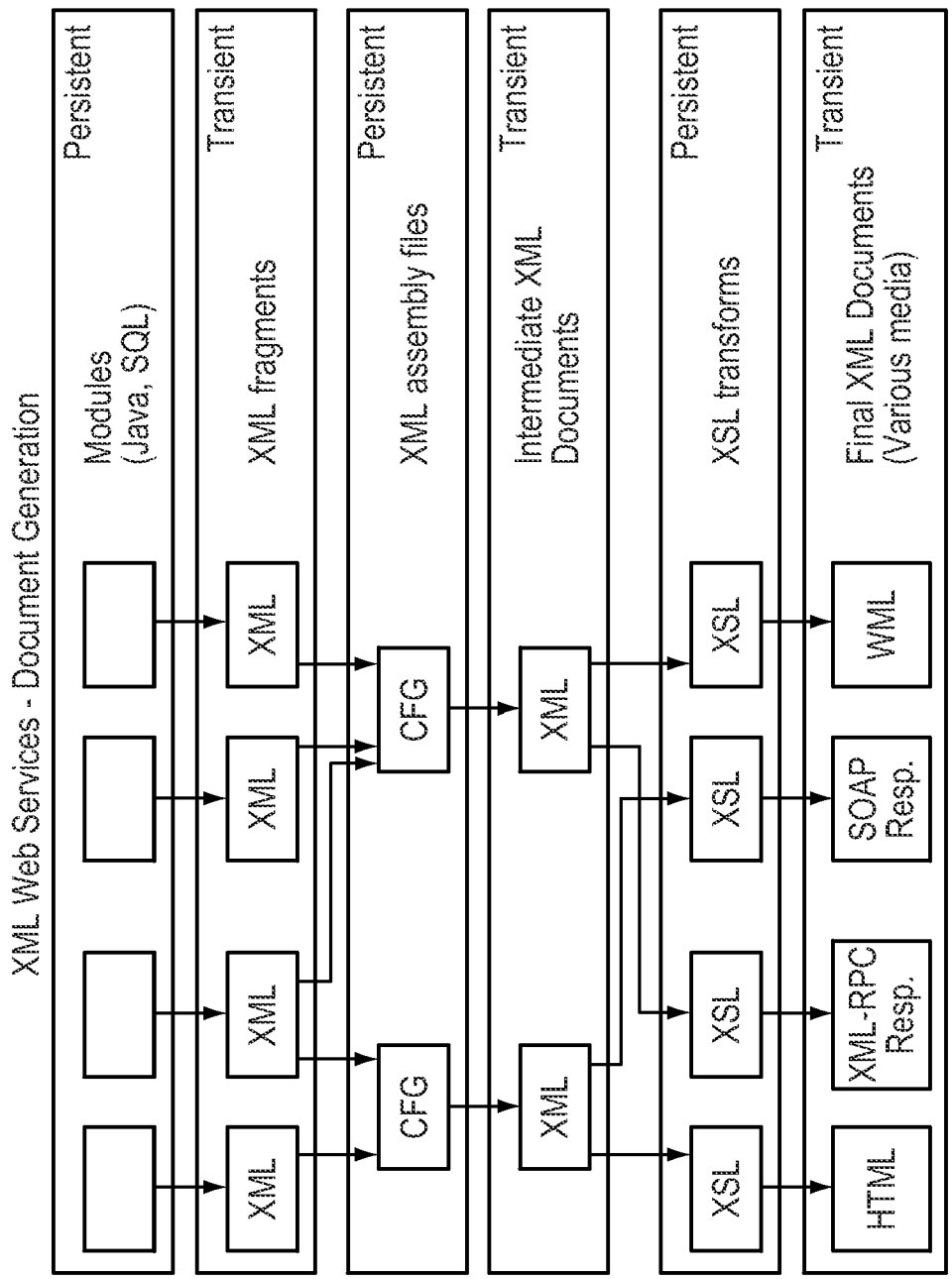
FIG. 20 depicts a flow diagram of document generation in accordance with an embodiment of the invention.

FIG. 20 depicts the steps and the information flow in such a methodology. Information flows from the top to the bottom. In this embodiment, in the top portion, various content modules produced by Java or SQL are used to produce transient XML fragments (for example the page format and data from a requested catalogue search). These transient fragments are combined, as one moves down through the steps. These fragments are used to produce the final transient XML document containing the content to be displayed. Once all data and partial transient XML are accumulated into a single XML document, then (as shown in the row before the last one) XSLTs are applied to transform the single XML document into the various formats (HTML, SOAP, XML etc.) that are displayable by the various mobile devices.

The following example demonstrates the last step of FIG. 20, i.e. using an XMLWeb2 implementation to deliver the same content (as derived in the form of a raw XML file) in HTML and WML respectively, using two different XSL transformations.

The XML raw data are shown as:

```
<content name="/cm-leaf-preview">
        <content name="/cms:root/Dynamic
Content/DoctorBet/users/favorite.idd">
                <name>idd</name>
                <content localname="root/Dynamic
Content/DoctorBet/users/favorite.idd" name="/builtin:text">
                        <value>200</value>
                </content>
        </content>
        <content name="/cms:root/Dynamic
Content/DoctorBet/users/favorite.teams">
                <name>teams</name>
                <content localname="root/Dynamic
Content/DoctorBet/users/favorite.teams" name="/builtin:text">
                        <value>TeamA-TeamB</value>
                </content>
        </content>
        <content name="/cms:root/Dynamic
Content/DoctorBet/users/favorite.selection">
                <name>selection</name>
                <content localname="root/Dynamic
Content/DoctorBet/users/favorite.selection" name="/builtin:text">
                        <value>1</value>
                </content>
        </content>
        <content name="/cms:root/Dynamic
Content/DoctorBet/users/favorite.odds">
                <name>odds</name>
                <content localname="root/Dynamic
Content/DoctorBet/users/favorite.odds" name="/builtin:text">
                        <value>4.70</value>
                </content>
        </content>
        <content name="/cms:root/Dynamic
Content/DoctorBet/users/favorite.stake">
                <name>stake</name>
                <content localname="root/Dynamic
Content/DoctorBet/users/favorite.stake" name="/builtin:text">
                        <value>5/6</value>
                </content>
        </content>
</content>
```

The WML output is shown as:

```
<?xml version="1.0" encoding="UTF-8"?><wml><card
id="Favorite"><p><br/><b>Favorite</b><br/><br/><table columns="2"
align="CC"><tr><td><b>Game Code :</b></
td><td>200</td></tr><tr><td><b>Teams
:</b></td><td>TeamA-TeamB</td></tr><tr><td><b>Selection
:</b></td><td>1</td></tr><tr><td><b>Odds
:</b></td><td>4.70</td></tr><tr><td><b>Stake
:</b></td><td>5/6</td></tr></table><br/><br/></p></card></wml>
```

Figure 21A:
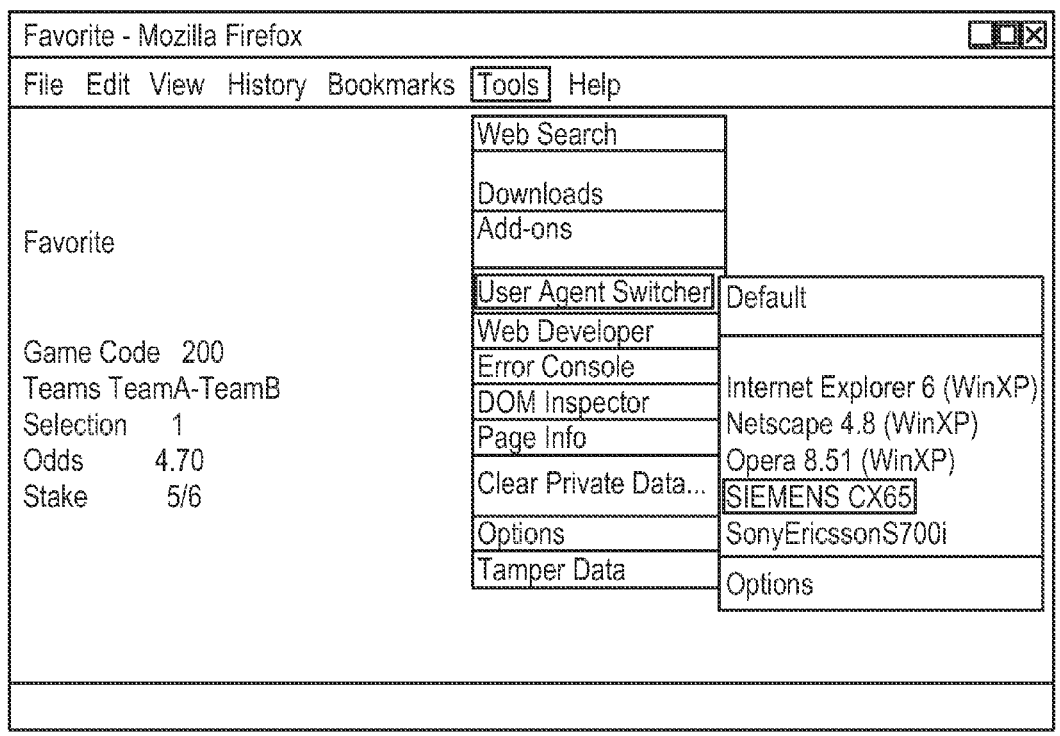
FIGS. 21A-B are visual displays of a web document in accordance with an embodiment of the present invention.

The above WML document as viewed in a browser application (emulating a SONY Ericsson S700i phone) is depicted in FIG. 21A The HTML output is shown as:

```
<?xml version="1.0" encoding="UTF-8"?><html xmlns=
"http://www.w3.org/1999/html" xml:lang="en"><head><title>
        Favorite
</title></head><body><div><h2>Favorite</h2><br/><table><tr><td
align="center">
```

```
            Game Code
        </td><td
align="center">200</td></tr><tr><td align="center">
            Teams
        </td><td align="center">TeamA-
TeamB</td></tr><tr><td align="center">
            Selection
        </td><td
align="center">1</td></tr><tr><td align="center">
            Odds
        </td><td
align="center">4.70</td></tr><tr><td align="center">
            Stake
        </td><td
align="center">5/6</td></tr></table></div></body></html>
```

Figure 21B:
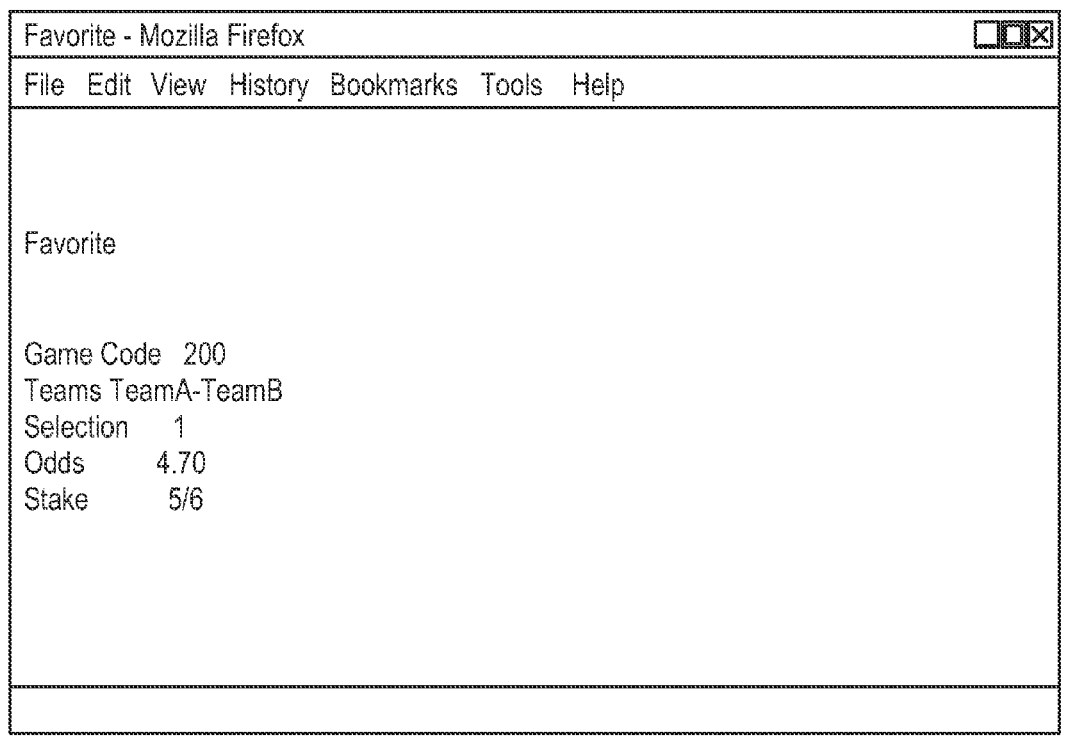

The above HTML document as viewed in a browser application is depicted in FIG. 21B.

The Reporting Module

Similarly, the reporting module allows the user to generate information about campaigns designed using the system or otherwise used by a given entity. The reporting module includes a toolset that helps facilitate auditing and reporting to ensure advertising dollar expenditure can be correlated with sales results and customer interest. The reporting module can be used to track the performance of campaigns and activities relative to set performance targets. With each activity in a particular advertising campaign, a system of metrics is defined. Further, for each metric, a target is set during the design of a given campaign or for a metric associated with a given campaign. The values of the metrics are dynamically generated from the consumer interaction with the campaign. As a result of these features, the type of the activity, the allocated budget and the performance of the campaign can all be correlated. As a general matter, higher budgets allocated to a campaign correspond to higher targets being set.

Furthermore, the reporting module allows for performance tracking of a brand's objectives. The performance of an objective, being associated with metrics, is influenced by the performance of campaigns that include activities linked with these metrics. As a result, the end user interaction with a running campaign influences the brand's objectives and allows the advertiser to measure the effect of his actions, and proceed with corrective actions by e.g. re-allocating the available budget. As an additional feature, the reporting module allows a given user of the platform to proceed with corrective actions when the system indicates poor campaign performance. In the instance of a problematic scenario, such as when the projection of the current campaign performance—measured using the metrics system—indicates that the campaigns targets will not be met, the platform includes certain alert features. In such an instance, the platform can notify the advertiser and seek consultation to take corrective actions. Further, in some embodiments, when a deviation from goal objectives occurs, selection of corrective actions can be automated using a rules engine or other approaches.

Figure 22:
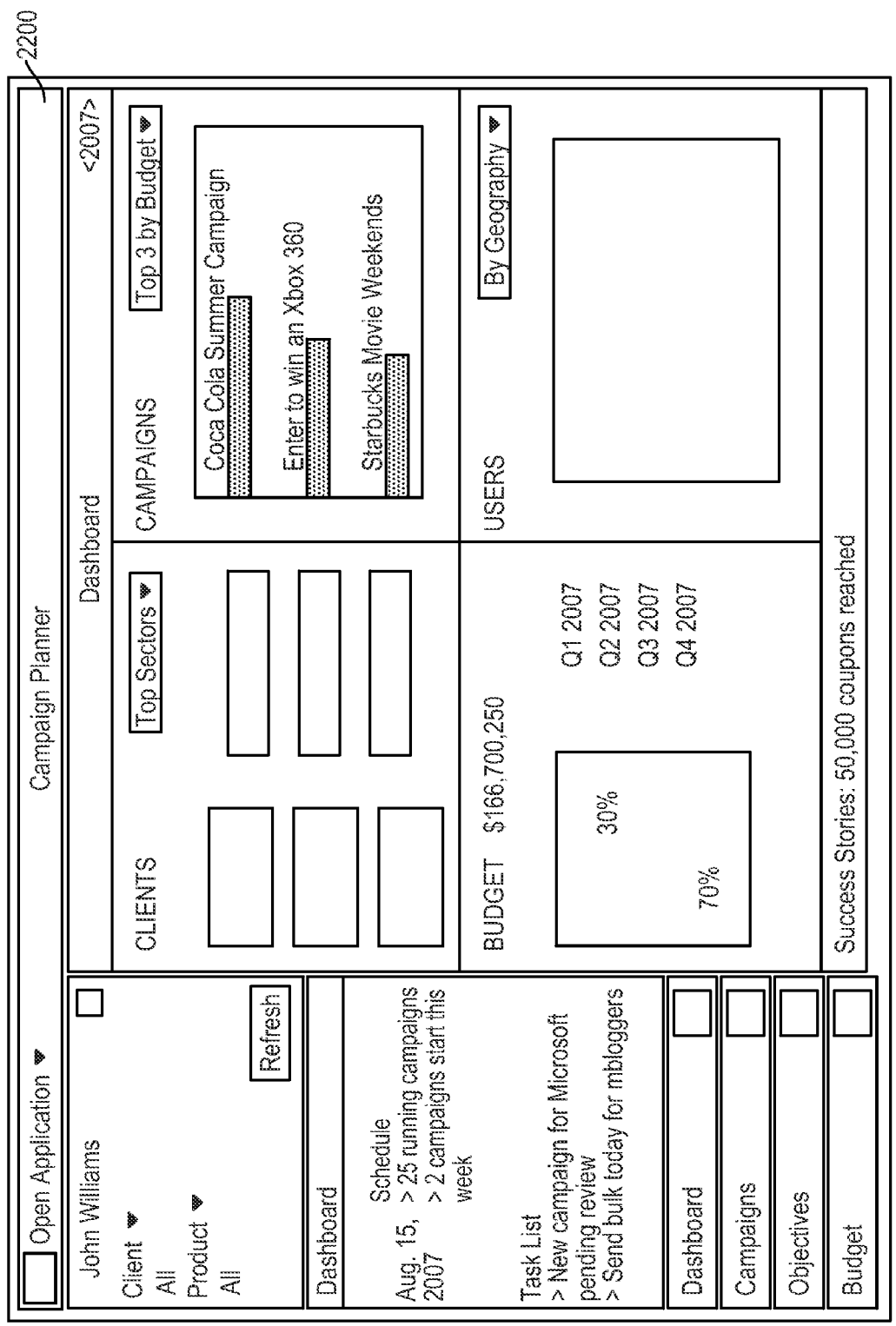
FIG. 22 depicts a visual display of an executive dashboard in accordance with an embodiment of the invention
Figure 23:
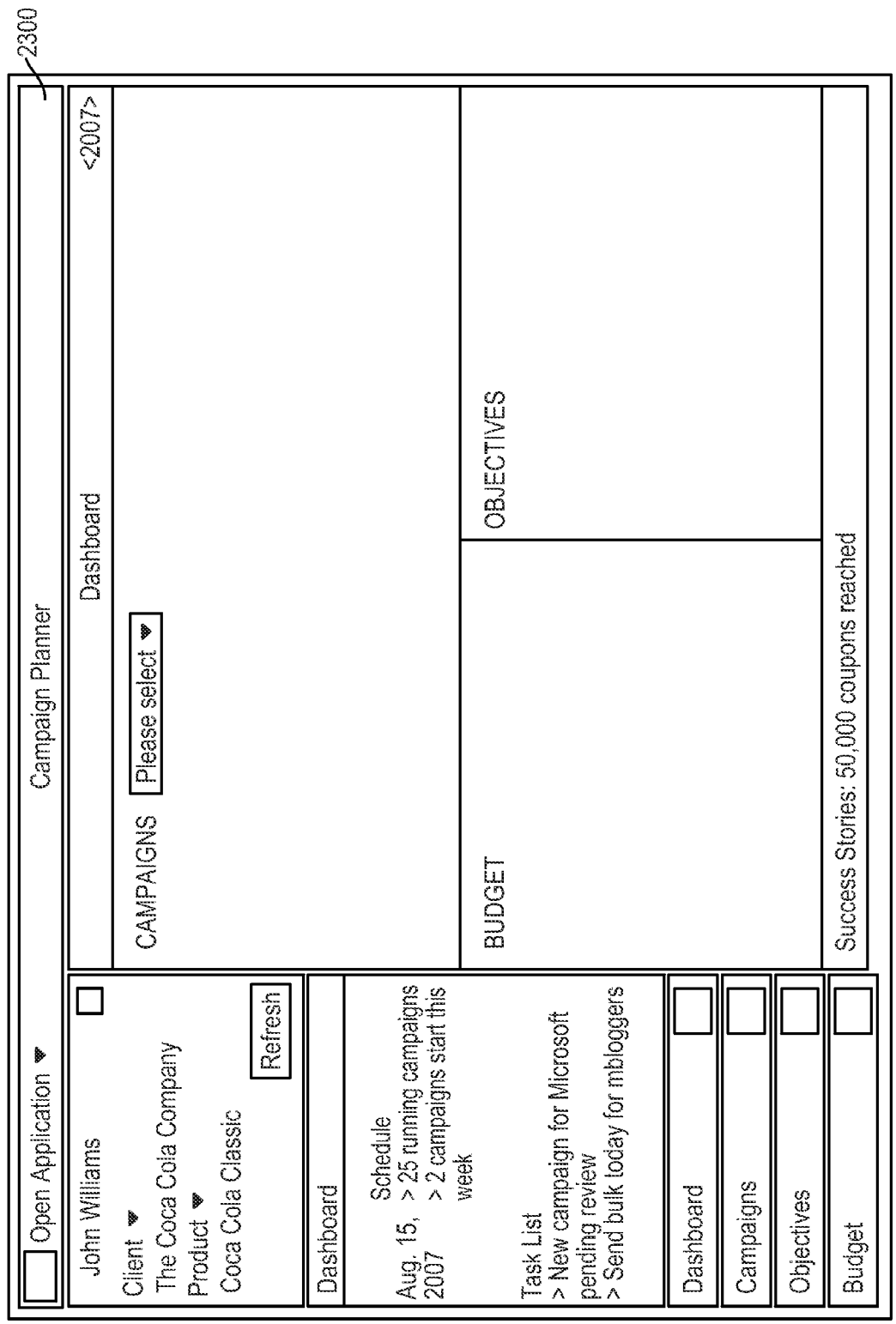
FIG. 23 depicts a visual display of a client dashboard in accordance with an embodiment of the invention.

According to one embodiment, the mobile marketing platform provides reporting tools to present campaign data in a cogent and efficient manner A platform user may view reports and associated data at brand level using an "Executive Dashboard" 2200 (FIG. 22) and a "Client Dashboard" 2300 (FIG. 23). Portions of reports and data may also be presented categorically under a "Budget" or "Objective" view.

The "Executive Dashboard" 2200 depicts the budget broken out by advertising and marketing, utilized and unutilized, and by quarter for individual campaigns, individual customers, or by groups of customers. The user can also see the geographic distribution, and the schedule of campaigns. Similarly, the "Client Dashboard" 2300 displays the campaign, the budget, the objectives and the schedule of campaigns for the client including task lists. Again, portions of the reports are incorporated in the "Budget" and "Objective" view.

Figure 24:
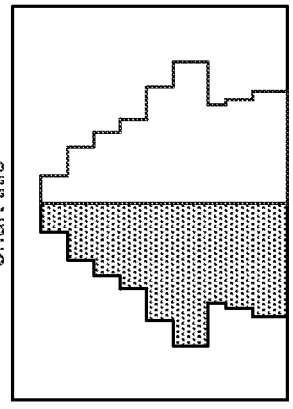
FIG. 24 depicts a visual display of a campaign analytics module in accordance with an embodiment of the invention.

Finally, additional analytics can be obtained about a given campaign utilizing the Campaign Analytics 2400 (FIG. 24) screen. From this one screen, the user can see the campaigns, demographics, lists of tasks and reports available for download.

Example Campaign Activities

The mobile marketing platform allows marketers to quickly execute and monitor many campaigns simultaneously. This results in increased potential revenues from shorter time to market and larger volumes of campaigns, while reducing operational costs. The platform also makes use of additional components designed and integrated to increase the effectiveness breadth of an advertising campaign. Embodiments of the components described below may be integrated seamlessly with mobile marketing platform. The illustrative activities described herein are created or adapted from templates within the execution module described above as part of the design and execution of an advertising or marketing campaign.

Mobile TV and Video Manager

Figure 25:
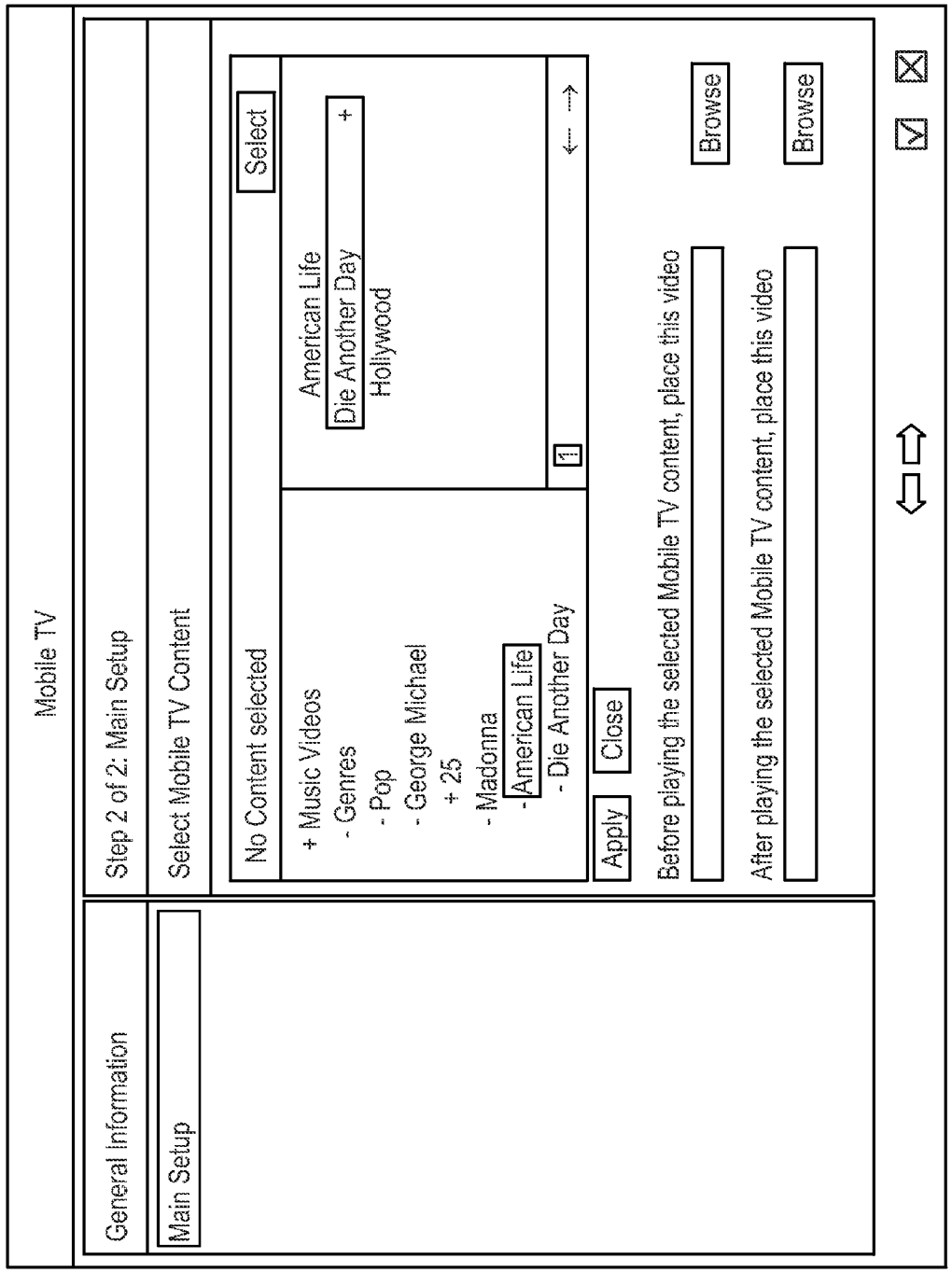
FIG. 25 is a visual display of a mobile TV and video manager in accordance with an embodiment of the present invention.

Another embodiment of the present invention includes a mobile TV and video advertising manager that enables the campaign creator to include interstitial ads into streaming and downloadable video content. The manager may be implemented as an activity template, described above, as part of the mobile marketing platform. A user-interface of the mobile TV and video advertising manager is shown in FIG. 25 according to one embodiment of the invention. The mobile TV and video manager is an activity management tool for uploading video ads and publishing them as interstitial ads in a Mobile TV or Video on Demand service. The manager allows the campaign designer to mix content with the advertisement on the fly, handle several types of downloadable and streamable events, and offer discounted pricing if the end-user selects to view the content with the advertisement instead of viewing the content without the advertisement.

Figure 26:
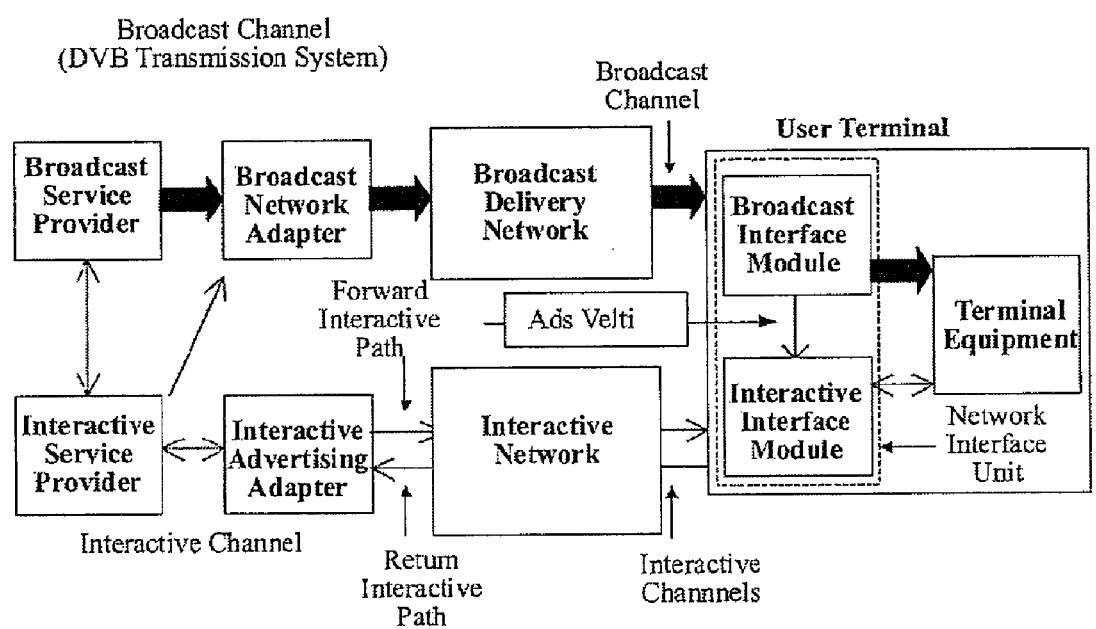
FIG. 26 is a flow diagram of the mobile TV and video manager in accordance with an embodiment of the present invention.

The mobile TV and video manager activity template has been extended to advertisement insertion in Digital Video Broadcasting-Terrestrial ("DVB-T") broadcasts, as depicted in FIG. 26. A flow diagram of the broadcast systems is depicted in FIG. 26 in accordance with an embodiment of the invention. According to one embodiment, the broadcast channel is unidirectional and includes video, audio and data. It is established from the service provider to the users. It can include the forward interactive path. The Interactive channel is bidirectional and is established between the service provider and the end-user for interactive purposes. It is formulated by a return channel from the user to the service provider, which is used to make requests, provide acknowledgement, message response, voting etc. The return channel is narrow-band. A forward interactive path from the service provider to the user is used to transport interactive services data or related information from the service provider to the user. The forward interactive path is the channel for inclusion of the targeted interstitial advertisements served by the system. The forward interactive path can be embedded in the broadcast channel or be discrete. The Network Interface Unit includes the Broadcast Interface Module and the Interactive Interface Module. The interface modules are embedded with the terminal equipment in the User's Terminal so that the terminal can have the interfaces for both the Broadcast channel and the Interactive Channel.

The DVB-x protocols do not specify return channels associated with each broadcast system because these systems must maintain compatibility with different return channel technologies. Embodiments of the invention include systems and applications for an interactive GPRS channel with the capability for advertisement insertion in the forwarding path. Embodiments of the invention also include the terminal client for displaying the advertisement and gathering end-user responses for billing and reconciliation purposes. While embodiments described herein may be applied to DVB-T, it may be adapted to match other transmission systems (e.g. satellite, cable, MATV etc.)

Product Reservation System Using 2D Codes

One embodiment of the invention includes a reservations-enquiry system in conjunction with the mobile marketing platform, utilizing a method for end-customers of retail-shops/chains with mobile handsets via mobile SMS/MMS messaging services to acquire information about products availability in retail shops inventory based on retail-stores catalogue numbers. Embodiments further allow end-customers to reserve available products in retail-shops for future purchases over the counter using either simple reservation identification strings or MMS-encoded images of 2D scannable identifiers such as barcodes. The system allows for users of mobile handsets with SMS/MMS messages services enabled to inquire about the availability of certain products by sending SMS messages to a predefined mobile messaging service point (identified by a longcode or 5-6-digit shortcode mobile telephone number) with predefined syntax including the catalogue product ID in question and, optionally, the retail-shop identification number. Further, the reservation and scannable identifier aspects of the invention further allow a mobile device user to receive information for product availability from the system by means of one-or-more SMS messages containing information about the availability of the requested product, including the location of stores and the number of current inventory for the product.

Similarly, using the systems and methods recited herein, a mobile device or advertising platform user can make a reservation for a specific product in a specific retail-store inventory by sending an SMS with the predefined syntax including the catalogue ID of the product and a string identifying the location of the retails store. The system can also offer an SMS dialogue to the end-user, allowing him to provide additional information, if necessary, in a text-friendly way.

A device user can also receive a reservation ticket in the form of a string ID or 2D bar-code via SMS/MMS in case of a successful reservation request, that can be used as proof of reservation in retail stores. According to one embodiment, two types of proofs of purchase are provided in forms of reservation IDs: a) a unique string up to 160 characters based on the GSM 3.38 character set delivered as a single SMS message; and b) a 2D-barcode image delivered in the form of an MMS message. These reservation IDs can be used with corresponding readers in retail stores to confirm a reservation for a predefined time period. One skilled in the are should recognize that any known scannable identifiers, such as 2D-bar codes, Aztec Code, bCode, Data Matrix, may be utilized without deviating from the scope of the invention. In some embodiments, the reservation ticket message (SMS/MMS) is accompanied by a second informational SMS message informing the user that reservation has been successful with details of the reservation (product ID, description, price, store location, and expiration date). As another implementation, a mobile device can be used to send and receive HELP information for available syntax, or other usage inquiries.

In addition to the embodiments described above, aspects of the invention include several features for administration of a scannable, identifier-based advertising campaign or activity. These features can be integrated in the mobile advertising platform discussed above. The mobile marketing platform may be linked to the advertiser's retail operations, allowing the targeted audiences of the advertising campaign to view, purchase and otherwise interact with a retailer in an electronic marketplace. Specifically, administrative users of the system can update a catalogue of offered products, update the list of retail-store locations and identification number, enable/disable information/reservation SMS/MMS services for specific catalogue products and/or retail/stores, define whether a reservation for a specific product will be delivered via SMS string message or MMS 2D-barcode, view statistics on the popularity of enquiries and reservations of products via SMS/MMS service and other functionalities as embodied in different system implementations.

Using the techniques and systems disclosed herein it is possible to dynamically define the content of confirmation messages (for example include the most popular product reserved by all users), define the content of HELP messages, define the reservation period for reservations performed over SMS/MMS for specific product ID and retail-stores, control the configuration parameters for integration with electronic purchasing systems and to control the configuration parameters for integration with retail-store chain inventory systems.

Reserving and Purchasing Event Tickets

In another aspect, the invention provides additional advertising and marketing capabilities including systems and methods for alerting a mobile handset user when an artist or band they are interested in announces a new event in a specific geographical area. In one embodiment, a user pre-registers interest for their favorite artists on a web site, and provisionally inputs their personal and credit purchasing details, in the provided secure electronic wallet. When a new event they are interested in is announced, the system alerts the user by SMS about the event and the user can reserve tickets for it, by SMS, internet or mobile internet. When an event's tickets go on sale, the system alerts the user again by SMS, in order for them to complete the purchase of their reservation, by SMS, internet or mobile internet again. In addition, the user has always the option to purchase tickets for interesting events, even if they have not reserved them before, if such tickets are available.

This entertainment centric aspect of the invention enables users of mobile handsets with SMS/MMS messages services enabled to register interest and electronic wallet details to specific artists/band and preferred geographical area by filling their details in website. These are communicated to the central system, for storing and later use. Device users can also receive SMS alerts related to their registration for musical events occurring in the geographical area of interest via SMS messages or WAP push messages including references to related WAP pages. Further, users of this aspect of the invention are also able to receive SMS alerts when tickets for musical events related to artists or locations of interest go-on sale by informing the user of the musical event and offering them instructions on how to reserve/purchase a ticket. In another embodiment, device users can receive SMS alerts when ticket for musical events related to artists/location of interest when they go-on sale by informing the user of the musical event and offering them instructions on how to reserve/purchase a ticket.

Product Reservation System

Figure 27:
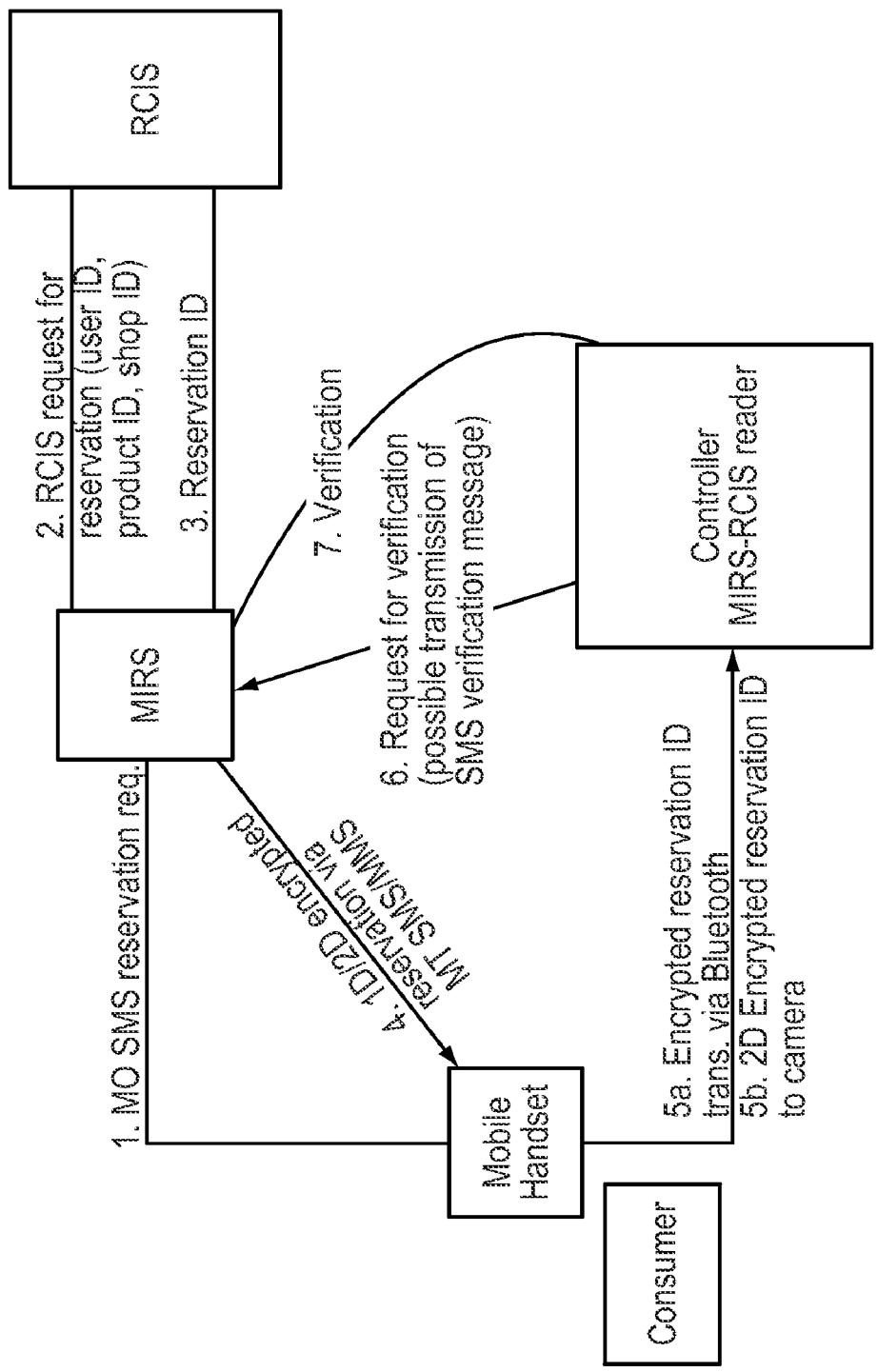
FIG. 27 is a system diagram of a product reservation system in accordance with an embodiment of the present invention.

An exemplarily flow diagram for a reservation system for reserving a product for future purchase according to an embodiment of the invention is described in FIG. 27. The overall system implementation offers a complete, effective, secure, controlled, innovative, user-friendly and ubiquitous channel for end-users to interact with ticket reservation/purchasing systems via SMS/MMS messaging services. The system satisfies all possible needs of events/venues businesses for reservation/e-purchases over mobile messaging systems for the foreseeable future.

As shown in the figure, the Consumer initially requests information for retail-chain products in specific shops, requests and receives reservation for purchase of available products in specific shops, and receives 1D-2D ticket over SMS/MMS.

A Retail Chain Inventory system ("RCIS"), which may be centralized or a distributed system, performs inquiries for products availability in retail-chain stores, performs reservations for products in retail-chain stores and create corresponding linear reservation IDs (strings of characters, linear), and offers verification of reservation IDs (strings of characters).

A Mobile Inventory Reservation System ("MIRS") receives SMS from consumers and translates them to RCIS requests, receives RCIS responses to inquiries and translates to informational SMS messages relayed to the consumers, and receives RCIS responses to reservations requests and translates reservation IDs to 1D encrypted string or 2D barcode images. The translated reservation IDs are relayed to the end-user as SMS (for 1D encrypted strings up to 160 characters) or MMS (for more than 160 characters) with MIRS methodology (including necessary information from user profile-like personal info and mobile handset MSISDN to protect reservation information in MIRS encrypted scheme).

As part of the system, a RCIS-MIRS reader accepts MIRS encrypted reservation data from a mobile handset via Bluetooth, or other wireless transmission, for an SMS/MMS 1D/2D reservation IDs, or via a scanner, such as a scanning camera, for MMS IDs and de-encrypts the data to verify the reservation with RCIS system.

According to one implementation of the reservation system, a series of actions are performed. Initially, a consumer's request for a reservation is sent to MIRS via a mobile-originated ("MO") SMS. Next, the MIRS requests a reservation from the RCIS for a user profile and the requested product. The RCIS receives a successful response from the RCIS with a RCIS reservation ID. In turn, the RCIS combines the reservation ID and the unique user profile info to one mobile-terminated ("MT") message of either a SMS 160 characters message, or a MMS with 2D barcode image and additional meta-data. Further, the MT message is transmitted to the consumer. A consumer presents the MT message to the MIRS-RCIS reader. This transmission, according to one embodiment utilizes Bluetooth wireless technology; however, any suitable wireless protocol can be used. This method can be used for both SMS and MMS encoded reservations. The MT message is presented to the MIRS-RCIS reader, an optical camera in one embodiment, connected to MIRS-RCIS controller. The MIRS-RCIS reader controller relays the received MT message and performs a request for verification for the encrypted message to MIRS with additional info (for example, consumer MSISDN). Also, the RCIS performs verification and returns success and reserved product information. Finally, an operator can present the consumer with its reserved product.

WAP Site Design

Another embodiment of the mobile marketing platform includes a user-friendly and efficient tool for the creation of mobile web sites. The ability to edit pages for display on a mobile device raises many challenges when preparing an ad campaign. This system solves these problems. Aspects of the web design tool include pre-configured templates that are adaptable and customizable to give a designer complete control over the visual layout of the site and a near "what you see is what you get" ("WYSISYG") editing environment with drag-and-drop functionality and a rich set of pre-configured components to be incorporated in the page design. The design tool also provides seamless integration with the mobile marketing platform and storefront functionality described above. The design tool provides dynamic adaptation of pages and components according to the capabilities of the mobile device accessing the page.

According to one embodiment, the design tool includes a first screen displayed to a user, or editor, after a successful login. The editor then selects the "Create new site" function. The system presents a dialog in which the user specifies the site Title, Short Name and Codepage. The user enters the information and selects "Next" to go to the next step or "Cancel" to abort the new site creation process. The system then presents a dialog with the options to create a site from scratch, create a site by copying an existing site, or create a site by cloning a model site (from a template).

If the user selects "Create from scratch," the system displays an edit screen. If the user selects to create a site by copying an existing site, the system displays a list of existing sites (with a title and short name for each) from which the user can select the one to copy. The user selects the site and then selects "Create." The system creates a new site which is a copy of the selected one and displays the edit screen.

If the editor opts to create a site by cloning a model site, the system displays a list of existing model sites (with a title and short name for each) from which the user can select the site to clone. Upon selecting a model site, a set of thumbnail images is displayed for the templates contained within the site. The editor selects the model site and then selects "Create." The system creates a new site which is an identical copy of the selected one and displays the edit screen. The system, if copying an existing site or selecting a model site, copies everything from the existing or model site into the new site, including all site properties, the sitemap, the templates, the pages, the site content library (not a copy of the structure), and the references to other content in the content management system. Creating a new site by copying an existing one results in a new site unaffiliated and separate from the original. Any change to the original site will not change the one created as a copy.

Once a site is created, the editor can edit the page. The system presents the page edit screen, with the editing canvas, the available page elements and the properties box that displays the properties of the selected element (and allows for editing values). The editing canvas is a near WYSIWIG representation of the page, where the page sections are shown (as defined from the template in use) and the page elements can be placed in or removed from using a drag-and-drop methodology.

The user can drag and drop elements in and out of the canvas, edit the properties of an element placed on the canvas, check the properties available for an element before placing it on the canvas, or edit the page properties. In addition, the user may be prevented from editing (change properties or drag elements in and out of) locked sections and locked containers (as defined in the template in use) but may be able to select a locked section or container to see its properties. A container is an area, such as a rectangular area, within a section of a page where one or more page elements can be placed. A container can be used to control the placement and background of the elements within the section (such as alignment and background color). The use of containers also allows for controlling formatting at the section level by providing adjustable spacing between containers in the same section. Additionally, the user may not be able to edit the page element properties marked as locked in the page template (locking applies to group of properties), but may be able to see the locked properties disabled for editing.

The editor finishes editing the page by selecting "Save changes on same version" or "Save changes as new version." If the user selects "Save changes on same version," the system warns that changes will be saved on the same version of the page. If the editor selects "Commit changes," the page is saved with as same version. If the editor selects "Return to page editing," the system returns to page edit mode. If the user selects "Save changes as new version," the system displays a dialog where the editor can write comments or leave it blank. There are two selections available on this window, one to save ("Commit changes") and one to return to page editing ("Return to page editing"). If the editor selects "Commit," the page is saved as a new version with the associated comments, if any. If the editor selects "Return to page editing," the system returns to edit mode. If the user selects "Discard changes," the system warns that the changes will be lost. If the editor selects "Changes will be lost," the system closes the page edit screen. If the editor selects "Return to page editing," the system returns to page edit mode.

The editor is also presented with options to change or edit certain site properties, such as the title, or codepage. Another function presented to the editor includes an option to view the sitemap. Selecting this option displays a graphical representation of the sitemap with symbolic links between pages corresponding to actual relative links within the site. The editor can select a page on the sitemap and then the choose to view the page which opens the page in read-only mode, or the editor may choose to edit the page which opens the page in full edit mode. The system automatically constructs the sitemap by following internal hyperlinks between pages of the site. Hyperlinks to external pages are not followed. A page is not necessarily linked in from other pages in the same site. Such a page, according to one embodiment is labelled as "orphan page" in the sitemap.

The user, after creating and editing the site, can go live with the changes by choosing to publish the changes to the current site. The user selects "Publish now," "Schedule publish" (and enters the date and time of publishing or selects it from a calendar, also the email address of the person or list which will receive the notification after publishing) or "Cancel." If "Publish now" is selected, the system proceeds with publishing the site. A progress window is shown that shows the status of the publishing, such as, "Publishing, please wait . . . " or "Published successfully" or "Not published."

After the publishing is completed, the user can select "View log" to check what has happened in any case. If "Schedule publish" is selected, the system creates the publishing job for the site and schedules it for the specified date and time. After the scheduled publishing has been completed, the system, according to one embodiment, sends an email notification to the designated email addresses in any case (success or failure). During the publishing process, no change to the site templates and pages is allowed. One embodiment of the invention allows the user to publish to a different site name to avoid tampering with a live site and then choose to publish the site (replacing the previous version) on command or at a scheduled time. The final site can then serve various purposes such as a destination or social portal for a mobile ad campaign.

According to one embodiment of the invention, the mobile site designer is transparently integrated with the mobile marketing platform. When defining and setting up an activity for a marketing or advertising campaign, the campaign designer can designate a landing page created by the site design tool when a customer participates in the campaign. For example, if the customer clicks an advertisement or a hyperlink associated with a campaign, the user is taken to a site in the mobile device browser created by the site design tool. The landing page may include further information about the advertisement or contest, or may be a storefront page as described above where a user can reserve or purchase a product.

FIGS. 28A-G depict certain visual displays presented to a user in creating a mobile web site, as described above, in accordance with an embodiment of the invention. The visual displays and other depictions in FIGS. 28A-G are non-limiting embodiments of the invention and one skilled in the art should recognize that alternatives to those constraints listed below are part of the invention.

An entry page (FIG. 28A) is presented to the user upon logging into the application when editing the template of the mobile site. On the right-hand side of the screen, the user can view and edit the template properties and at the bottom of the screen, the user is able to drag and drop the page elements on the page. On the left-hand side, the user will be able to access the site-tree view of the mobile site and on the center of canvas the user will be able to access the design view for each template and page that creates. Using the Plus (+) icon, the user will be able to create a new site, template or page. When the user selects to create a site, a pop-up window (FIG. 28B) appears. The user can start by creating a new site from scratch, copy one of the existing sites or clone one of the model sites. If the user selects to create a site by copying an existing one, the user will view a list with the sites and templates associated with this function.

If the user decides to create a new site by cloning an existing one, the user may view a list with the model sites and all templates associated with this function. The model sites are not user specific, but global to all the users. The user can also create a new template (FIG. 28C) by giving a name and associating it with existing mobile site. The user can create a template from scratch, by copying an existing template or cloning a model template. If the user selects to create a template by copying an existing one, the user may view a list with the templates and a preview for the selected template. If the user decides to create a new template by cloning an existing one, the user may view a list with the model templates. The model templates are not user specific but global to all the users of the application.

The user can create a new page (FIG. 28D) by providing a name and associating it with an existing mobile site. The user is able to create a new page from scratch or copy an existing page. In case the user selects to create a page by copying an existing one the user will view a list with the pages and a preview for the selected page.

Figure 28A:
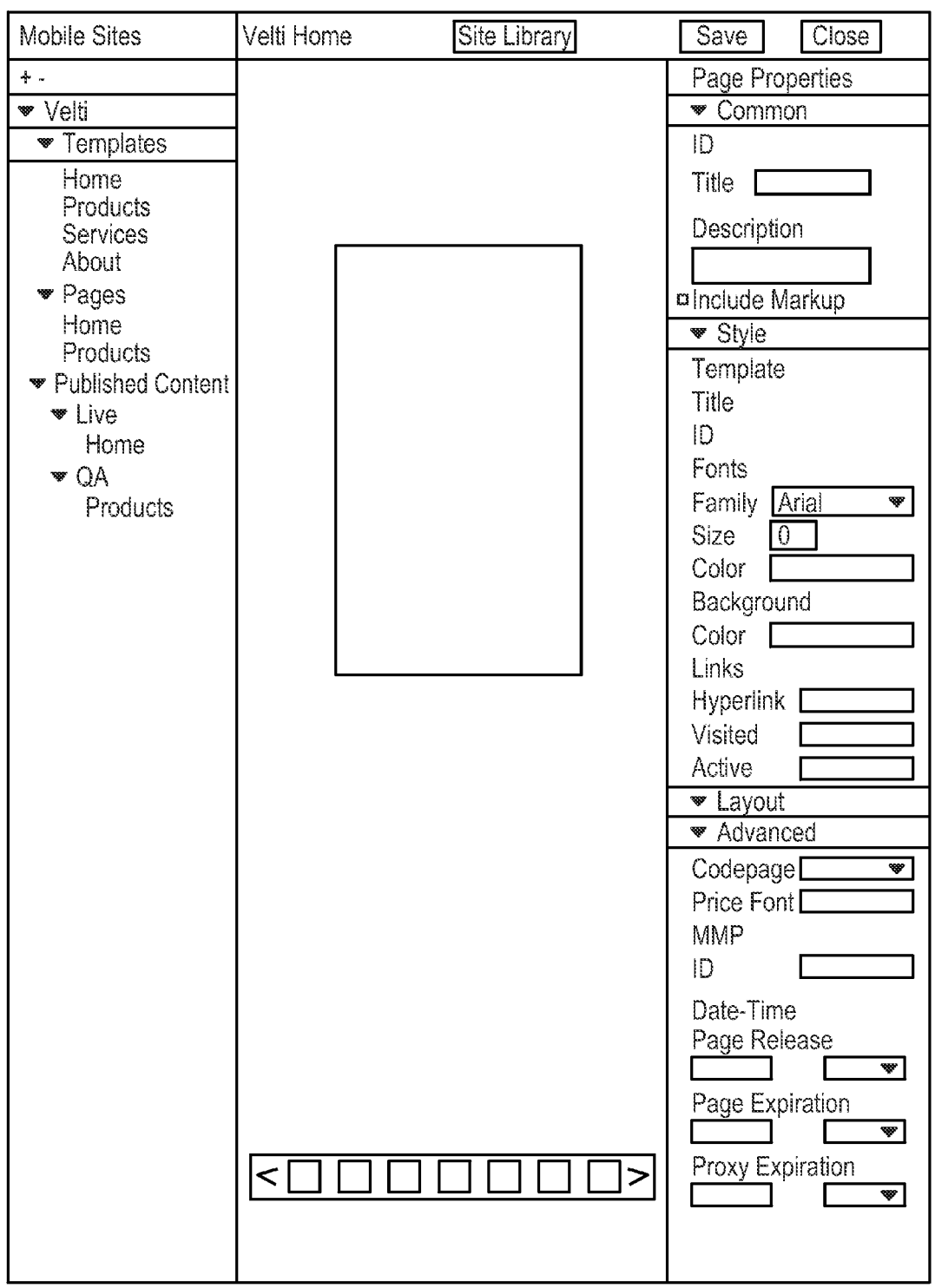
Figure 28E:
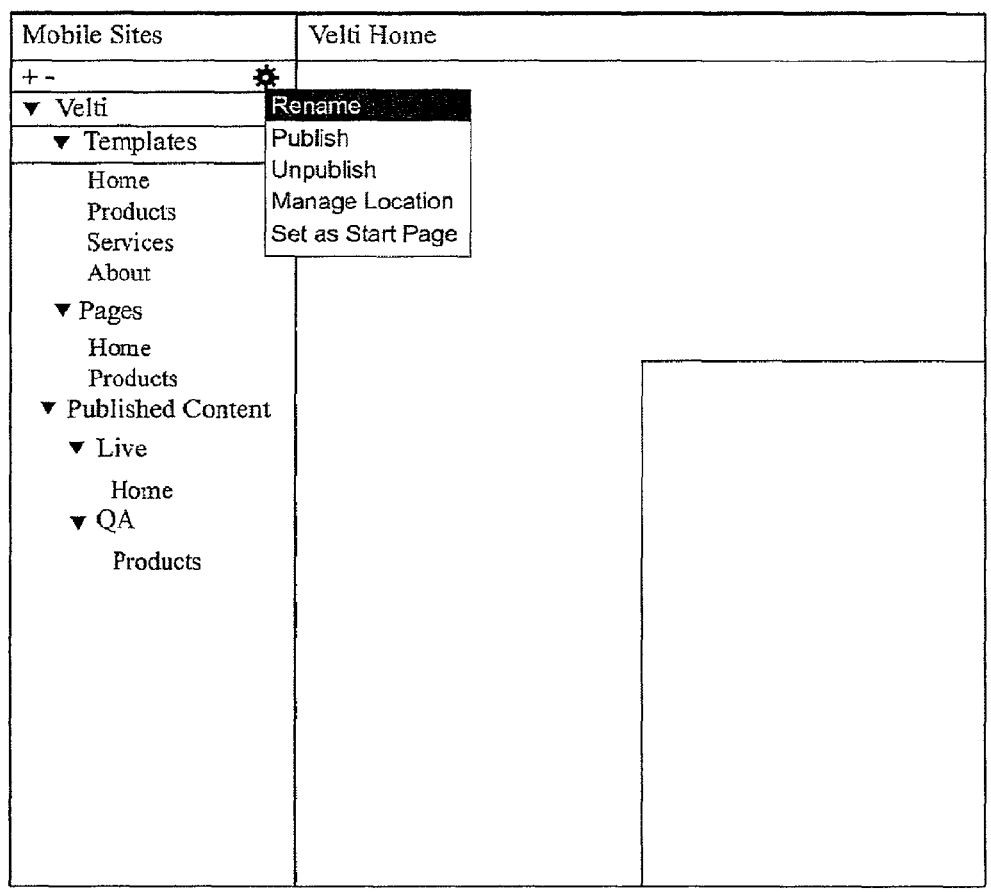

In order to manage the sites, the user will be able to view the site via a tree structure (FIG. 28E). This view includes templates, pages and published content. When the user creates a mobile site, templates or pages, the user can publish any of them in specific locations by selecting the relevant node and pressing the relevant button on the drop-down menu. The user will also be able to un-publish sites, templates and pages by specifying publication locations.

When the user selects to publish a page (or site) a popup window appears and the user is able to select one or more of the publication locations available. One of those locations can be set as default. The same functionality and pop-up window appears when the user wants to publish the site in a specific location. When the user selects to un-publish a page from a location a pop up window appears. The same page could be published in one or more locations and the user will be able to un-publish it from any of them. The same functionality and pop-up window appears when the user wants to un-publish the site from one or more publication location.

FIG. 28F is a pop-up screen which is displayed in order to add mobile content to the page. The user can specify a content category, a name for the collection and continues to the next screen. The user can choose one of the specified content templates in order to present the content to the mobile device.

Figure 28G:
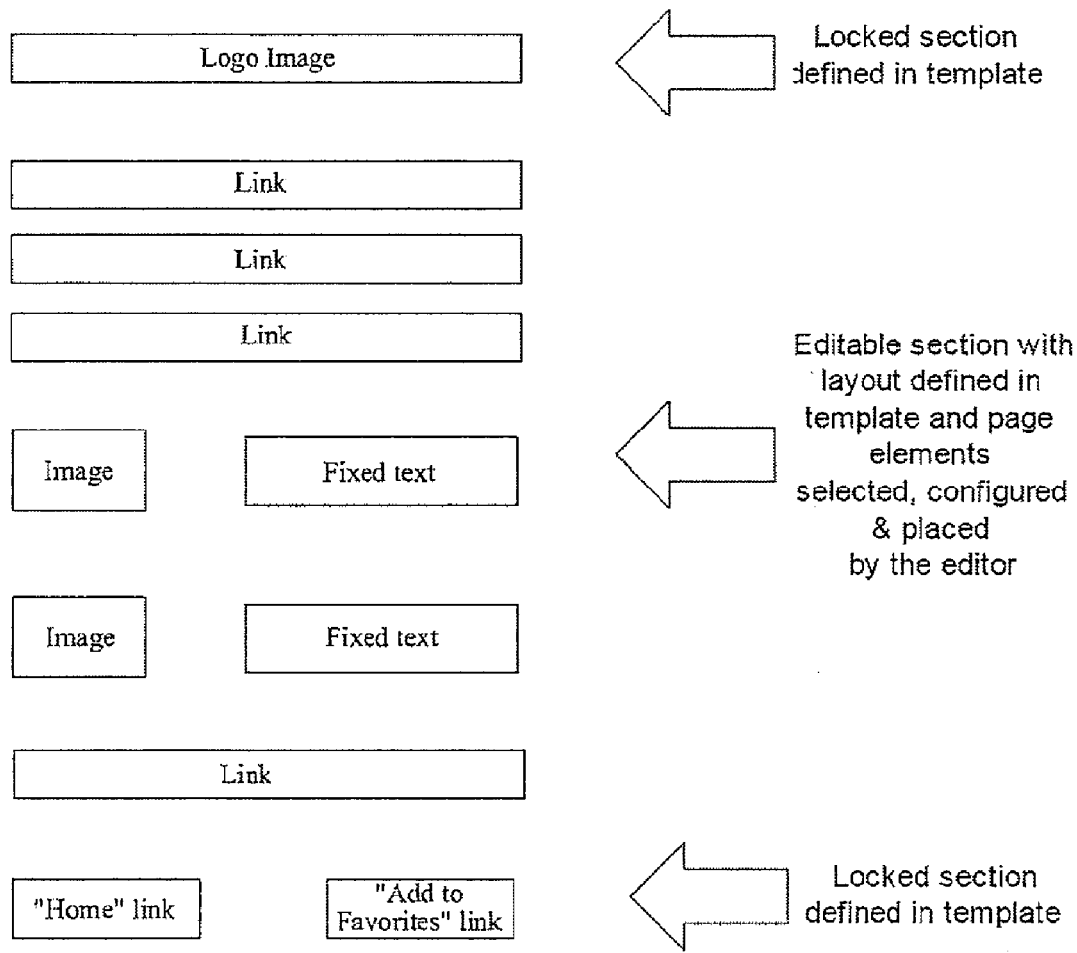

An illustrative web page created by the site designer is shown in FIG. 28G. In the example above, one can see the component elements of the page. The page includes three sections, top (named "Header"), middle (not named) and bottom (named "Footer"). Each section of the page of this embodiment has its own background color. A division of the middle section delineates containers where the user can place page elements. According to the embodiment shown, the template selected has locked the header and footer content, but allows the editor to customize and edit the content in the containers. The containers can include content such as images, text, hyperlinks, logos, banners, video etc.

Mobile Customer Relationship Management ("CRM")

According to one embodiment of the invention, the mobile marking platform includes a Mobile CRM with a Mobile communities manager to enable the formation of mobile communities. While the mobile communities manager is a part of the Mobile CRM module the terms, as used herein, the term may be used interchangeably to describe the features of the system. The manager provides easy to use activity wizards that cover loyalty clubs and user generated content communities type of activities. The Mobile CRM manages the interactivity with subscribers in order to enhance participation, and analyze member behaviour. A community is a collection of users who have consented to participate in community events by sharing demographic or psychographic data and content. Subscribers may register as members of a community via SMS, WEB, and WAP.

The Mobile Communities Manager enables the formation of mobile communities, manages the interactivity with subscribers through broadcasts in order to enhance participation, and analyzes member behavior accordingly. The Mobile Communities Manager provides the tools to analyze the community using different views, e.g. pie charts and graphs.

The Mobile CRM also enables the communication with community members via broadcasts. Different broadcast types are supported, such as, without limitation advertisements, informational messages, and broadcasts that give away mobile coupons or initiate games such as trivia questions. A broadcast response is fed back to the system and transformed into consumer intelligence.

Figure 29:
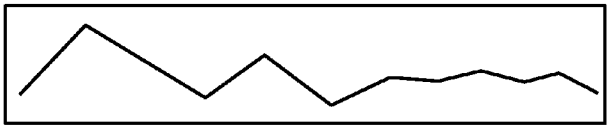
FIG. 29 depicts a visual display of a mobile community dashboard in accordance with an embodiment of the present invention.

According to one embodiment, the Mobile CRM includes two modules, Communities and Broadcasts, and is split into two panels, as viewed through a Mobile Communities Dashboard, shown in FIG. 29. The Broadcasts panel and menu are displayed by default, in one embodiment. The main panel is the starting point for navigating around the Mobile CRM. The main panel provides account-specific information depending on the option chosen (Broadcasts or Communities) and the functionality to set up a new community or broadcast. The Broadcasts and Communities panels show information related to a specific broadcast or community, and enables a user to modify the settings and members' data. A drop down menu is presented to allow the user to select an account upon login. In one embodiment, the user must select an account before attempting to use any application of the Mobile Marketing Platform.

The functionality and the reporting features are provided on the dashboard interface. The account-specific dashboard of the Mobile Communities Manager provides data related to the communities and the functionality to create a new community, to edit the settings of a community, and to edit the segments of a community. In addition, the dashboard provides the functionality to manage members' details individually. The Mobile Communities Manager also enables the creation and management of broadcasts for direct communication with community members. The functionality to create a new community and edit it is provided on the dashboard. The broadcasts' properties and other data are displayed on the dashboard. The Mobile Communities Manager enables customer profiling and segmentation to allow for targeted broadcasting. Segments can define the micro-community of subscribers for a particular broadcast. Segment creation is possible due to attributes or characteristics that can be defined by the user and pertain to one community only. The user can also edit attributes in an Attributes Editor. Segment creation and definition is explained below in further detail.

To create a new community, a user selects the button corresponding (+) on the main panel to display a popup window. In the Activity Profile panel, the user may enter a unique name for this activity. In the Starts field, the user may enter the start date of the promotion, or click an icon next to the field to select the date and time on the calendar popup. In the Ends field, the user may enter the end date of the activity, or click an icon next to the field to select the date and time on the calendar popup. A Shortcode Settings panel appears next allowing the user to select the shortcode on which the activity will run. The user also may select the keyword(s) to associate with this activity from a Keywords panel.

Embodiments of the Mobile CRM allow a user to create, modify, enroll and delete consumers, modify consumer biographies, import and export members of other associated communities. In the mobile communities manager, member and attributes management is performed through Wizards. Members can be added automatically, that is, by importing data from an existing file, or by manually entering that data. To import members' data, the user must import a file that contains all the data. The Wizard can import the data, display it, and ask the user to review and confirm the import. To add members' data manually, the user must enter the data in various fields provided in the Wizard. The data will be associated with the users' MSISDNs, and may include personal, psychographic (interests, attitudes, opinions), and demographic details. The user can also search for members using certain criteria, based on the personal, psychographic, or demographic details that have already been provided and registered in the Mobile Communities Manager. Search results are exported automatically by the Mobile Communities Manager. The user can delete one or more members if they wish. To do so, they can either delete a member by MSISDN, or they must perform a search to find the member or members they wish to delete, and then delete them.

Figure 30:
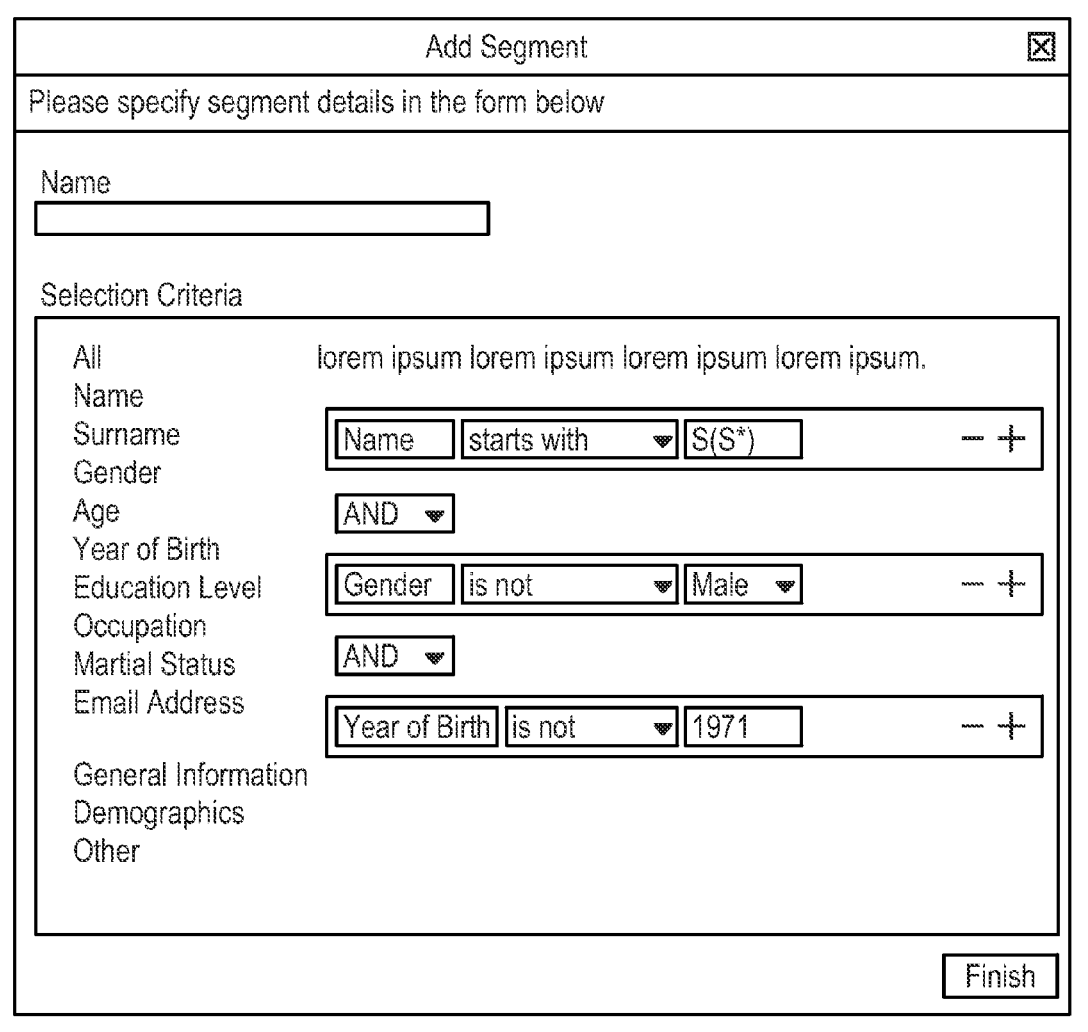

A Mobile CRM user may also create targeted segments of communities for advanced advertising campaigns in conjunction with the mobile marketing platform. Segments can define the micro-community of subscribers for a particular broadcast. The user can add segments by launching the Add Segment Wizard, shown as FIG. 30. The user can define as many segments as they wish using any number of selection criteria. Segment data may include personal, psychographic, and/or demographic details.

According to one embodiment, broadcasts are used to send a single set of data or content to multiple users within a defined group, i.e. a community. The Mobile CRM enables the user to set up an infinite number of broadcasts once a community (or communities) has been set up. When creating a new broadcast, the user inputs a unique name for the broadcast. From drop-down lists the user can select the type of the broadcast, the type of tag, as well as the start and end dates. Alternatively, the user may select to begin the broadcast upon completion of the set-up tool. The user may also define a rate of recurrence at which the broadcast will be periodically repeated.

As described above, the user can create a targeted segment to define a specific audience for the distribution of the broadcast. Targeting the audience based on a certain demographic criteria (e.g., male, over 21, and single) allows the campaign to reach those consumers who would find the most value in the content of the broadcast. Additional details relating to the broadcast module are discussed above with respect to FIG. 3.

In another embodiment, the mobile marketing platform integrates and interacts with a mobile community built over a social network. Social networking sites, such as Facebook, MySpace, Friendster, and LinkedIn, allow user-created communities as a forum of communicating and sharing information and other content, such as photos, audio, and video to a broad audience. Embodiments of the invention include the creation of a mobile community in an existing social network in which the community may be associated with an advertising or marketing campaign created by the mobile marketing platform. The campaign designer, through the mobile marketing platform can create, edit, and distribute content across the mobile community to reach a broader audience. For example, if a marketing campaign is directed to a product, e.g. Product X, during the creation of the marketing campaign using the mobile marketing platform described herein, the campaign designer may create a mobile community called "Product X Community" or any other identifiable community name within a social network.

Users belonging to the social network may be given the option of joining the community in order to receive special offers, discounts, prizes or other content. In one embodiment, information about the mobile community may be transmitted to a user on the user's mobile device. The information may be in the form an SMS message, MMS message, or via an advertisement displayed in a WAP web site. The user may click a link within the message or advertisement and be sent to a landing page hosting the mobile community (such as one designed using the embodiments disclosed herein). From the mobile community page, the user can read about the community and what the community has to offer to customers.

In addition, the user may be given the opportunity to join the community in order to obtain additional information, discounts, prizes or other content or information relating to the subject of the community. In one embodiment the social network may be a third party site, such as Facebook. Alternatively, the social network may be any network created for the subject matter of the marketing campaign. For example, a "Product X" social network may be created independently, offering many of the traditional services and products offered by third party networks, including user-created content.

Targeted customers who join the mobile communities may sign up to receive alerts, such as emails or SMS/MMS messages with special offers available only to members of the community. The alerts may be transmitted to the customers pursuant to rules set forth by the campaign manager/creator. Examples of alerts may include features and content integrated as modules within the Mobile Marketing Platform, such as limited-time offers, new releases of products or services, launching of new contests and the awarding of prizes, etc.

The campaign manager, through the use of the communities, can track membership as well as monitor advertising metrics and demographics. For example, a member of a community may have a biographic profile within the social network listing the user's age, gender, geographic location, relationship status, interests and activities—all key elements that are vital to successfully reaching the intended audience of a targeted advertising campaign.

The Mobile CRM integrates seamlessly with the mobile marketing platform providing an opportunity to increase brand loyalty and target consumers with advertising and marketing campaigns. For example, one embodiment of the Mobile CRM includes a Mobile Club activity in which customers join a Loyalty Club built around specific products/services by submitting their basic demographic data. Customers can register via Web, WAP or SMS. Upon registration customers start receiving product/service related messages from the sponsor.

Another Mobile CRM template includes a "Join to Win" activity in which customers join a branded loyalty club by submitting basic demographic data to register via Web, WAP or SMS. Customers can enter various sweepstakes and draws during predetermined time periods. Upon registration members will receive periodically branded messages from the sponsor.

Another activity template included with the Mobile CRM is an activity entitled "Pointmania" in which customers join a Loyalty Club built around specific products/services by submitting their basic demographic data via Web, WAP or SMS. Upon registration customers start receiving branded messages from the sponsor. When customers purchase the products or use the services they collect points through the Loyalty Club to redeem for different prizes.

Figure 31:
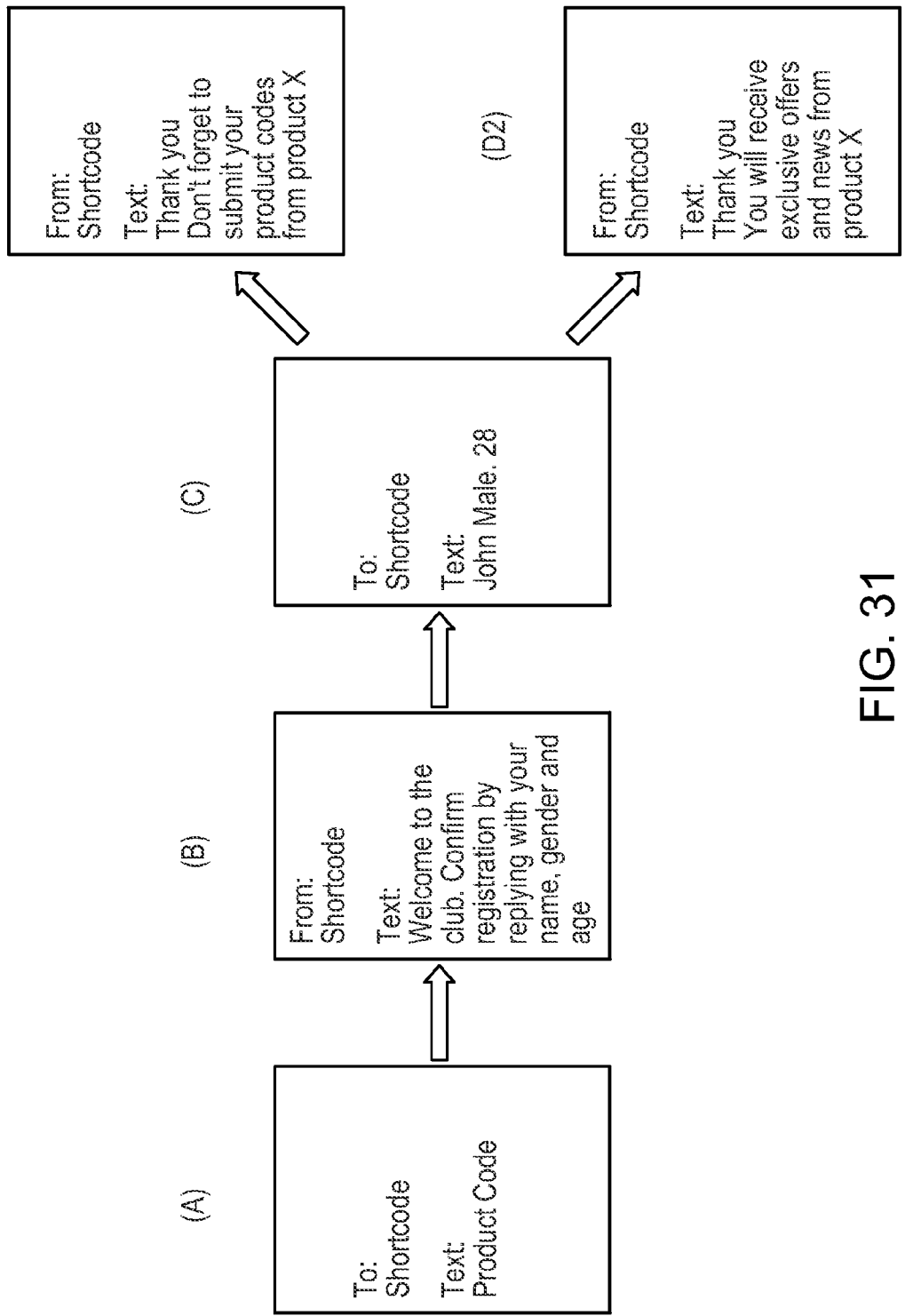
FIG. 31 depicts a flow diagram of a consumer's interaction with the Mobile CRM according to two embodiments of the invention.

FIG. 31 depicts a flow diagram representing a mobile device interface and a consumer's interaction with the Mobile CRM according to two embodiments of the invention. (D1 and D2) Upon seeing or hearing an advertisement, either though a mobile device or via any other advertising channel, a user may send an SMS message (A) to a given shortcode address, phone number, or other address, with an appropriate code response. The platform then responds (B) with a message asking for further details by which the user can be categorized or otherwise profiled. The user responds (C) with another message, stating his name, gender and age in the illustrative example. If the activity is one based on a product offering points for purchasing products, the platform responds with a message (D1) confirming the addition to the club and reminding the user to submit product codes to receive points for additional merchandise. If the activity is designed to provide additional advertising or marketing content, such as coupons, product news, or other content associated with a product, the platform can respond with a message (D2) confirming enrolment and notifying the user of future messages. One skilled in the art should recognize that the SMS messages shown in FIG. 31 represent two scenarios by which a Mobile CRM user may communicate with a consumer. Each activity is designed separately and independently and the dual-purpose of screens (A), (B) and (C) is merely to simplify explanation of the embodiments herein and demonstrate the common features offered by certain of the modules described herein.

Interactive Screens

According to one embodiment of the invention a mobile marketing platform user may implement an activity including a network of interactive screens or kiosks (as described above). Interactive screens may be equipped with sensors to sense an environment and are capable of interacting with consumers to provide addition content associated with an advertising or marketing campaign. The interactive screens are interconnected with a content management system ("CMS"). The screens also have mobile connectivity allowing consumers to interact with the screen/kiosk by sending and receiving messages to his/her mobile device. Network interconnection allows for monitoring and changing the screen's interface as well as refreshing the content provided. The success of an interactive screen campaign may be measured through unified metrics (mobile downloads and interface visit metrics).

The platform user is able to set up a new interactive screen application through a wizard interface. According to one embodiment, creating new Interactive Screens utilizes input from the platform user making the implementation partially automated. For example in a "General Configuration" section of the wizard the system may simply store the corresponding settings associated with the activity, but will not apply them automatically to the activity. Alternatively, in a "Content Selection" section of the wizard, and upon the platform user's completion of the wizard, the selected content items will be automatically published by the CMS.

In the "General Configuration" section of the wizard, the platform user is able to set a name for the Interactive Screens activity, the description and the duration period of the Interactive Screens activity. Further, the platform user is able to select a shortcode address which is used for the mobile interaction of between the interactive screen activity and the consumer, such as request by a user to retrieve or view offered content.

Figure 32:
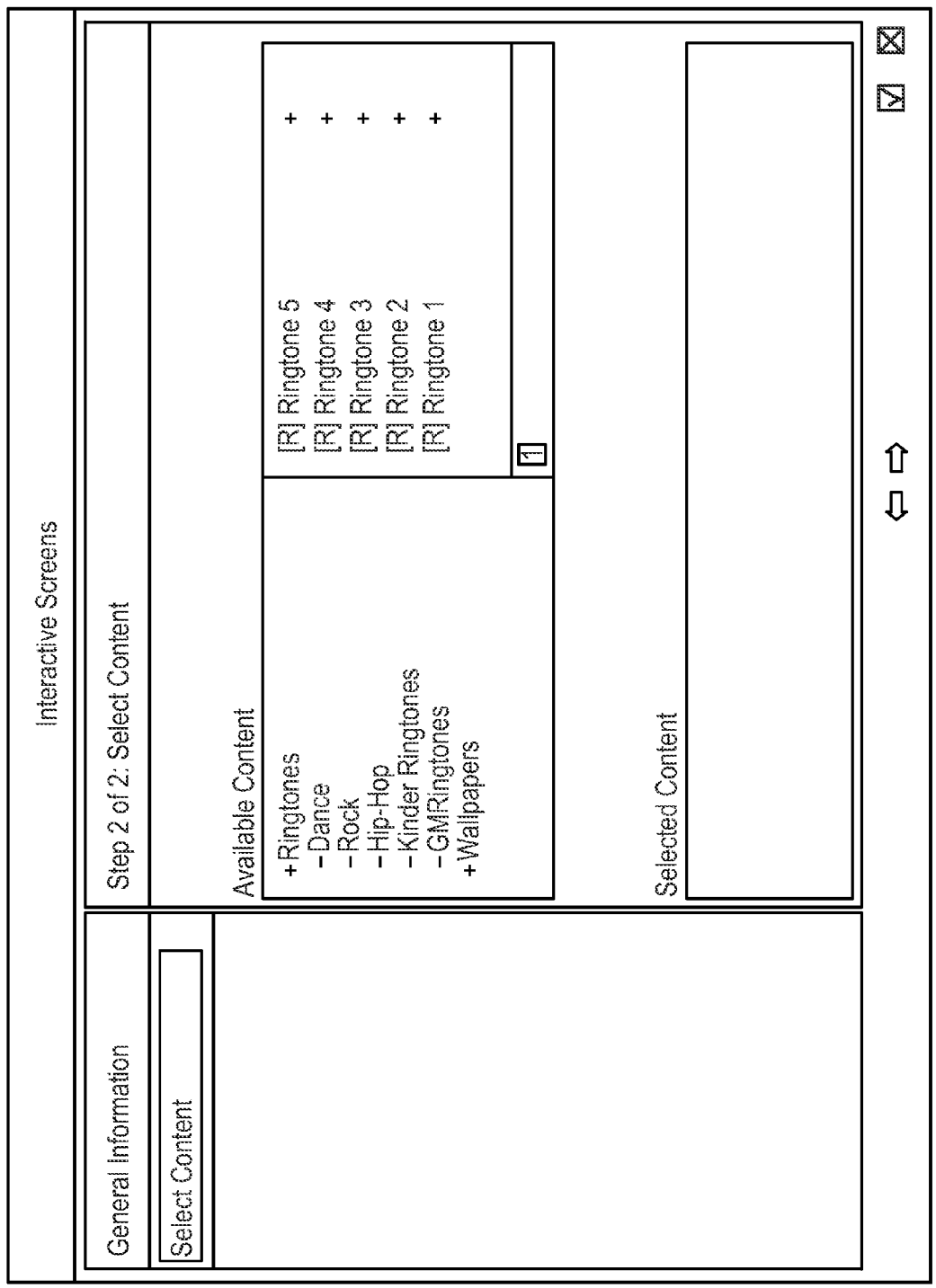
FIG. 32 depicts the selection of content offered from a content management system in accordance with an embodiment of the invention.

In the "Select Content" portion of the wizard, depicted in FIG. 32, the platform user selects the content which will be offered through the interactive screen activity. The platform user is able to select specific items or whole folders of content contained within the CMS, which is dynamically presented to the platform user. Selected content can also be deselected at the platform user's will. Exemplary content a platform user may opt to offer as part of a campaign includes ringtones and wallpaper for a user's mobile device, music or video offerings, or other electronic content. The content available through the interactive screens may be web enabled allowing for a holistic web reach. For example, a consumer may interact on her way to work at an interactive screen or kiosk in a retail store and then complete a more detailed browsing of the offering or content from the privacy of her home or office through her personal computer or other device.

Bluetooth Manager & Bluetooth Control Center

According to another embodiment of the invention, a Bluetooth manager template is included in the mobile marketing platform activities. The Bluetooth manager includes a component to handle communication between Bluetooth hotspots located within the same network as well as the initial setup of the hotspots. The manager may be responsible for creating and configuring an activity, rendering and publishing the activity content, collecting activity metrics and forwarding them to the mobile marketing platform metrics manager, and triggering the START and STOP events for each activity.

A further feature of the embodiment includes a Bluetooth control center as the core component of the Bluetooth manager application. The control center is responsible for collecting all the information of an activity and storing it locally, collecting all metric information from the hotspots and forwarding that information to the Bluetooth manager and coordinating the activity, storing new devices and keeping track of which device has received what information and by which hotspot. The Bluetooth control center ensures that if the connection with the internet is lost the activity will continue running uninterrupted and unaware of the failure, provided that the control center has received a START ACTIVITY event from the mobile marketing platform. If the internet connectivity is lost before the START ACTIVITY event is received, then the activity will never start. Similarly, if the activity is already running it will never stop if the STOP ACTIVITY event is not received. However, if connectivity is restored, and the START or STOP triggers are received, the activity will respectively start or stop. In an internet connectivity failure, metrics are not recorded by the mobile marketing platform, however since the raw metric data are stored on the control center, the metrics can be retrieved offline, or when connectivity is restored. The metrics may also be retrieved by extracting the data directly from the control center. In one embodiment, if Internet connectivity is lost, the application can upload collected metrics in a batch format via an autonomous functionality provided in the control center.

According to one embodiment of the invention the Bluetooth manager is integrated with the mobile marketing platform to advertise and provide additional content to a mobile user in a defined market area, such as a mall or other hotspot location. One embodiment includes an "Invite-to-Win" activity in which a user passes by a single hotspot, such as a kiosk or advertising display, and receives informative info, such as a picture/screensaver/ringtone or a mobile coupon redeemable at the nearby store.

Figure 33:
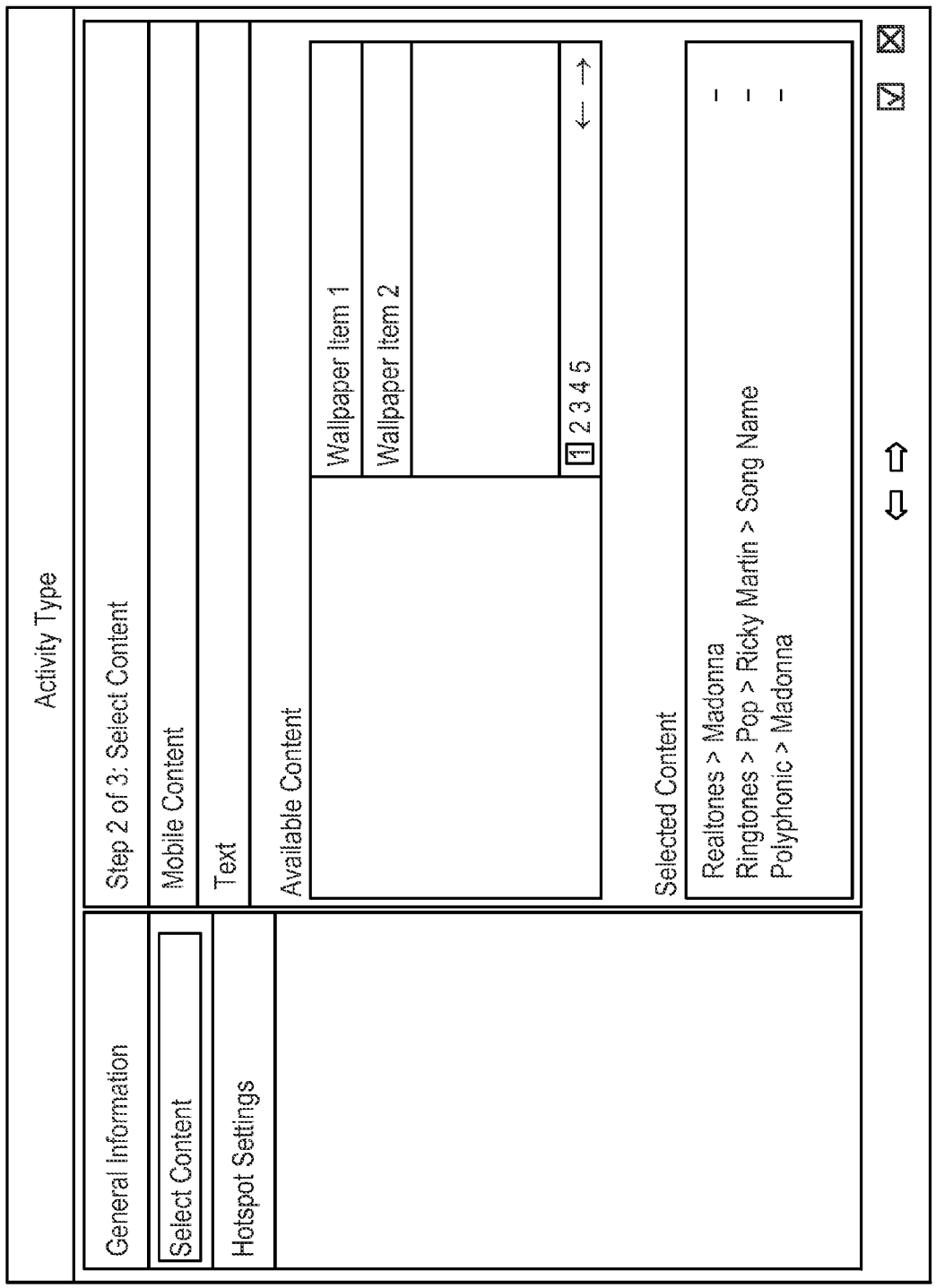
FIG. 33 depicts the selection of content offered from a content management system in accordance with an embodiment of the invention.

According to one embodiment of the invention, an interactive wizard is used to create and configure activities utilizing the Bluetooth manager. The platform user specifies the general details particular to the Bluetooth activity, including, but not limited to, the name, description, and the time period when the activity will be active within the start and end dates of the campaign it is associated with. The platform user then selects the content that the activity will serve from the CMS. As shown in FIG. 33, the platform user may select single items or entire folders containing more than one item as content to be offered upon the completion of a specified task or series of tasks. Examples of content offered may include, without limitation, ringtones and wallpapers for mobile devices, music and video offerings or other electronic content. The platform user may also define the hotspots through which the activity will be delivered to customers as well as the specific settings of each hotspot, i.e. name of the zone of operation, the location, number of hotspots, and options for pushing and redirecting content. The platform user may also define a number of options, including promotional methods for the activity, and additional channels through which content may be delivered, that is, SMS and WAP. Creation of the activity is finalized and the activity is ready to run.

An exemplary activity enabled by the Bluetooth manager of the mobile marketing platform, according to one embodiment, is a "Hot or Cold" contest. The contest is a multihotspot activity and the content items are not pushed in a particular order. A user in a supermarket, for example, who walks down the aisles, receives "Hot or Cold" content or messages depending on how close he is to a particular product of interest. As the consumer moves closer to the product of interest he receives "warm," "warmer" and "hot" indications. The system may ensure that each consumer does not receive the same content twice.

An example of the Bluetooth Manager in use with the mobile marketing platform may include customers, upon entering a supermarket, being prompted to switch on Bluetooth on their enabled devices. The devices are "discovered" by the Bluetooth hotspots in the supermarket. If there is a special offer on a given product, for example, ACME Raisin Cookies, the system endeavors to lead them to the right shelf inside the store. The user receives and accepts a message which gives a hint about where the specially offered product is located. If the user's location is far from the location of the product, a "Cold" message may be sent stating, "Find Our Cookies Special in line with cashier no. 7." As the user finds her way to the special offer, she is identified and located by the next hotspot, which is closer to the target product. A Warm message may then be sent stating, "Warm. You are steps away from getting to Our Cookies Special. Keep going." The system repeats sending status messages to the user as she gets closer or farther away from the special product. A Warmer message may state, "Warmer. You are almost there. Our Cookies Special is a breath away. Can you smell the raisins?" As the user finds her way in front of the right self, the nearby hotspot congratulates her with a Hot message: "Hot. Our Cookies are at your hand. Enjoy our special offer."

Another embodiment of the invention includes a multi-hotspot activity, referred to herein as "Bluehunting," that requires the content items to be pushed sequentially to the user. The content of the activity consists of a series of clues. Participants only receive the next content depending on whether they have received the previous content, in the correct order. The user then follows the hints given in each message to reach the final hotspot and win a prize. If a user is not at the beginning of the quest, he may receive an invitation to participate with instructions to carryout the first step of the sequence. Embodiments of the invention may include tasks such as finding specific goods in a store, finding a specific store inside a mall, discovering special offers and discounts, familiarizing themselves with the whole department of the store, etc.

One example of a Bluehunting activity may involve the use of additional media in informing customers in a marketplace entrance area, such as a mall main entrance, about a treasure hunt game. The additional media may include holographic screens, posters, announcements, etc. When the user opts-in, the first clue is sent to their mobile from a hotspot. The clue will lead them to their next place, where the next hotspot is located. The user will receive the next clue from that hotspot.

For example, the additional media may include a message on a mobile screen, interactive display, poster or other display telling customers to "Activate your Bluetooth now! The Hunt is on!" The first clue may be a message on mobile consisting of two broadcasted items: a map of the mall with a red spot, or other location indicator, and a message with a clue to the location of the next clue. For example, the message may state, "Come And Find The Next Clue In Front Of The Cinema." When the user arrives at the outside the cinema entrance, the system, knowing that the user did receive the first clue, transmits the next clue to the next hotspot.

If the second stop is the final hotspot, the message may indicate that is where the "treasure" is located. The message containing the second clue, similarly to the first clue, may include a map of the mall with a second red spot, or other location indicator, as well as a message stating, "Come And Find The Final Clue In Front Of The Beauty Shop." When the user arrives to the outside of the Beauty shop, the system knows that they already have the two previous clues. The users have successfully followed the designed route and they receive their reward. A message is sent to the user's mobile device stating, "Your hunt is over! Enter the Beauty shop. Display this message to the cashier and for every Beauty product you buy—you get a second for free."

One embodiment of the invention includes the use of interactive displays located at a kiosk or hotspot within a marketplace. In the illustrative examples above, when a user is progressing through the search contests, a hotspot or clue location may have an interactive screen with which the user may obtain electronic content, prizes, coupons or other information related to the campaign. In one embodiment electronic content, such as digital music or video may be transmitted to a consumer's mobile device wirelessly as the consumer interacts with the display.

While the embodiments described above utilize a Bluetooth manager and Bluetooth wireless protocol to transmit data from a hotspot to a mobile device, one skilled in the art should recognize that any wireless communication protocol, (SMS, MMS, Cellular, WiFi, WiMax, etc.) may be implemented without deviating from the scope of the invention.

Further, while the activities described herein may include specific language and text included in a transmission specific to a given contest, one skilled in the art should recognize that the language used and the specific details of the contests are merely illustrative and should not limit the scope of the invention.

While the illustrative embodiments described herein have outlined a network interconnection in a particular manner, one skilled in the art should recognize that, in general, networked intelligence of hotspots may allow for additional interconnection schemes and content pushing. For example, a scheme may include unique content transmission to allow for unique coupons and multiple campaigns (different start and stop campaign dates) for permanent hotspot installations.

Virtual World

According to another embodiment of the invention, the mobile marketing platform may be used and integrated with a virtual world environment to further expand the reach of an advertising or marketing campaign. With the increasing popularity of virtual environments in the gaming and computing marketplace, such as Second Life, virtual worlds provide an additional avenue of communication with audiences.

According to one embodiment, the creation of a virtual world activity is presented to the platform user as an interactive wizard. The platform user specifies the general details particular to the virtual world activity, such as the name, description, and the time period when the activity will be active within the start and end dates of the campaign with which it is associated. The platform user sets up the virtual world to include features such as, without limitation, the number of customers allowed to access the environment at the same time, the land size of the world, an option to enable customers to create avatars or other symbolic representations in the environment, and an option to enable Voice-over-Internet Protocol (VoIP) for real-time conversations or chat functionality among the consumer members. The platform user then selects the content to be made available to customers inside of the virtual world. The activity interfaces with the Content Management System (CMS) to retrieve content dynamically from the CMS, similarly to the Bluetooth Manager described above. The user may select single items or entire folders containing more than one item to be offered to a consumer upon completion of a task or series of tasks. Creation of the activity is finalized and the selected content is published automatically by the CMS.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

APPENDIX A

| "Templates" | | |
| --- | --- | --- |
| Category | Title | Abstract |
| Text to win | Chose a name | Consumers vote on their favorite name of a product, concept etc. from predefined list. Those that selected the winning name are entered into a draw for the top prize. The others are entered into a draw for smaller prizes. |
| Text to win | Point pursuit | Consumers text to win points which equal entries to draws for different prizes. The more messages they send the more chances they have to win. |
| Text to win | Treasure hunt | Consumers text a keyword to win "hidden" points which are entries to draws to win physical prizes. |
| Text to win | Text first to win | Consumers are prompted to text a keyword and be the first in the hour/minute to instantly win a prize. Additional prizes can be given via draws. |
| Text to win | Every Nth message wins | Every nth consumer to text a keyword wins a prize. Additional prizes can be given via draws. |
| On pack | Find the lucky code | Consumers text unique codes found on pack. If the code is lucky the consumer wins the associated prize. |
| On pack | Play more, win more | Consumers text unique codes found on pack to win entries to draws for different prizes. The more the codes they redeem the more chances they have to win. Everybody wins mobile content for each code they send. An instant win mechanism can be added. |
| On pack | Choose your prize | Consumers text unique codes found on pack. For every code they send they win a download from a WAP storefront and entries to draws to win physical prizes. An instant win mechanism can be added. |

APPENDIX A-continued

"Templates"

| Category | Title | Abstract |
| --- | --- | --- |
| On pack | Reveal the hidden points | Consumers text unique codes found on pack to reveal "hidden" points which are entries to draws to win physical prizes. Everybody wins mobile content instantly. An instant win mechanism can be added. |
| On pack | Be the first to win | Consumers are prompted to send a unique code found on pack first in the hour/minute to instantly win a prize. Prizes may also be given via draws. |
| On pack | Every Nth code wins | Consumers are prompted to send a unique code found on pack. Prizes are awarded instantly on an "every nth" base and via scheduled draws. |
| On pack | Branded content | Consumers text a unique code found on pack to receive free mobile content (videos, games, melodies, wallpapers and screensavers). |
| On pack | M-coins | Consumers text a unique code found on pack to win virtual money (points). Points can be redeemed for mobile content or other small prizes on a web site. |
| On pack | Text to win mobile content | Consumers text a unique code found on pack to win mobile content downloads. Participants download the content from a WAP storefront. |
| On pack | Text mobisodes | Consumers text unique codes found on pack to get back the first part of a story. The following episodes are sent only if the consumer texts more codes. |
| On pack | Video mobisodes | Consumers text unique codes found on pack to get back the first part of a story. The following episodes are sent only if the consumer texts more codes. |
| On pack | Win every hour | Consumers text unique codes found on pack to win entries to automated periodic draws. Every hour an automatic draw is executed and the winner of the hour is resolved. Winners are automatically informed. |
| On pack | King(s) of the day | Consumers are prompted to text the more codes within the day. The top winner(s) win the daily prizes. All participants enter draws for smaller prizes. |
| On pack | The first N | The first N consumers that send a valid code found on pack win a prize. |
| Loyalty | Join to win! | Consumers text basic demographic data and register. Users enter draws to win physical prizes and digital content as a reward for registering. |
| C | Pointmania | Consumers opt-in to a loyalty club related to a brand/product. For every purchase they make they win points. Points can be redeemed for different prizes. |
| Loyalty | Mobile Club | Consumers are prompted to join a mobile club related to a product or a brand. Once they join they are invited to different events, they receive product news and/or promotions, etc. Members can download digital prizes, take part in quizzes or games. |
| Mobile Couponing | m-coupons | Consumers text a keyword to a shortcode. As a reply they receive a coupon code or barcode coupon which they can then redeem in-store or via web/WAP. |
| Mobile Couponing | Discount and Sales Notifications | Consumers opt-in to receive notices for various product discounts and sales (e.g from a mall, super market etc). |
| User Generated Content | Name it! | Consumers text the name of a product, a concept, etc. The winning idea(s) win a prize. A committee chooses on the winners. A second round can expose the top X ideas to public voting. |
| User Generated Content | Post your message! | Consumers text their opinion about sth. The text is posted in a billboard or a WEB site for a period of time. A moderation step is intervened. |
| User Generated | Find the nearest | Consumers text a street name and a city or a zip code. As a reply the get back the location of the closest store or other point of interest. A visual can also be sent (depending on handset capabilities). |
| Locationbased | Lucky store | Consumers text a code found on pack to win entries to prize draws. During the promotion all participants are prompted to visit the "lucky store" of the day. Within a lucky store special codes that correspond to bonus points (multiple of the standard) are given for every product purchase. |
| Locationbased | Photo Mosaic | Consumers send a photo and a zip code. The photo is used to build a photo map. A moderation step is intervened. |
| Tips, Alerts | Tip of the day! | Consumers opt-in to receive a "themed" tip every day for a period of time. The theme of the event is strongly associated with the brand, or with an ad concept. |

APPENDIX A-continued

"Templates"

| Category | Title | Abstract |
| --- | --- | --- |
| Tips, Alerts | m-recipes | Consumers opt in to receive the recipe of the day. Recipes always include as an ingredient the product in question. Recipes are delivered via SMS (short type, e.g. cocktails) or/and WAP. |
| Tips, Alerts | Sponsored weather | Consumers text a city name and a state or an area code to opt in to weather alerts. As a result they receive sponsored alerts. An ad text is included in every alert. |
| Viral | Send to a friend | Consumers are prompted to invite friends to join the promotion. The more friends they invite the more are their chances to win the top prize. To invite a friend, participants text a keyword and their friend's phone numbers. If the invited friend joins the promotion the invitee wins draw entries. |
| Viral | Snowball | Consumers are prompted to invite friends to join the promotion. To invite a friend, participants text a keyword and their friend's phone numbers. If the invited friend joins the promotion the invitee wins draw entries. All entries won by a participant are added to his invitee. |
| Information | Learn more about . . . | Consumers text a brand or product name to receive information about it. The info could be text and/or visual and is accessible via WAP or SMS/MMS. |
| Information | Call me! | Consumers text "call" to request a call from a sales or customer care representative. |
| Information | Order a catalogue | Consumers text their mail address to receive a product catalogue in the mail. |
| Information | Join a newsletter | Consumers text their e-mail address to subscribe to an e-mail newsletter. |

What is claimed is:

1. A computer-based method for targeting users of mobile devices with mobile device specific content, the method comprising the steps of:
    providing a mobile marketing platform comprising a site design tool, the mobile marketing platform configured to create an advertising campaign targeted to users of the plurality of mobile devices, wherein the advertising campaign comprises a plurality of activities and one or more objectives, the one or more objectives comprising at least one performance metric;
    creating a site using the site design tool in response to user actions;
    publishing the site using the mobile marketing platform;
    setting up one activity of the plurality of activities, wherein the published site is designated as a landing page for the one activity using the mobile marketing platform, the landing page accessible through a link;
    transmitting an advertising message with the link to the plurality of mobile devices;
    receiving mobile device information in response to one or more users of the mobile devices accessing the link;
    generating content for display on the plurality of mobile devices using a common file format hierarchy in response to the mobile device information; and
    rendering the content generated using the common file format for each mobile device as a function of mobile device type.

2. The computer-based method of claim 1 wherein the content comprises advertising.

3. The computer-based method of claim 1 wherein the content comprises a ringtone.

4. The computer-based method of claim 1 wherein the content is generated using the mobile marketing platform.

5. The computer-based method of claim 1 wherein the advertising message is generated using a template.

6. The computer-based method of claim 1 wherein the step of publishing comprises publishing the content under a site name other than a live site name.

7. The computer-based method of claim 1 further comprising the step of managing the content via a tree structure.

8. The computer-based method of claim 1 further comprising the step of creating the advertising campaign using the mobile marketing platform.

9. The computer-based method of claim 8 further comprising the step of configuring the advertising campaign using an interactive wizard comprising a graphical user interface having input fields suitable for creating and configuring an advertising campaign activity in a structured manner, wherein each activity has a measurable performance metric.

10. The computer-based method of claim 8 further comprising the step of measuring success of the advertising campaign using the measurable performance metric.

\* \* \* \* \*